United States Patent
Rafalovich et al.

[11] Patent Number: 6,059,016
[45] Date of Patent: *May 9, 2000

[54] THERMAL ENERGY STORAGE AND DELIVERY SYSTEM

[75] Inventors: Alexander P. Rafalovich; Gilbert P. Keller, both of Indianapolis; T. Craig Schmidter, Fishers, all of Ind.

[73] Assignee: Store Heat and Produce Energy, Inc., Indianapolis, Ind.

[*] Notice: This patent is subject to a terminal disclaimer.

[21] Appl. No.: 08/664,224

[22] Filed: Jun. 11, 1996

Related U.S. Application Data

[63] Continuation-in-part of application No. 08/289,063, Aug. 11, 1994, Pat. No. 5,553,662.

[51] Int. Cl.$^7$ .................................................. F28F 27/00
[52] U.S. Cl. ......................... 165/41; 165/10; 165/202; 165/DIG. 539; 62/434
[58] Field of Search ........................ 165/10, 236, 902, 165/42, 43, 61, DIG. 348, DIG. 351, DIG. 539; 62/434

[56] References Cited

U.S. PATENT DOCUMENTS

| | | | |
|---|---|---|---|
| D. 281,009 | 10/1985 | Moses et al. | D23/72 |
| 2,000,467 | 5/1935 | Lindseth | 257/8 |
| 2,193,837 | 3/1940 | Winther et al. | 62/6 |
| 2,535,669 | 12/1950 | Clay | 250/27.5 |
| 2,555,012 | 5/1951 | Spofford | 257/3 |
| 2,772,076 | 11/1956 | Matthews | 257/224 |
| 2,856,506 | 10/1958 | Telkes | 219/39 |
| 3,029,596 | 4/1962 | Hanold et al. | 60/24 |
| 3,744,272 | 7/1973 | Oldberg | 62/439 |
| 3,773,031 | 11/1973 | Laing et al. | 126/400 |
| 3,937,209 | 2/1976 | Van Vechten | 126/375 |
| 3,960,207 | 6/1976 | Boer | 165/104 R |
| 3,990,505 | 11/1976 | Davenport | 165/43 |
| 3,991,936 | 11/1976 | Switzgable | 237/1 A |
| 3,996,759 | 12/1976 | Meckler | 62/2 |
| 4,012,920 | 3/1977 | Kirschbaum | 62/2 |
| 4,024,908 | 5/1977 | Meckler | 165/18 |
| 4,030,312 | 6/1977 | Wallin et al. | 62/2 |
| 4,104,185 | 8/1978 | Schroder | 252/70 |
| 4,117,882 | 10/1978 | Shurcliff | 165/104 |
| 4,127,161 | 11/1978 | Clyne et al. | 165/34 |
| 4,143,706 | 3/1979 | Schnaibel et al. | 165/26 |
| 4,154,292 | 5/1979 | Herrick | 165/1 |
| 4,165,036 | 8/1979 | Meckler | 237/1 A |
| 4,172,491 | 10/1979 | Rice | 165/1 |
| 4,256,475 | 3/1981 | Schafer | 62/2 |
| 4,294,078 | 10/1981 | MacCracken | 62/59 |
| 4,362,207 | 12/1982 | Farfaletti-Casali et al. | 165/10 |
| 4,384,608 | 5/1983 | Scarlett et al. | 165/43 |
| 4,388,963 | 6/1983 | Campbell | 165/10 |
| 4,402,188 | 9/1983 | Skala | 62/56 |
| 4,421,661 | 12/1983 | Claar et al. | 252/70 |
| 4,462,463 | 7/1984 | Gorham, Jr. | 165/140 |
| 4,466,478 | 8/1984 | Carlsson et al. | 165/1 |
| 4,470,270 | 9/1984 | Takada et al. | 62/244 |
| 4,471,834 | 9/1984 | Schlote | 165/4 |
| 4,483,151 | 11/1984 | Fujioka et al. | 62/157 |
| 4,523,637 | 6/1985 | Abramo | 165/104.34 |
| 4,540,501 | 9/1985 | Ternes et al. | 252/70 |
| 4,556,171 | 12/1985 | Fukami et al. | 237/12.3 B |
| 4,574,874 | 3/1986 | Duran | 165/43 |

(List continued on next page.)

FOREIGN PATENT DOCUMENTS

| 58-133542 | 2/1982 | Japan . |
| 59-231342 | 6/1983 | Japan . |

*Primary Examiner*—Christopher Atkinson
*Attorney, Agent, or Firm*—Woodard, Emhardt, Naughton, Moriarty & McNett Patent and Trademark Attorneys

[57] ABSTRACT

Described is a thermal energy storage and delivery system for delivering thermal energy to both a passenger compartment of a vehicle and a component, such as a battery, located externally of the passenger compartment. The system capitalizes on excess capacity stored in a thermal energy storage apparatus, to heat the external component in addition to the passenger compartment.

36 Claims, 33 Drawing Sheets

U.S. PATENT DOCUMENTS

| | | | |
|---|---|---|---|
| 4,579,170 | 4/1986 | Moses et al. | 165/104.17 |
| 4,609,036 | 9/1986 | Schrader | 165/10 |
| 4,637,219 | 1/1987 | Grose | 62/199 |
| 4,637,222 | 1/1987 | Fujiwara et al. | 62/244 |
| 4,655,051 | 4/1987 | Jones | 62/324.4 |
| 4,693,089 | 9/1987 | Bourne et al. | 62/79 |
| 4,696,338 | 9/1987 | Jensen et al. | 165/1 |
| 4,708,849 | 11/1987 | Mielnik, Jr. et al. | 422/26 |
| 4,709,750 | 12/1987 | White | 165/10 |
| 4,753,080 | 6/1988 | Jones et al. | 62/59 |
| 4,761,967 | 8/1988 | Sumikawa et al. | 62/201 |
| 4,798,059 | 1/1989 | Morita | 62/228.4 |
| 4,807,696 | 2/1989 | Colvin et al. | 165/10 |
| 4,825,663 | 5/1989 | Nijjar et al. | 62/236 |
| 4,893,476 | 1/1990 | Bos et al. | 62/79 |
| 4,909,044 | 3/1990 | Gudmundsen | 62/236 |
| 4,918,936 | 4/1990 | Sakamoto | 62/117 |
| 4,922,998 | 5/1990 | Carr | 165/10 |
| 4,924,935 | 5/1990 | Van Winckel | 165/10 |
| 4,928,493 | 5/1990 | Gilbertson et al. | 62/185 |
| 4,945,977 | 8/1990 | D'Agaro | 165/43 |
| 4,949,779 | 8/1990 | Kenny et al. | 165/2 |
| 4,951,739 | 8/1990 | Cates et al. | 165/10 |
| 4,959,974 | 10/1990 | Kusakabe | 62/228.5 |
| 4,977,953 | 12/1990 | Yamagishi et al. | 165/10 |
| 4,989,670 | 2/1991 | Foley | 165/143 |
| 4,993,481 | 2/1991 | Kamimoto et al. | 165/10 |
| 5,005,371 | 4/1991 | Yonezawa et al. | 62/238.6 |
| 5,038,580 | 8/1991 | Choi | 165/10 |
| 5,054,540 | 10/1991 | Carr | 165/10 |
| 5,072,596 | 12/1991 | Gilbertson et al. | 62/185 |
| 5,076,248 | 12/1991 | Schatz | 123/556 |
| 5,090,207 | 2/1992 | Gilbertson et al. | 62/59 |
| 5,143,148 | 9/1992 | Merryfull | 165/10 |
| 5,165,467 | 11/1992 | Schatz et al. | 165/10 |
| 5,211,334 | 5/1993 | Schatz | 237/12.3 B |
| 5,237,832 | 8/1993 | Alston | 62/200 |
| 5,277,038 | 1/1994 | Carr | 62/434 |
| 5,299,630 | 4/1994 | Schatz | 165/10 |
| 5,307,642 | 5/1994 | Dean | 62/59 |
| 5,355,688 | 10/1994 | Rafalovich et al. | 62/117 |
| 5,553,662 | 9/1996 | Longardner et al. | 165/10 X |
| 5,678,760 | 10/1997 | Muso et al. | 165/41 X |

THERMAL ENERGY STORAGE AND DELIVERY SYSTEM

This is a continuation-in-part of U.S. patent application Ser. No. 08/289,063, filed on Aug. 11, 1994 now U.S Pat. No. 5,553,662, which is incorporated herein by reference.

BACKGROUND AND SUMMARY OF THE INVENTION

The present invention relates to a thermal energy storage system. More particularly, the present invention relates to a thermal energy storage system including at least one thermal storage apparatus configured to be incorporated into the heating and cooling system of a vehicle or the like.

Use of heating and cooling systems for vehicular applications is common and well established to maintain a comfortable environment within the vehicle while the vehicle engine is operating. When the occupants of the vehicle stop driving the rest in the vehicle, the interior space in the vehicle can become very uncomfortable due to the air temperature within the vehicle increasing or decreasing. In most vehicles, the heating and cooling system maintains comfort levels within the vehicle only during engine operation. These heating and cooling systems do not provide space conditioning to the interior of the vehicle when the engine is turned off.

Phase change materials ("PCMs") store heat during phase transition, typically liquid/solid phase transitions. For example, water paraffins, alcohol, salts and salt hydrates have notably high energy densities over temperature ranges of practical significance. A large amount of thermal energy can be stored as latent heat of fusion during the melting of an appropriate PCM. The stored heat can then be extracted from the liquid PCM by cooling it until it crystallizes. Thermal energy can also be stored as sensible heat in PCMs.

Various attempts have been made to incorporate PCMs into heating and air conditioning systems, including heat pump systems, solar collection systems, and more conventional heating and air conditioning systems. For example, U.S. Pat. No. 5,054,540 to Carr describes a cool storage reservoir positioned in the air duct of a vehicle or the like. A plurality of elongated sealed containers are positioned in the cool storage reservoir, each of the sealed containers being filled with a gas/water medium capable of forming a gas hydrate. U.S. Pat. No. 5,277,038 to Carr also implements a thermal storage system into a vehicle using gas hydrates.

Gas hydrates, however, may possess a variety of disadvantages. Gas hydrates suffer from the development of significant pressures during decomposition and may be subject to excessive supercooling. They may also require specific devices to initiate nucleation. Another disadvantage of the U.S. Pat. No. 5,277,038 patent is that the vehicle's air distribution system is required to discharge the stored thermal energy. The vehicle air distribution system has a powerful blower which drains power out of the batteries very fast. Further, the U.S. Pat. No. 5,277,038 patent discloses storing high and low temperature thermal energy of the same temperature. This does not permit the system of the U.S. Pat. No. 5,277,038 patent to provide comfortable thermal conditioning of a vehicle interior. In addition, the system disclosed in the U.S. Pat. No. 5,277,038 patent is not compatible with electric powered vehicles (EV) which don't have vehicle heating and cooling systems.

Another example is the "heat battery" designed to provide "instant" heating to a vehicle cabin. (Automotive Engineering, Vol. 100, No. 2, February, 1992). The core of the heat battery includes a series of flat, sheet metal PCM envelopes in spaced-apart relationship. The heat battery and an electric coolant pump are installed in a coolant line running from the engine to the cabin heater, forming a closed circuit capable of very rapidly heating the cabin when the engine is turned on.

While such a design possesses certain advantages in typical passenger vehicle applications, there remains a need for thermal storage system design which can be operated more flexibly. For example, there remains a particular need for a thermal storage system which can provide space conditioning for several hours to an enclosed space when the engine is off.

According to the present invention, a thermal energy storage system is provided for heating and cooling the interior occupied spaces of a vehicle when the vehicle engine is turned off. While the vehicle engine is operating, either heating effect from a connection to the engine's coolant system or cooling effect from a connection to the refrigerant flow in the vehicle's air conditioning system is obtained and circulated through PCMs for absorption. When the engine is turned off, the previously stored thermal energy is released to warm or cool the interior occupied spaces of the vehicle to maintain a comfortable environment. In addition, this thermal energy may be withdrawn from storage and circulated through the engine's coolant system either prior to, or upon start-up, to warm up the engine and related vehicle components, such as a battery. Initiation of circulation from storage to this coolant loop, either prior to or upon engine start-up, can expedite the engine's ability to obtain optimal operating temperatures, thus greatly improving emission control and heater coil performance. Further, temperature maintenance within the battery greatly improves reliability, charge acceptance, and lifetime.

In the several embodiments of the present invention, the thermal energy storage system includes a thermal storage apparatus that houses the PCMs. The refrigerant flow and coolant flow is plumbed directly to the thermal storage apparatus so that the refrigerant flow and coolant flow circulate through the thermal storage apparatus.

One feature of a thermal storage apparatus in accordance with the present invention is that the refrigerant flow and coolant flow circulate through the thermal storage apparatus in coils. This feature permits the hot coolant and cool refrigerant to be in direct contact with the PCM.

Advantageously, the thermal energy storage system is a modular and self-sufficient component requiring connection only to the vehicle's coolant system and refrigerant lines. Further, it is configured for both new and retrofit installations. The thermal energy storage system should have little effect on the operating performance oft the vehicle's conventional heating and cooling system.

Another feature of the present invention is that it can supplement a vehicle coolant system to prevent the vehicle engine from overheating during extreme load conditions. This is advantageous when the vehicle is designed with an undersized radiator.

In alternative embodiments of the present invention, the thermal energy storage system may be used for conditioning of building spaces with similar "off-peak" charging of the system, awaiting "on-peak" discharge. Use of a thermal energy storage system for standby emergency space conditioning can provide significant benefit to building spaces and electronic equipment that are temperature sensitive or that may suffer failure if conventional heating and cooling systems are unavailable.

Another feature of the invention is a thermal energy storage and delivery system which is operable to deliver thermal potential to both a vehicle passenger compartment and a vehicle component located exteriorly of the passenger compartment, such as for example a battery of the vehicle's ignition system. In this fashion, capacity of a thermal energy storage means in excess of that required to heat or cool a passenger compartment, for example, can be used to heat or cool components of the vehicle exterior of the passenger compartment.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

A thermal storage apparatus constructed in accordance with the present invention is adapted for integration into a space conditioning system used for climate control of an enclosed space. Thermal storage apparatus as described herein are particularly suited for use in connection with the heating and cooling systems of a vehicle, but can also be used with a variety of other heating and air conditioning systems, including those for heating and cooling ships, buildings, and the like. In addition, a thermal storage apparatus as described can be used to heat and cool the interior of an electric powered vehicle (EV) or a hybrid electric vehicle (HEV).

Figure 1:
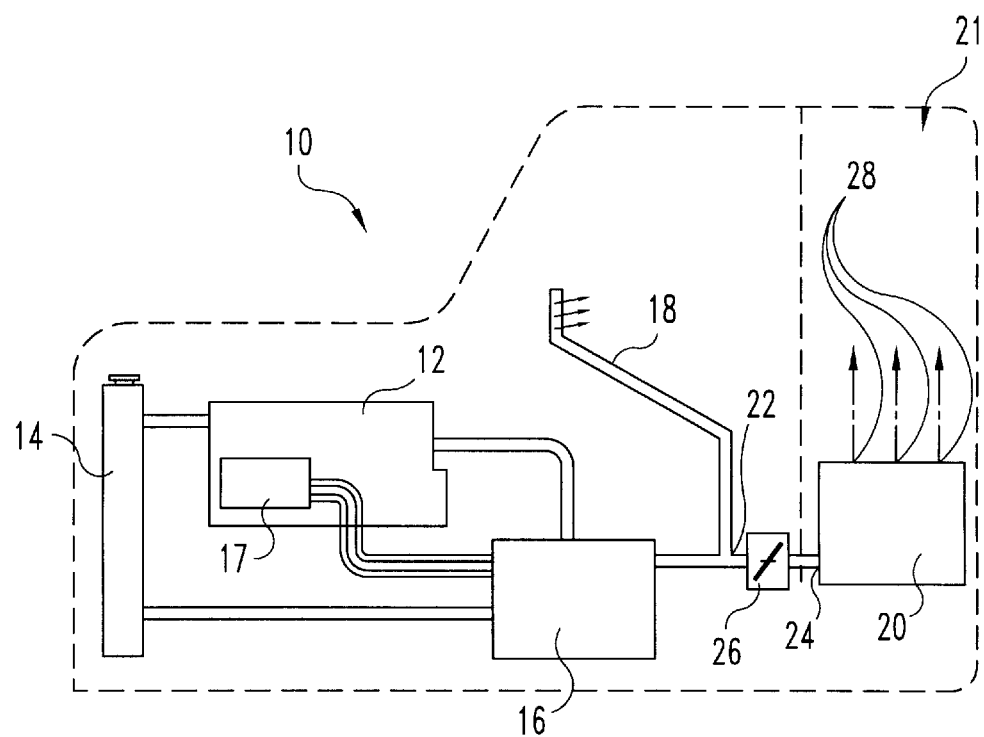
FIG. 1 is a schematic view of a space conditioning system for a vehicle or the like incorporating a thermal storage apparatus.

A thermal storage apparatus in accordance with the present invention is illustrated schematically in FIG. 1 integrated into a space conditioning circuit for a typical vehicle. As shown, a space conditioning circuit 10 typically includes the vehicle's engine 12, a radiator 14, and a space conditioner 16 arranged in a closed loop. Space conditioner 16 may be a standard cabin heater or a standard vehicle air conditioner (with a compressor 17 connected thereto) and a standard heater familiar to those of ordinary skill in the art. Ducting 18 is connected to space conditioner 16 to distribute conditioned air (or other heat exchange fluid) to a plurality of discharge vents (not shown) to discharge conditioned air into the vehicle cabin in a conventional manner.

To integrate a thermal storage unit 20 into circuit 10, a bypass duct 22 is connected between ducting 18 and an inlet 24 of thermal storage unit 20. A damper 26 is provided in bypass duct 22. Air discharge outlets 28 are provided on apparatus 20.

Such a circuit can advantageously be operated to provide space conditioning not only during vehicle operation, but also when the vehicle is parked with the engine off. This is particularly advantageous for truck cabs, motor homes, buses, and other vehicles in which it is desirable to control the temperature of a sleeping compartment or living space when the vehicle is parked over an extended period of time (e.g. overnight).

Circuit 10 can provide such temperature control by cycling between a charging cycle (when the vehicle is operating with the engine on) and a discharge cycle (when the vehicle is parked with the engine off). For example, in a heating application, when the vehicle is operating with the engine running, coolant circulates through the radiator 14, through engine 12, and to space conditioner (heater) 16. From there the air flows through ducts 18 to the vehicle cabin.

A portion of the hot air will flow through bypass duct 22 to thermal storage unit 20. Damper 26 is placed in an open position to allow airflow through bypass duct 22. In thermal storage unit 20, the heat from the air will be transferred to the PCM inside thermal storage unit 20 as heat of transition, causing solid PCM to melt and "storing" the heat in the PCM. This "charging" cycle continues until the PCM is fully melted, at which point additional heat is stored in the form of sensible heat.

When the vehicle is parked and the engine is shut off, the temperature of the conditioned space (e.g. the sleeping compartment or vehicle cabin) begins to approach ambient conditions. When the temperature falls to a predetermined level, as optionally measured by a thermostatic control or other controller, the "discharging" cycle commences. Damper 26 is closed so that no airflow from duct 18 enters bypass duct 22.

When damper 26 is moved to the closed position, an associated port (not shown) in bypass duct 22 is opened so that unconditioned air from the cabin flows into thermal storage unit 20. As described further below, one or more fans can be provided in thermal storage unit 20 to induce airflow.

As the relatively cool air passes the liquid PCM, heat is discharged from the PCM to the air, raising the temperature of the air stream. As the cycle continues, warm air is discharged from thermal storage unit 20 to the vehicle cabin. In addition, the PCM begins to crystallize. Eventually, the PCM must be again liquefied in another charging cycle.

It will be appreciated that an optional control system may be implemented for use in conjunction with thermal storage unit 20 in circuit 10. Controls may be provided to protect the system from minimum and maximum temperature potentials, to regulate the supply of heat exchange fluid, and to open and close damper 26 and its associated port, to activate fans in outlet 28, and to control other parameters.

It is evident that these same operating procedures can be applied to "cool storage" by selecting the appropriate PCM and connecting thermal storage unit 20 to the vehicle's space conditioner 16 (operating as an air conditioner). The "charging" cycle for cool storage, cool air or other heat transfer fluid circulating in the air conditioning system causes liquid PCM in thermal storage unit 20 to crystallize. In the discharging cycle, relatively warm cabin air passes in heat transfer relationship with the PCM, transferring heat to the PCM. The air stream thus exits thermal storage unit 20 at a reduced temperature, cooling the cabin.

It will be appreciated that sources of heat exchange fluid other than those described in connection with FIG. 1 may be used to "charge" PCMs in a thermal storage unit such as unit 20. For example, a dedicated electric resistance heater may be provided. Such a dedicated heater would be designed so that the electrical load would not affect engine operation and could be designed with a controller so that the "charging" cycle commences automatically upon engine start. A dedicated heater could be located either outside or inside unit 20.

Another alternative would be to provide a water-to-air heat exchanger plumbed directly into engine coolant circuit 10. A heat pump might also be used.

Figure 2:
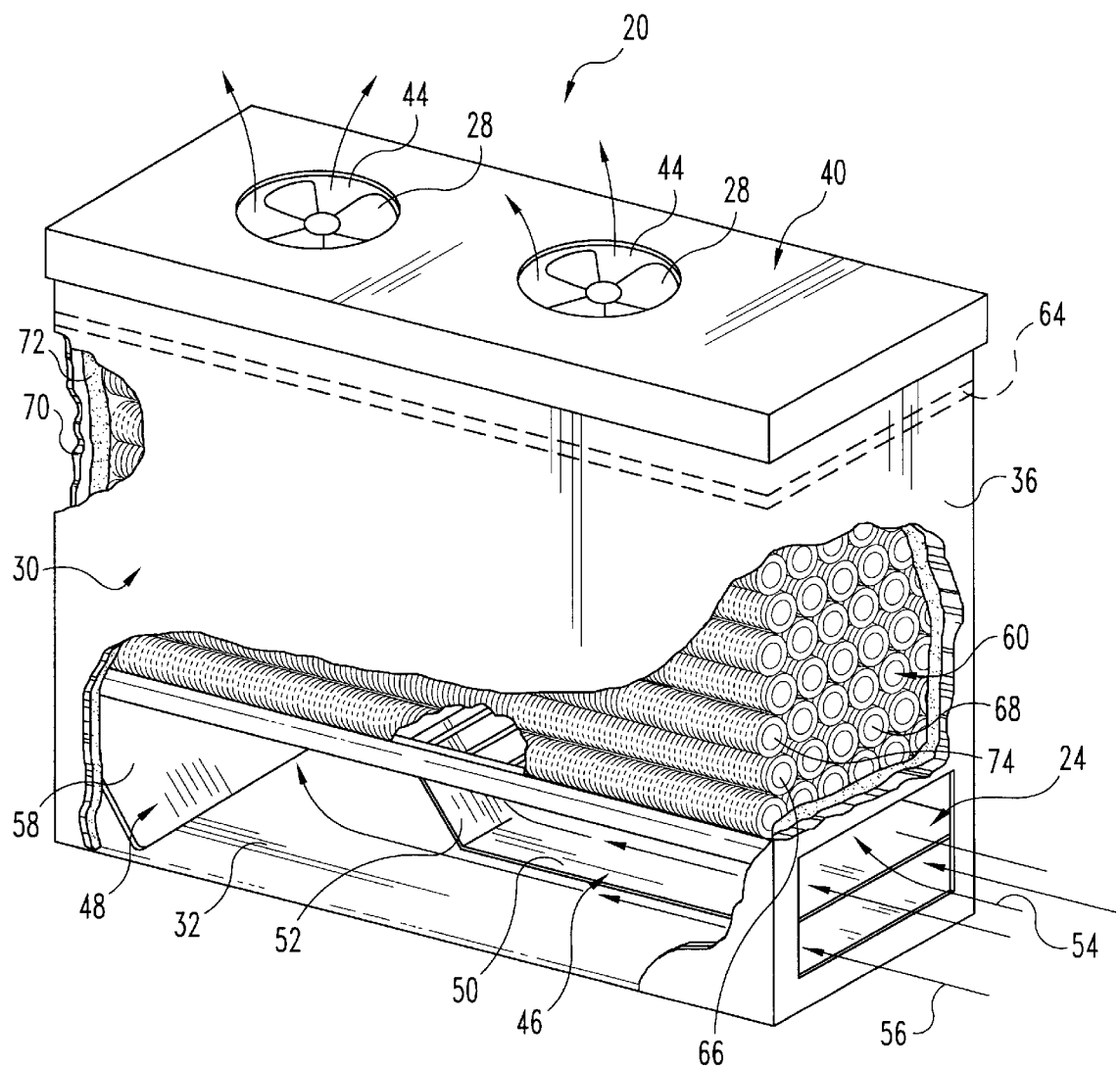
FIG. 2 is a perspective view with portions broken away showing a thermal storage apparatus in accordance with the present invention.

A variety of designs for thermal storage unit 20 are contemplated as being within the scope of the present invention. One preferred embodiment particularly suitable for use in a sleeping compartment of a truck is shown in FIG. 2. As shown, thermal storage unit 20 in accordance with the present invention includes a housing 30 defining an interior region 32. The geometry of housing 30 may vary, although for application in sleeping compartments and the like, limited space is typically allowed and a design as shown having a relatively small footprint is usually desirable. A try or the like (not shown) may be rigidly secured to the floorboard of the vehicle cabin and housing 30 may in turn be bolted or otherwise secured to the tray to insure that housing 30 is held in place during vehicle movement. A layer of suitable insulation 34 (shown best in FIG. 3) is positioned on all inner surfaces of housing 30 to fully insulate interior region 32 from ambient conditions.

Housing 30 may be constructed from a variety of commonly available lightweight and durable metals and plastics. Housing 30 will be fabricated using known construction techniques.

Housing 30 includes a first wall 36 which is formed to include inlet 24 for receiving airflow or flow of other heat exchange fluids from bypass duct 22 (shown in FIG. 1). The location of inlet 24 can be varied according to design constraints. Inlet 24 may be formed on other walls of housing 30, or may be formed in a bottom surface of housing 30.

Housing 30 also includes a second wall 40 (typically the top wall) which is formed to include at least one outlet 28. Typically, second wall 40 will be removable to allow access to interior region 32. At least one fan 44 is provided adjacent to each outlet 28 to induce airflow from interior region 32 through outlet 28. The at least one fan 44 can be wired to the vehicle's electrical system or to other independent power sources. Safety grills (not shown) are positioned in outlets 28 to prevent inadvertent contact with fans 44.

Baffles 46 and 48 may be provided in interior region 32 proximate to inlet 24 to direct incoming airflow uniformly throughout interior region 32. Baffle 46 includes a horizontal piece 50 and an angled piece 52. Horizontal piece 50 splits the air stream at inlet 24 into a first portion 54 and a second portion 56. First portion 54 impinges upon angled piece 52 and is directed into that portion of interior region 32 nearer inlet 24. Second portion 56 9f the air stream flows underneath horizontal piece 50 of first baffle 46 and impinges upon an angled piece 58 of second baffle 48. Second portion 56 of the air stream is thus directed into that portion of interior region 32 further from inlet 24. It will be appreciated that other baffle arrangements may be used (depending upon the location of inlet 24 and other factors) to ensure uniform airflow throughout interior region 32.

One important feature of the design of any thermal storage unit is the arrangement of the PCMs within the unit. Although a variety of configurations are contemplated within the scope of the present invention, one preferred design provides PCMs 82 (see FIG. 3) in sealed, elongated containers 60 placed in a stacked array in interior region 32. Upper and lower gratings or racks 62, 64 are provided to ensure that the array of containers 60 is maintained in tight-packed relationship even during vehicle movement. Containers 60 are arranged so that their long axes 66 are perpendicular to the direction of airflow through interior region 32. Of course, other arrangements may be desirable depending upon design considerations. Indeed, it may be desirable to arrange the containers 60 so that their longitudinal axes 66 are parallel to the airflow.

It is anticipated that containers 60 may be subject to thermal expansion during solid to liquid phase change. Radial expansion may be constrained somewhat by the grids 62, 64, tightly packing the array together. However, expansion along axis 66 is expected to occur, and some clearance must be provided between the ends 68 of containers 60 and walls 36, 70 to allow for such expansion. Unfortunately, such a clearance space would allow a passageway for airflow around the ends of containers 60. Air flowing in such passageways would bypass the array and reduce heat transfer efficiency between the air stream and the PCMs.

This problem may be solved in a variety of ways in accordance with the present invention. Walls 36, 70 may be constructed of flexible diaphragm material which will flex when containers 60 expand but will at other times remain flush with the ends of containers 60.

Another possibility is to provide a foam pad 72 or the like between the ends of containers 60 and insulation 34. Pad 72 blocks airflow when containers 60 are in their normal condition and also allows for containers to expand along longitudinal axis 66.

Figure 3:
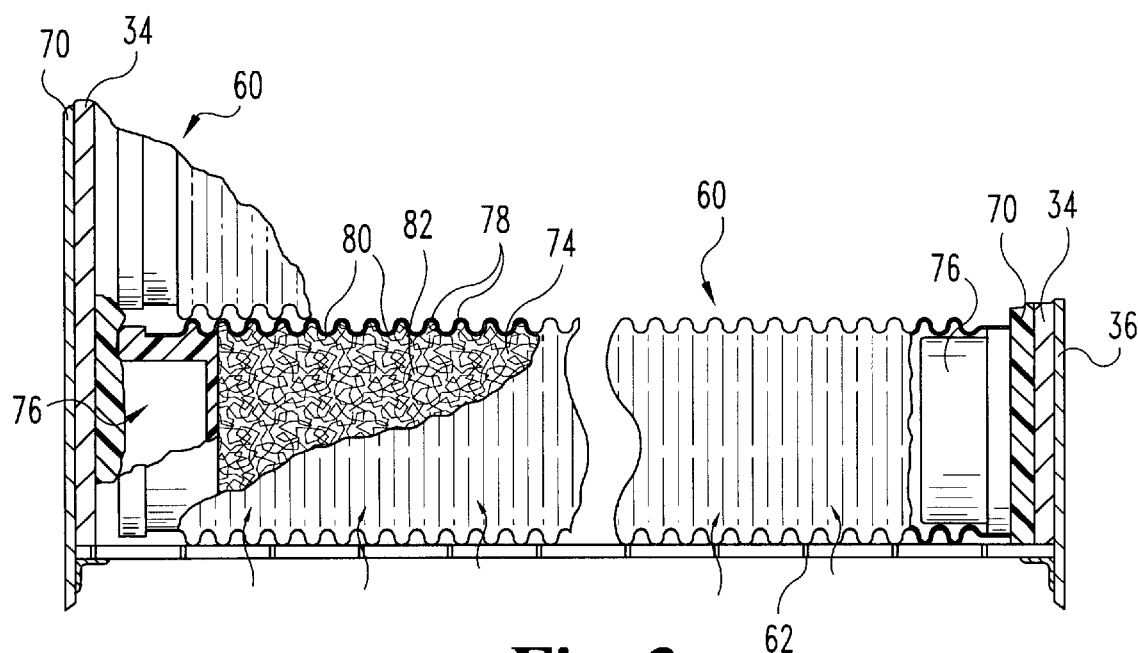
FIG. 3 is an enlarged perspective view of a PCM container in accordance with the present invention including a plurality of rings on its exterior surface.

One preferred embodiment of a container 60 in accordance with the present invention is shown in FIG. 3. Container 60 is a flexible, elongated cylinder made of plastic which defines an internal chamber 74 for containing PCMs. The type of plastic will vary depending upon temperature requirements, but high density polyethylene (HDPE) tubes manufactured by OEM Miller is suitable for many applications. Metal containers may be needed where applications require the use of PCMs having particularly high melt temperature (such as magnesium chloride hexahydrate, for example).

The dimensions of containers 60 will vary with the application. However, it has been found that HDPE containers having a 1½ inch outer diameter and a 1¼ inch internal diameter are suitable. Likewise, the number of containers 60 in the array will vary depending upon design considerations well known to designers of heat transfer equipment. An 8×6 array of HDPE containers 60 of the dimensions described above was found to provide heat transfer rates and pressure drops within prescribed limits in one application.

Containers 60 are sealed at their ends 68 by a variety of means. The ends may be heat sealed or may be otherwise compressed or crimped. Preferably, end caps 76 are provided.

End caps 76 may also be made from HDPE and may be spin-welded to the ends of containers 60. As caps 76 are spin-welded into place, the outer surfaces of caps 76 and the inner surface of container 60 partially melt, bonding and hardening when caps 76 cool and thus providing a hermetic seal.

While smooth-walled flexible containers may be used, containers 60 are preferably corrugated containers 60 as shown in FIG. 3. The corrugated rings 78 on the exterior surface of each container 60 may vary in size, shape, and spacing. When multiple containers 60 are packed together in a stacked array as has been described herein, the corrugated rings 78 of adjacent containers 60 will be in contact, advantageously leaving the interstitial spaces 80 open to form a passageway for airflow through the array as shown best in FIG. 3.

It is contemplated, then, that when containers 60 expand during phase change, corrugations 78 will tend to flatten, restricting the passageway for air through the array and reducing the rate of heat transfer. This will advantageously allow for slow initial discharge rates during a heat discharge cycle, with increasing rates later in the cycle. The opposite is likely to occur in cooling discharge cycles. That is, the passageway for air through the array will be relatively unrestricted during the initial phase of the cooling discharge cycle, and will gradually become more restricted as container 60 expands and corrugations 78 flatten out. Thus, corrugations 78 provide, in effect, a means for self-regulating the airflow passageway through interstitial spaces 80. Of course, these effects are likely to vary depending upon the type of PCM 82 which is used.

The use of corrugated containers 60 provides numerous additional advantages. The corrugated containers 60 have a greater external surface area for heat transfer than do smooth-walled containers of the same dimensions. In addition, corrugations 78 assist crystal growth in the PCM by providing increased probability of surface imperfections which can provide points for crystal nucleation. Corrugations 78 provide constantly changing contours preventing large linear crystal growth that might otherwise puncture or damage containers 60.

Corrugations 78 may also provide a deterrent to PCM stratification during phase change transition. It is thought that the additional surface area offered by corrugations 78 will promote equal distribution of solid PCM particles throughout the entire interior volume of container 60, avoiding the accumulation of a high concentration of solid PCM at the bottom of containers 60.

Additionally, the corrugations 78 provide superior structural properties as compared to smooth walled containers. This is particularly important in the present application where leakage of PCMs may corrode or otherwise cause damage to thermal storage unit 20.

A wide variety of PCMs 82 may be used in connection with the present invention. PCMs are typically chosen based upon their latent heat characteristics, but may also be selected for their additional qualities, such as congruent melting, minimal supercooling. Typical classes of PCMs usable in accordance with this invention include paraffin waxes, eutectic mixtures of salts, salt hydrate solutions, and water.

It may be desirable to include a first series of containers 60 containing "heat storage" PCMs and a second series of containers 60 containing "cool storage" PCMs. Another alternative is to use the first series of containers during the winter months and then change the system over to the second series of containers in the summer months.

Preferred PCMs are calcium chloride hexahydrate solutions of the type described in U.S. Pat. Nos. 4,272,390; 4,613,444; and 4,412,931, relevant portions of which are hereby incorporated by reference. Such solutions have excellent latent heat characteristics, low electrical conductivity, and outstanding fire retardant capability. Other salt hydrate solutions contemplated as being useful in accordance with the claimed invention include $CaBr_2 \cdot 6H_2O$ (e.g. as described in U.S. Pat. No. 4,690,769), mixed calcium halide hexahydrates (e.g. as described in U.S. Pat. No. 4,637,888), magnesium nitrate hexahydrate (e.g. as described in U.S. Pat. Nos. 4,272,391; 5,271,029; and 4,273,666), magnesium chloride hexahydrate (e.g. as described in U.S. Pat. Nos. 4,338,208 and 4,406,805), mixtures of magnesium nitrate hexahydrate and magnesium chloride hexahydrate (e.g. as described in U.S. Pat. Nos. 4,272,392; 4,329,242; and 4,402,846), mixtures of magnesium nitrate hexahydrate and ammonium nitrate (e.g. as described in U.S. Pat. No. 4,283,298), and certain gelled PCMs (e.g. as described in U.S. Pat. No. 4,585,572).

Figure 4:
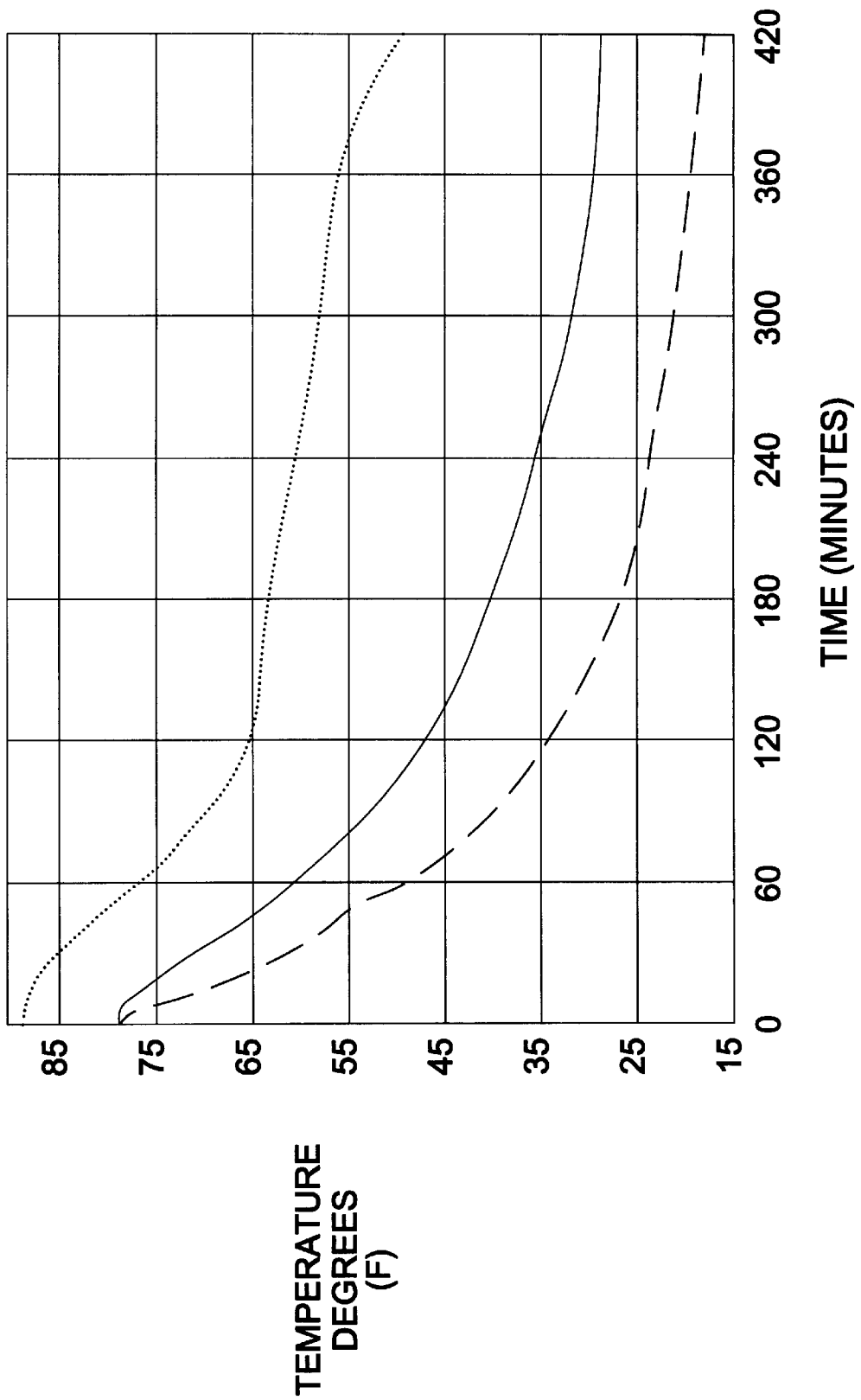
FIG. 4 is a plot of temperature versus time showing performance of a thermal storage apparatus constructed in accordance with the present invention.

An example of the operation of a thermal storage unit 20 in accordance with the present invention is illustrated in FIG. 4. The sleeping compartment 21 (see FIG. 1) of a truck was fitted with a standard insulation package and subjected to testing in a cold room at 0° F. The temperature inside sleeping compartment 21 was recorded over time. The results are shown as a dashed-line plot in FIG. 4. In a separate test conducted for further comparison, a sleeping compartment 21 of a truck was fitted with superior insulation package and was subjected to testing in the cold room at 0° F. Temperature was again measured over time and the results were plotted as a solid-line plot in FIG. 4. Next, a thermal storage unit 20 was installed in sleeping compartment 21 of the truck having the standard insulation package referred to above. A plot of temperature over time for cold room testing of this setup is shown as a dotted line plot in FIG. 4. As illustrated, thermal storage unit 20 showed a considerably greater capacity to maintain temperature at comfortable levels over an extended period of time than did the standard insulation package alone or the superior insulation package.

The embodiment of the present invention illustrated in FIGS. 1–4 features a forced air system for charging the thermal storage unit 20. Other embodiments of the present invention shown in FIGS. 5–32 feature a plumbed system for charging a thermal energy storage. Instead of bypassing heated or cooled air to the thermal storage unit 20 as in the forced air system, the plumbed system calls for coolant from the engine coolant system and/or refrigerant from the air conditioning system to be plumbed directly into a thermal storage system for charging the same with high temperature or low temperature thermal energy. A presently preferred embodiment of a plumbed thermal energy storage system is shown in FIGS. 24–26 and 8–15. FIGS. 5–7, 16–23 and 27–32 show other alternative embodiments according to the present invention which may also be controlled by the control system shown in FIGS. 8–15. In FIGS. 5–32, like parts are denoted by like reference numbers.

Figure 5:
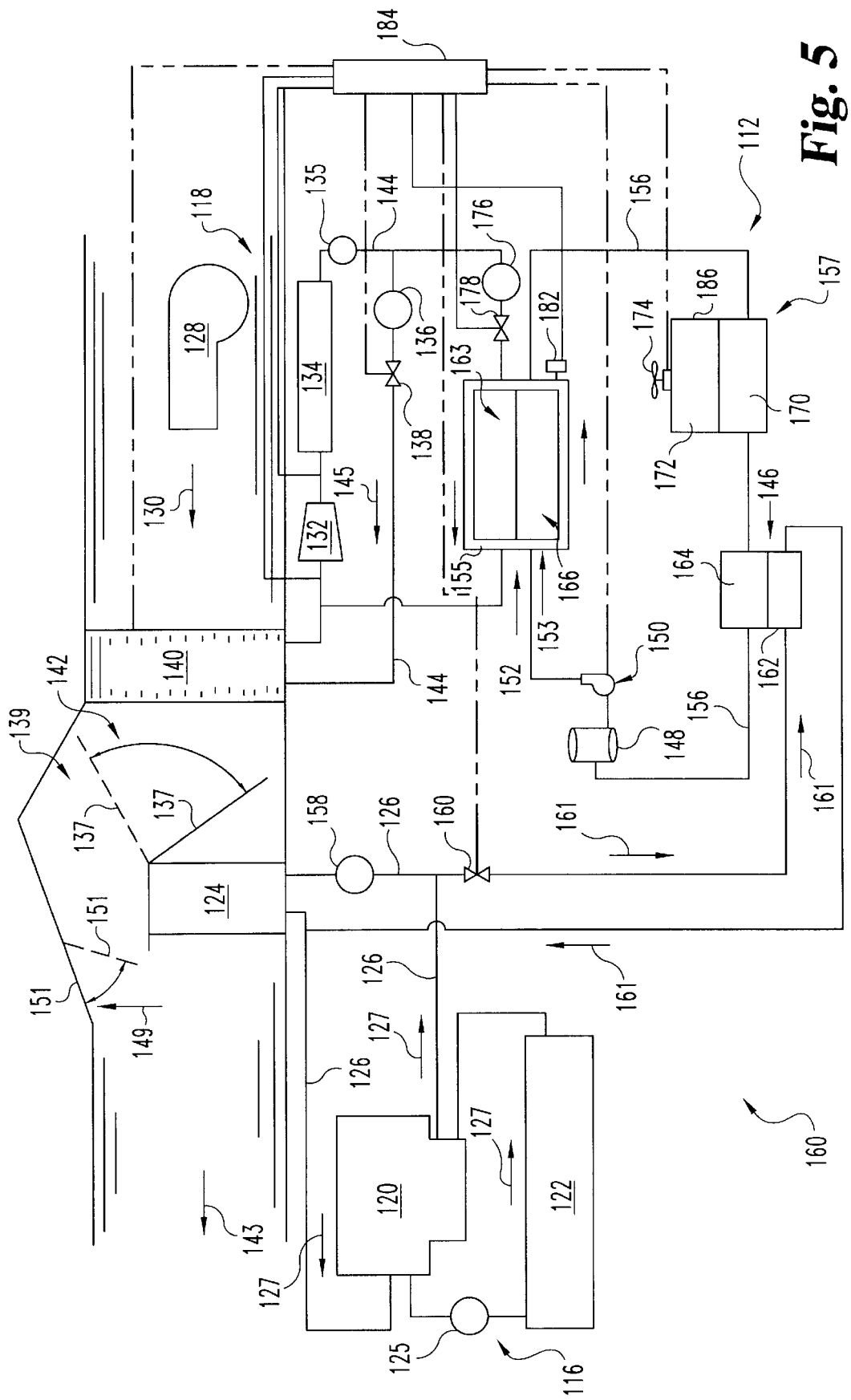
FIG. 5. is a schematic view of one embodiment of a thermal energy storage system integrated into a vehicle space conditioning system having an engine coolant loop and an air conditioning refrigerant loop in accordance with the present invention.

An embodiment of the present invention having a plumbed thermal energy storage system integrated into a space conditioning system 110 for a typical vehicle is illustrated schematically in FIG. 5. The space conditioning system 110 for a typical vehicle is illustrated schematically in FIG. 5. The space conditioning system 100 includes a thermal energy storage system 112 for storing thermal energy while the vehicle is operating and releasing the stored thermal energy into the vehicle when needed. Typically, the thermal energy storage system 112 releases the stored thermal energy into the vehicle when the vehicle engine is not operating.

The space conditioning system 110 typically includes a coolant loop system 116 and an air conditioning refrigerant system 118. Typically, operation of the coolant loop system 116 and the air conditioning refrigerant system 118 requires that the vehicle engine is operating. The thermal energy storage system 112 heats and cools the vehicle interior when the vehicle engine is not operating.

The engine coolant loop system 116 includes a vehicle engine 120, a radiator 122, a heater coil 124, a thermostat 125, valve 158, and a closed coolant loop 126 transferring coolant in direction 127 between the engine 120, radiator 122, and heater coil 124. During operation of the vehicle engine 120, coolant passes through the engine 120 to prevent it from overheating. The coolant loop 126 transfers high temperature coolant exiting the engine 120 to the radiator 122 and the heating coil 124 to be cooled. When the vehicle operator wants to heat the interior of the vehicle, a vehicle blower 128 is turned on to blow air in direction 130 over the heating coil 124. The heating coil 124, located within vehicle air duct system 142, exchanges heat with the forced air blown across its surface.

The heated air is then blown in direction 143 into the vehicle interior or in direction 149 toward the window defroster. A defrost control flap 151 situated in the vehicle air duct system 142 controls the amount of airflow directed toward the defroster. When the defrost control flap 151 is open, shown in dotted lines, airflow is directed toward the defroster. When the defrost control flap 151 is closed, shown in solid lines, airflow is directed toward the interior of the vehicle.

The amount of airflow passing through the heater coil 124 is controlled by the position of an air control flap 137 situated in the vehicle air duct system 142. Airflow generated by vehicle blower 128 is allowed to pass through the heater coil 124 when the air control flap 137 is positioned up in a bypass duct 139 away from the heater coil as shown by the position of air control flap 137 in dotted lines. Airflow bypasses the heater coil 124 and flows through the bypass duct 139 when the air control flap 137 is positioned to cover the inlet of the heater coil 124 as shown by the position of air control flap 137 in solid lines.

The conventional air conditioning refrigerant system 118 includes a compressor 132, condenser 134, dryer 135, expansion valve 136, and evaporator coil 140. A refrigerant loop 144 circulates refrigerant in direction 145 through a closed loop between the compressor 132, condenser 134, dryer 135, expansion valve 136, and evaporator coil 140. The air conditioning refrigerant system 118 liquefies the refrigerant and then transfers the refrigerant to the evaporator coil 140. The vehicle blower 128 creates a forced airflow 130 across the evaporator coil 140 so that the airflow 130 and refrigerant can exchange heat to produce cool air and evaporate the refrigerant. This cooled airstream is then blown in direction 143 into the interior of the vehicle through the vehicle air duct system 142.

More specifically, ambient airflow is drawn across the evaporator coil 140 where liquefied refrigerant within the evaporator coil 140 provides cooling to the crossing air stream. The refrigerant expands and evaporates while absorbing the heat flux within the ambient airstream. The refrigerant, once expanded, is directed to the compressor 132 where it becomes a high temperature/high pressure gas vapor stream directed to the condenser 134. The condenser 134 desuperheats, liquefies, and subcools this high temperature refrigerant prior to its circulation back to the expansion valve 136 and evaporator coil 140 where it exchanges heat with the ambient air to provide cooling.

The engine cooling loop system 116 and air conditioning refrigerant system 118 require engine 120 operation. These systems 116, 118 do not heat or cool the interior of the vehicle when the engine 120 is not operating. It will be understood that in an electric powered vehicle (EV) there is no coolant loop 126 and that resistance coils are used for heating. Currently, an air conditioning system 118 is not practical to use in an EV vehicle because it uses too much energy.

A thermal energy storage system 112 according to the present invention is provided to heat and/or cool the interior of a vehicle during interim engine 120 shutdown. The thermal energy storage system 112 operates in two cycles, a thermal charging cycle and a thermal discharging cycle. In the thermal charging cycle, the thermal energy storage system 112 acquires high temperature thermal energy from the engine coolant loop system 116 or low temperature thermal energy from the air conditioning refrigerant loop system 118. In the discharging cycle, the high or low temperature thermal energy stored in thermal energy storage system 112 is discharged into the interior of a vehicle.

While the vehicle is in operation, either the heating effect obtained from a parallel or series connection to the engine coolant loop system 116 or the cooling effect obtained from the air conditioning refrigerant system 118 is circulated through the thermal energy storage system 112 for absorption. More specifically, the thermal energy storage system 112 may have high temperature PCMs primarily interacting with the coolant loop system 116 and low temperature PCMs primarily interacting with the air conditioning refrigerant system 118. At engine 120 shutdown, the previously stored thermal energy is discharged to warm or cool the interior occupied spaces of the vehicle in an attempt to maintain a comfortable living and/or working environment. In addition, this thermal energy may be withdrawn from the thermal energy storage system 112 and circulated through the engine's coolant system 116 either prior to, or upon start-up, to warm up or to cool down the engine 120 and other vehicle components such as a vehicle battery.

The thermal energy storage system 112 is modular in design, consisting of all components necessary for operation. It only requires connection to the vehicle's coolant lines 126 and refrigerant lines 144. A forced airstream through a transfer device 154 is used to discharge the thermal energy stored in the high and low temperature PCMs into the interior of a vehicle. Because a forced airstream is used, the transfer device 154 should be located to allow unobstructed discharge airflow into the spaces of the vehicle to be conditioned. The location requirements of the transfer device 154 otherwise should only be in proximity to the associated coolant and refrigerant lines 126, 144 for ease of installation.

When a high and low temperature PCM is required the preferred low temperature PCM is water and the preferred high temperature PCM is calcium chloride hexahydrate. In alternative embodiments of the present invention, the high temperature PCM can be a eutectic composition of magnesium chloride hexahydrate and magnesium nitrate hexahydrate.

The thermal energy storage system 112 includes a heat exchanger 146, expansion tank 148, pump 150, first thermal storage apparatus 152, and second thermal storage apparatus 154 which also acts as the transfer device as shown in FIG. 5. A transfer loop 156 connects the heat exchanger 146, expansion tank 148, pump 150, and first and second thermal storage apparatus 152, 154 to allow a transfer medium to travel in a closed loop between and through the components 146, 148, 150, 152, and 154 of the thermal energy storage system 112. The transfer medium is glycol, however antifreeze or any other fluid having a low freezing point and a high boiling point may be used as the transfer medium. The transfer loop 156 is an independent closed system and is dedicated to the thermal energy storage system 112 as a transfer medium circulation and energy transfer circuit.

The heat exchanger 146 provides heat transfer between the coolant loop 126 and the transfer loop 156 of the thermal energy storage system 112. The coolant loop 126 includes a first solenoid valve 158 and a second solenoid valve 160 to isolate coolant flow from the thermal energy storage system 112. Valve 160 opens to allow engine coolant to flow in direction 161 through a coolant loop side 162 of the heat exchanger 146. The coolant provides a high temperature thermal energy source to the transfer medium within the transfer loop 156 passing through a transfer loop side 164 of the heat exchanger 146.

The transfer loop 156 proceeds from the heat exchanger 146 to the expansion tank 148. The expansion tank 148 maintains system transfer medium pressure within the transfer loop 156. The transfer medium proceeds from expansion tank 148 through the liquid pump 150 and into the first thermal storage apparatus 152.

The first thermal storage apparatus 152 includes a housing 153 containing low temperature PCM 155. The housing 153 is lined with conventional insulation (not shown) to preserve the thermal energy stored in the PCM 155. The first thermal storage device 152 further includes a transfer loop side 166 connected to the transfer loop 156 and a refrigerant loop side 168 connected to the refrigerant line 144. The transfer loop side 166 contains a conventional glycol coil (not shown) connected to transfer loop 156 and the refrigerant loop side 168 contains a conventional direct expansion coil (not shown) in communication with the existing air conditioning refrigerant line 144. Both coils are situated within a single bulk containment and in direct contact with the low temperature PCM 155 housed within the first thermal storage apparatus 152. These conventional coils are of the type that can be purchased from Astro Air in Jacksonville, Tex.

As the transfer medium in the glycol coil passes through first thermal storage apparatus 152, thermal energy within the transfer medium is circulated through the glycol coil and absorbed by the low temperature PCM 155 housed in the first thermal storage apparatus 152. The transfer medium exiting the glycol coil in the first thermal storage apparatus 152 flows to the second thermal storage apparatus 154 where residual thermal energy in the transfer medium is absorbed in a high temperature PCM housed in the second thermal storage apparatus 154.

Figure 6:
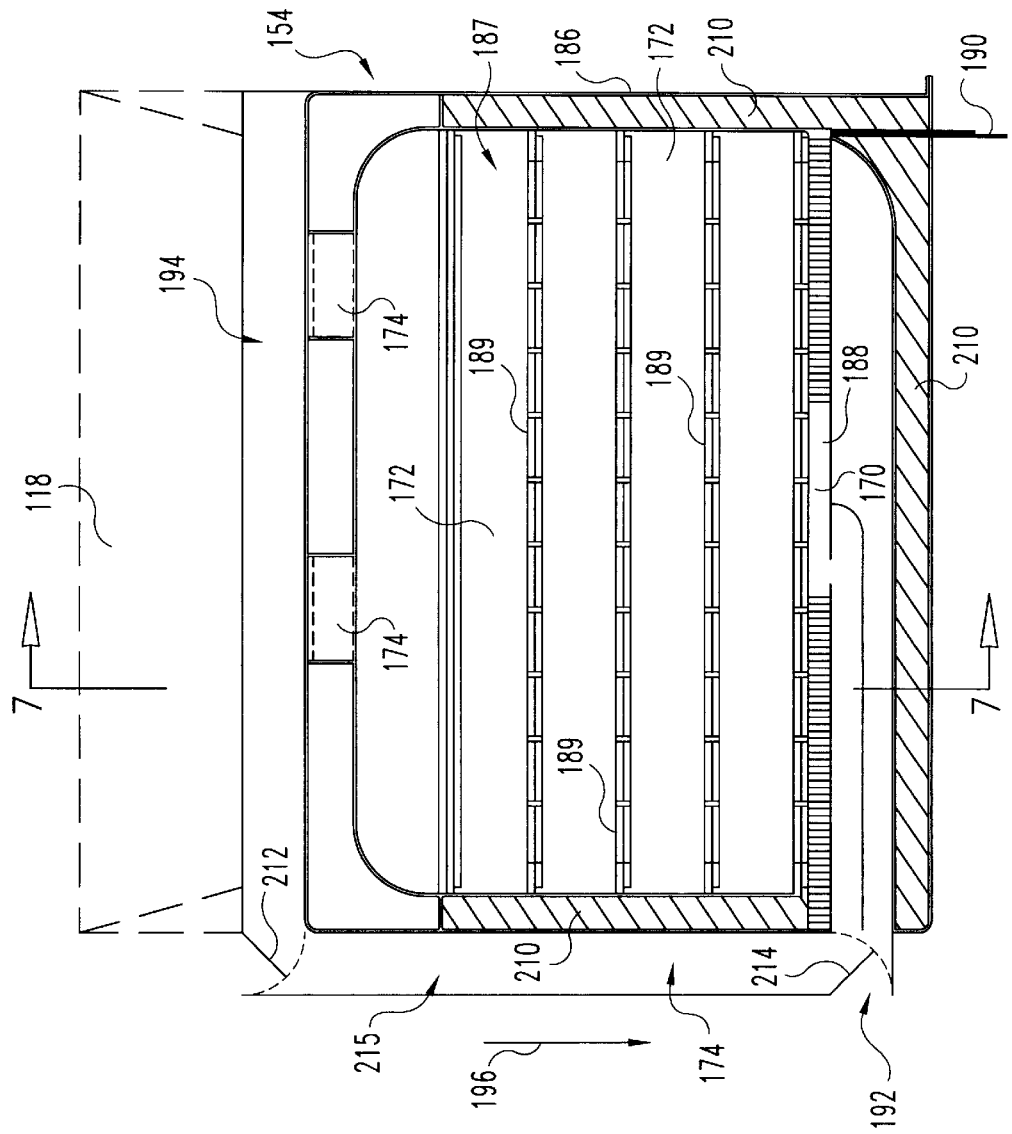
FIG. 6 is a cross-sectional view of an embodiment of a thermal storage apparatus containing PCMs in accordance with the present invention for use in the thermal energy storage system shown in FIG. 5.
Figure 7:
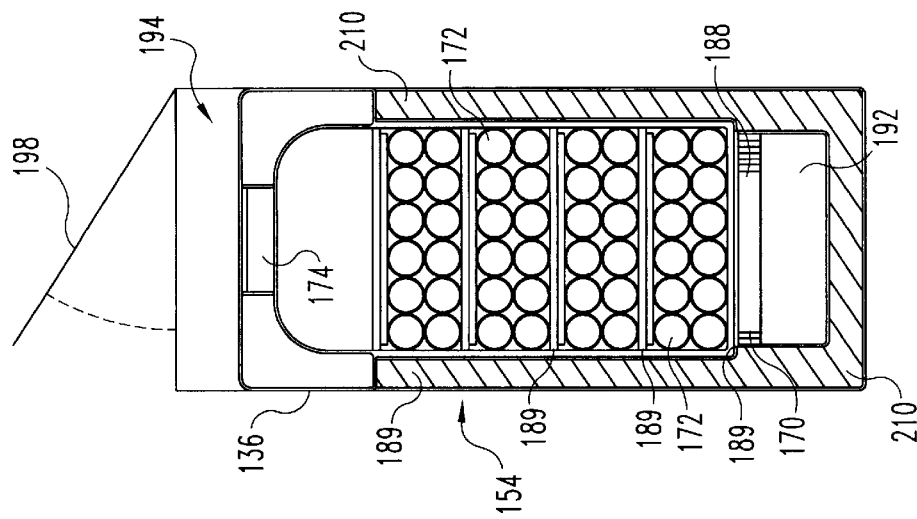
FIG. 7 is a cross-sectional view taken along lines 7—7 in FIG. 6 showing tubes encapsulating the PCMs in a stacked array in the interior region of the thermal storage apparatus.

An embodiment of the second thermal storage apparatus 154 is illustrated in FIGS. 6 and 7. The second thermal storage apparatus 154 includes a transfer loop side 170 having a liquid-to-air transfer coil 188, macro-encapsulated tubes 172 containing the high temperature PCM and fans 174. Circulating the transfer medium through the liquid-to-air transfer coil 188 under the influence of a forced airflow from the fans 174 transfers thermal energy from the transfer medium to the high temperature PCM housed in the macro-encapsulated tubes 172.

The second thermal storage apparatus 154 further includes a housing 186 having an interior region 187. The macro-encapsulated tubes 172 containing the PCMs are stacked in an array in the interior region 187 on racks or shelves 189. The housing 186 also includes the fans 174 positioned above the encapsulated tubes 172 to draw an airflow across the encapsulated tubes 172.

The transfer loop 156 passes through the transfer loop side 170 of the second thermal storage apparatus 154 at a location below the array of encapsulated tubes 172. Specifically, the transfer loop side 170 contains the liquid-to-air transfer coil 188. It is understood that second thermal storage apparatus 154 could be the only storage device in the thermal energy storage system 112. In this alternative embodiment, the thermal energy storage system 112 would have a single PCM within the tubes 172 for high or low temperature thermal storage. The PCM housed in the encapsulated devices 172 of the single thermal storage device can be changed as the outside ambient temperatures change. A high temperature PCM for heating and a low temperature PCM for cooling can be interchanged to provide year-round application of the thermal energy storage system 112.

The second thermal storage apparatus 154 further includes an ambient air inlet 192 that permits air to enter the second thermal storage apparatus 154 below the transfer coil 188. During the charging cycle, ambient air is drawn through the inlet 192 and across the transfer coil 188 by the fans 174. A heat exchange occurs between the ambient air and the transfer medium within the transfer coil 188. The thermal effect obtained from the transfer coil 188 by the airflow is deposited within the PCM containing encapsulated tubes 172. In the illustrated embodiment of the second thermal storage apparatus 154, the second thermal storage apparatus 154 includes a recirculation plenum 194 that may be used during the charging cycle. The recirculation plenum 194 permits the airflow to recirculate back to the inlet 192 after discharge from the fans 174. The recirculation airflow travels along path 196 for a subsequent passage through the transfer coil 188 and encapsulated devices 172. Recirculating the airflow during the charging cycle is beneficial because the transfer coil 188 only has to thermally condition the airflow to offset the energy released to the PCM containing encapsulated tubes 172 and losses through the housing 186 and recirculation plenum 194. Insulation 200 is provided between the housing 186 and the PCM containing encapsulated tube array 172 to reduce energy loss.

When the thermal energy stored in the second thermal storage apparatus 154 is discharged, a recirculation shroud 198 on top of the second thermal storage apparatus 154 is opened to allow the heated or cooled airflow to discharge into the interior of the vehicle. The shroud 198 can also serve as an air deflector to evenly distribute the forced air throughout the interior of the vehicle for better space conditioning. In this discharging cycle, airflow from the interior of the vehicle is acquired and drawn into the inlet 192 by fans 174.

Alternative embodiments of the second thermal storage apparatus 154 may include a shroud (not shown) having a series of slides or air vents (not shown) to allow directional discharge from the fans 174. Another alternative embodiment of the second thermal storage apparatus 154 includes a hinged connection on top of the second thermal storage apparatus 154 to allow the fans 174 to rotate into a sloped position within the dimensional restrictions of the recirculation plenum shroud 198 and directly discharge the airflow into the interior of the vehicle.

Recirculation plenum doors 212, 214 situated within the recirculation plenum 194 are moveable to either permit or prevent airflow from recirculating through the recirculation plenum 194 as shown in FIG. 6. When the airflow is being discharged, the doors 212, 214 are positioned to close off a vertical portion 215 of the recirculation plenum 194 to prevent the airflow from recirculating. When the airflow is recirculating through the interior region 187, the plenum doors 212, 214 are opened to allow flow through the vertical portion 215 of the recirculation plenum 194. During the airflow recirculation mode, door 214 also serves to close inlet 192 to prevent ambient air from the vehicle interior from entering the second thermal storage apparatus 154.

When the thermal energy storage system 112 is acquiring thermal energy from the engine coolant loop system 116, the airflow across the transfer coil 188 in the transfer loop side 170 generates a high temperature airflow that passes through the individual macro-encapsulated tubes 172 containing the high temperature PCM as shown in FIGS. 6 & 7. The high temperature airflow across these encapsulated tubes 172 discharges its thermal effect to the high temperature PCM within the encapsulated tubes 172. The air source used to transfer the thermal energy from the transfer medium to the macro-encapsulated thermal PCM is obtained from the interior spaces of the vehicle that are at ambient temperature. This airflow is drawn into and across the thermal storage material by the one or more fans 174 within or adjacent to the second thermal storage apparatus 154. After the airflow passes through the second thermal storage apparatus 154, it may be discharged to the interior spaces of the vehicle to assist in space conditioning during engine 120 operation. The transfer medium existing the transfer coil 188 in the second thermal storage apparatus 154 is circulated back to the transfer loop side 164 of the heat exchanger 146 where it continues the closed circuit of absorbing high temperature energy from the engine's coolant system 116 and depositing it sensible and/or latently in the first and/or second thermal storage apparatus 152, 154.

The discharge cycle for space heating may be initiated upon engine 120 shutdown when it is desired to provide a heating source to the interior space of the vehicle and offset heat loss in cold weather environments. The discharge cycle is initiated by activating pump 150 to circulate the transfer medium through the first thermal storage apparatus 152 to absorb any sensible energy previously stored in the low temperature PCM.

Subsequently, loop flow from the first thermal storage apparatus 152 to the second thermal storage apparatus 154 transports the transfer medium and any higher temperature energy to the transfer coil 188 in the second thermal storage apparatus 154. As ambient airstream from the interior space of the vehicle is drawn across the transfer coil 188 by the fan 174 to exchange thermal energy in the transfer loop 156 with the inlet air. This preconditioned airflow is then drawn across the encapsulated high temperature PCM 172 within the second thermal storage apparatus 154 to absorb the thermal energy stored in the high temperature PCM. The combination of these two heated air sources into a single high temperature forced air medium is vented into the interior space of the vehicle to provide heating.

In this vehicle interior heating mode, the second thermal storage apparatus 154 having the high temperature PCM housed in the macro-encapsulated devices 172 is used as the primary energy source, through sensible and/or latent heat transfer, to heat the interior spaces of the vehicle. The first thermal storage apparatus 152 is used as a secondary energy source in the heating mode to provide any available energy as a temperature boost to the transfer medium prior to its flow into the second thermal energy storage device 154.

The air conditioning refrigerant system 118 is connected to the thermal energy storage system 112 by paralleling the flow of liquid refrigerant after the dryer 135 and prior to the expansion valve 136. The mainly liquefied refrigerant passes through the direct expansion refrigerant coil (not shown) in the refrigerant loop side 168. The direct expansion coil is located in direct communication within the low temperature PCM 155 in first thermal storage apparatus 152. In alternative embodiments of the present invention, only one expansion valve may be used. In this alternative embodiment, the parallel flow branches off after the single expansion valve.

The flow of the mainly liquid refrigerant into the refrigerant loop side 168 of the first thermal storage apparatus 152 serves as the low temperature charging medium, absorbing heat from the low temperature PCM 155 in the first thermal storage apparatus 152, and subsequently releasing its cooling effect into the PCM 155. This heat exchange vaporizes refrigerant form introduction back into the vehicle refrigerant loop 144 downstream of the evaporator 140 and prior to the cooling sequence insures that the engine's coolant system 116 is isolated from the cooling effect in the thermal energy storage system 112 during the cooling mode.

Several types of control scenarios can be used to regulate the flow of refrigerant to the first thermal storage apparatus 152. One preferred control scenario connects the first and second solenoid valves 138, 178 so that when the evaporator coil 140 is not in operation, the first solenoid valve 138 closes and the second solenoid valve 178 opens to allow flow of the liquid refrigerant to the refrigerant loop side 168 of the first thermal storage apparatus 152. This control; scenario allows the compressor 132 to continue operating even though the evaporator 140 may be off-line during periods of defrosting, etc. This extends the life of the compressor 132 and associated components, and minimizes its on/off cycling. The first and second solenoid valves 138, 178 cycle back to their opposite positions of open and closed, respectfully, when normal evaporator 140 operation is required.

The low temperature thermal energy stored in the first thermal storage apparatus 152 is typically discharged when the vehicle engine 120 is not operating and its is desired to cool the interior of the vehicle. The activation of pump 150 circulates the transfer medium through the transfer loop side 166 of the first thermal storage apparatus 152 where a heat exchange between the warmer transfer medium and the cooler PCM 155 takes place. This heat exchange decreases the temperature of the transfer medium. Transfer medium flow out of the first thermal storage apparatus 152 is circulated to the second thermal storage apparatus 154 where the transfer coil 188 in the transfer loop side 170 exchanges the cooling effect of the transfer medium with an ambient airstream. The ambient airstream is obtained from the interior spaces of the vehicle and drawn across the transfer coil 188 by the fan 174. The heat exchange between the warmer ambient inlet air and the colder transfer medium cools the forced airflow through the second thermal storage apparatus 154 prior to its discharge into the interior occupied spaces of the vehicle for environment cooling. The transfer medium exiting the transfer loop side 170 of the second thermal storage apparatus 154 process through the inactive heat exchanger 146 to the expansion tank 148 and the pump 150 to continue its closed loop cooling circuit through the transfer loop 156.

The first thermal storage apparatus 152 may include an agitator 182 as shown in FIG. 5. The agitator 182 provides agitation within the first thermal storage apparatus 152 to avoid temperature stratification and stagnation and to improve heat transfer within the thermal energy storage material during both charge and discharge sequences, regardless of the operating mode.

The pump 150, fans 174, and solenoid valves 138, 160 and 178, may be controlled by an electrical, mechanical, electromechanical, or other type of control device 184 to cycle on and off as may be desired, based on the mode and sequence of operation. High pressure compressor 132 outlet, low pressure compressor 132 inlet, and low temperature evaporator 140 safety switches are also controlled by controller 184. This control device 184 may be remotely located with respect to the pump 150 and/or fan 174.

A delay between engine 120 shutdown and the initiation of discharge from the second thermal storage apparatus 154 may be desirable to extend the performance envelope and elapsed time of the thermal energy storage system 112. The integration of a conventional temperature sensor (not shown) within the vehicle interior connected to an adjustable or set controller 184 on the fans 174 could delay fan 174 operation and thus thermal discharge from the second thermal storage apparatus 154 until the vehicle interior reaches a present point selected on the controller. An alternative control mechanism is to provide a simple automatic timer set by the occupant in the vehicle to delay fan 174 operation for a specified time period regardless of the vehicle interior temperature.

Basically, the controller 184 provides a switch within the vehicle to permit a vehicle occupant to select hot, cool, or off for both the discharge and charge cycles. For example, in the morning when beginning to drive, the vehicle would be in when the vehicle occupant stops driving for the day. If the vehicle occupant was stopping in a warm environment then he would select cool charge and if he was stopping a cold environment he would select hot charge.

The selection of hot or cool charge does not affect the vehicle occupant's ability to either heat or cool the interior of the vehicle during the charge cycle. For example, if a vehicle occupant is driving through a desert in California during the day and stopping in the mountains of Colorado during the night, the vehicle occupant could cool the interior of the vehicle during the day and hot charge the thermal energy storage system 112 to discharge heated air into the vehicle that night. The vehicle occupant can also in turn cool the vehicle while it is operating and cool charge the thermal energy storage system 112, heat the vehicle while it is operating and hot charge the thermal energy storage system 112, and heat the vehicle while it is operating and cool charge the thermal energy storage system 112.

Preferred embodiments of portions of the controller 184 are shown in FIGS. 8–15. A first embodiment shown in FIGS. 8–10 includes a first charging control circuit 610 that is part of controller 184. Charging control circuit 610 permits the vehicle occupant to operate the air conditioning system 116 to cool the interior of the vehicle or to charge the thermal energy storage system 112.

Charging control circuit 610 includes an air conditioning switch 612, thermal storage charging switch 614, relay 616 having a normally closed contact 618 and normally open contact 620, solenoid valves 138 controlling refrigerant flow to the evaporator 140, 178 controlling refrigerant flow to the thermal energy storage system 112, and 160 controlling coolant flow to the thermal energy storage system 112, and an arrangement of conventional high pressure compressor 132 outlet, conventional low pressure compressor 132 inlet, and conventional low temperature evaporator 140 safety switches 628. The operation of the first charging circuit 610 has three different modes as follows.

Figure 8:
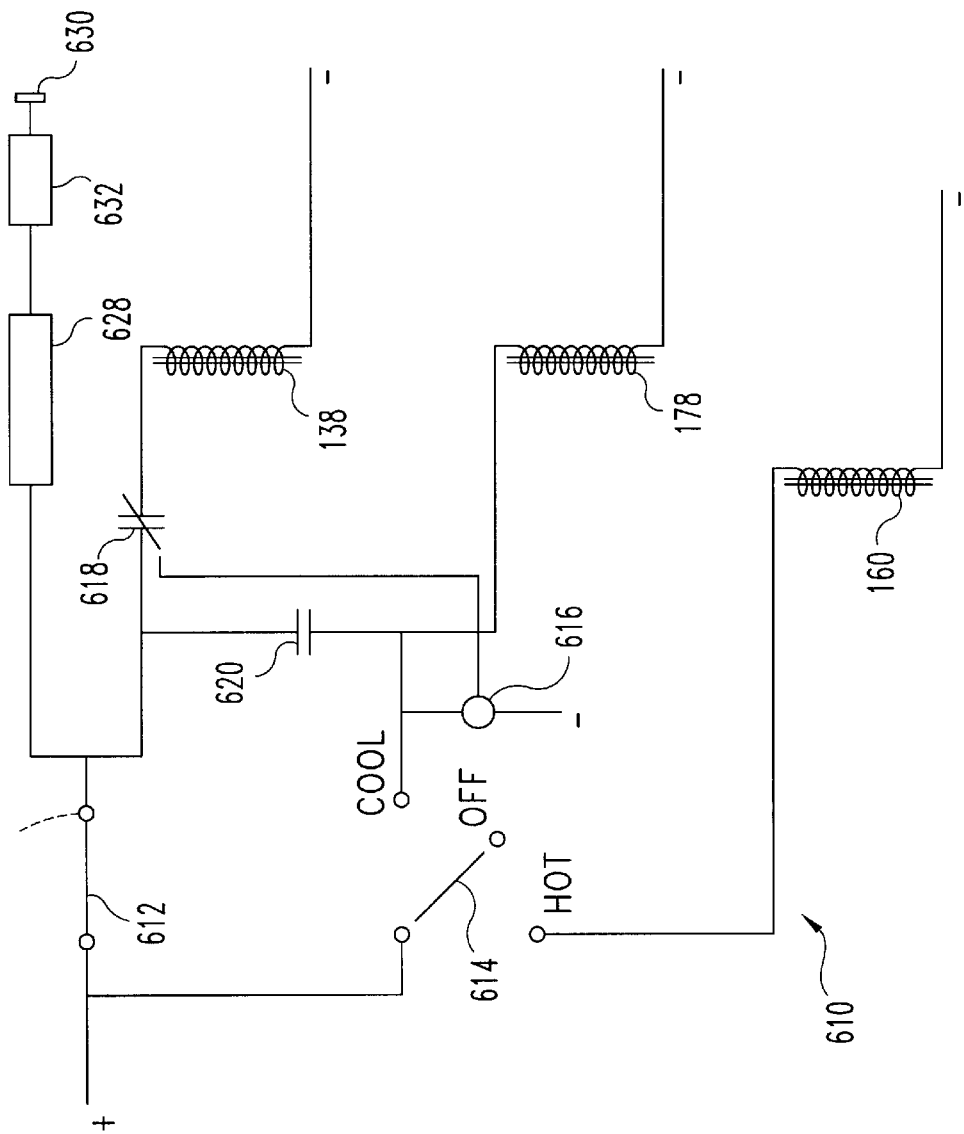
FIG. 8 is a schematic view of a charging control circuit showing the position of switches and relays when the vehicle interior is being cooled during engine operation and no coolant or refrigerant is being sent to the thermal energy storage system for thermal charging.

The first mode of operation for charging control circuit 610 is shown in FIG. 8 where, during vehicle engine 120 operation, the air conditioning system 118 cools the vehicle and the thermal energy storage system 112 does not hot or cool charge. In this mode or operation, the air conditioner switch 612 is in an ON position and the thermal storage charging 614 is in an OFF position. Current flows through the safety switches 628 to energize a conventional magnetic clutch 630 which starts the refrigeration system compressor 132. The current also energizes solenoid valve 138 to allow refrigerant to flow to the evaporator 140 to cool the interior of the vehicle while the engine 120 is operating. If any of the safety switches in arrangement 628 are off, the magnetic clutch 630 is de-energized and thus the compressor 132 is also off.

Figure 9:
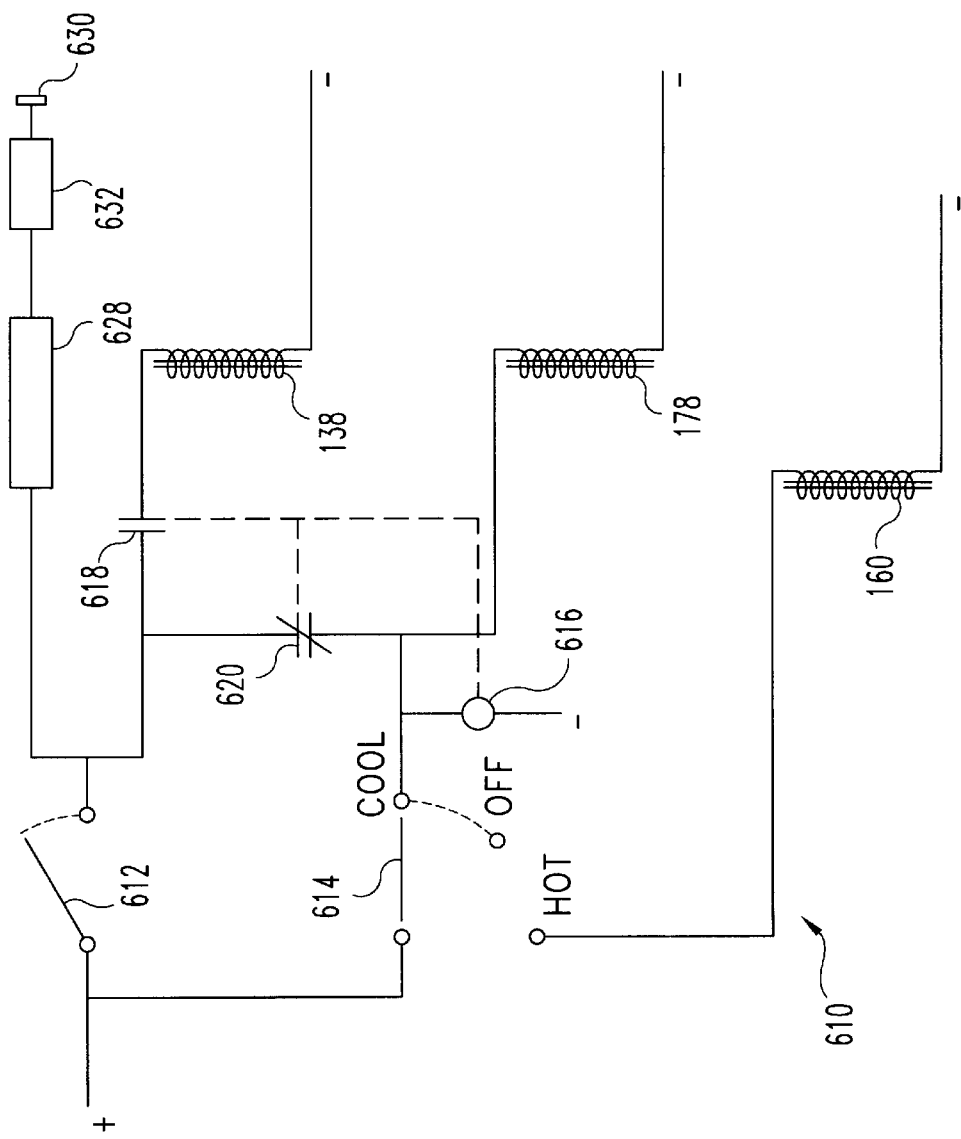
FIG. 9 is a schematic view of the charging control circuit of FIG. 8 showing the position of switches and relays to permit refrigerant flow into the thermal energy storage system to provide a low temperature thermal energy charging source.

The second mode of operation for charging control circuit 610 is illustrated in FIG. 9 where, during vehicle engine 120 operation, the thermal energy storage system 112 stores low temperature thermal energy and the air conditioning system 118 does not cool the vehicle interior. In this mode of operation, the thermal storage charging switch 614 is in the cool position and air conditioning switch 612 may either be in the OFF or ON position. The electrical current from thermal storage charging switch 614 energizes the relay 616 to open normally closed contact 618 and close normally open contact 620. The current flows through the contact 620 to energize the magnetic clutch 630 as long as the safety switches of the manifold 628 are in their normal operating positions. The activation of magnetic clutch 630 initiates operation of the refrigeration compressor 132. The current in this mode of operation energizes solenoid valve 178 permitting refrigerant flow to the thermal energy storage system 112. Solenoid valve 138 is not activated because normally closed contact 618 is open. In this mode of operation, the air conditioning system 118 is only used to charge the thermal energy storage system 112.

Figure 10:
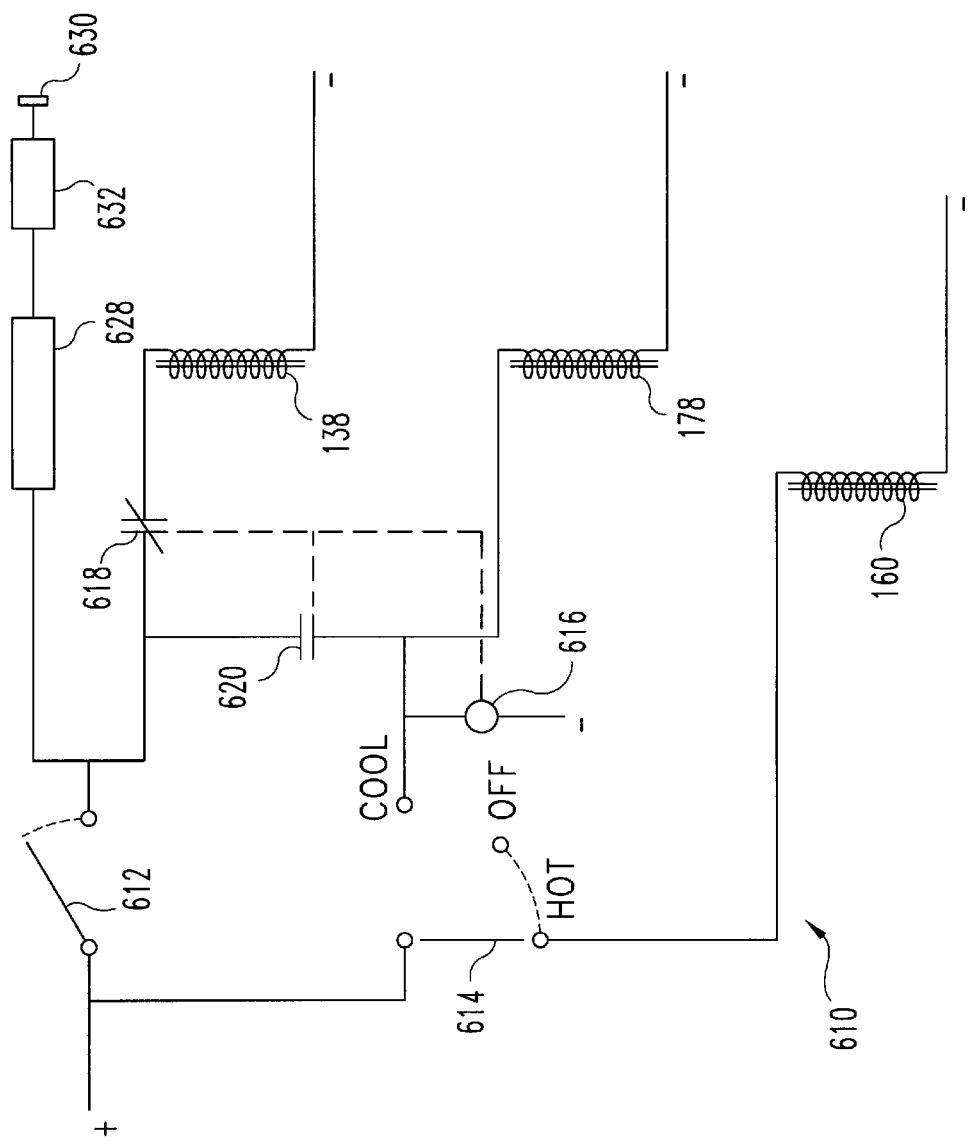
FIG. 10 is a schematic view of the charging control circuit of FIG. 8 showing the position of switches and relays to permit coolant flow into the thermal energy storage system to provide a high temperature thermal energy charging source.

The third mode of operation for charging control circuit 610 is shown in FIG. 10 where, during vehicle engine 120 operation, the thermal energy storage system 112 stores high temperature thermal energy and the air conditioning system 118 may be either on or off. In this mode of operation, the thermal storage charging switch 614 is in the hot position and the air conditioning switch 612 may either be in the ON or OFF position. In this mode of operation, solenoid valve 160 is energized to permit engine coolant to flow into the thermal energy storage system 112 to provide a high temperature thermal energy source. If the air conditioning switch 612 is in the ON position, the air conditioning system 118 operates to cool the interior of the vehicle while the engine 120 is operating. The operating of the air conditioning system 118 does not affect the ability of the heating charge cycle occurring simultaneously in the thermal energy storage system 112 to perform.

A second embodiment of a charging control circuit 640 of controller 184 is shown in FIGS. 11–14. Charging control circuit 640 includes the air conditioning switch 612, thermal storage charging switch 614, solenoid valves 138, 160, and 178, and arrangement 628 containing high pressure compressor 132 outlet, low pressure compressor 132 inlet, and low temperature evaporator 140 safety switches. The charging control circuit 640 further includes relay 642 having contacts 644, 646, 648, and 650, relay 652 having contacts 654, 656, timer 658, and a potentiometer 659 connected to the timer 658. Charging control circuit 640 operates in four different modes as follows.

Figure 11:
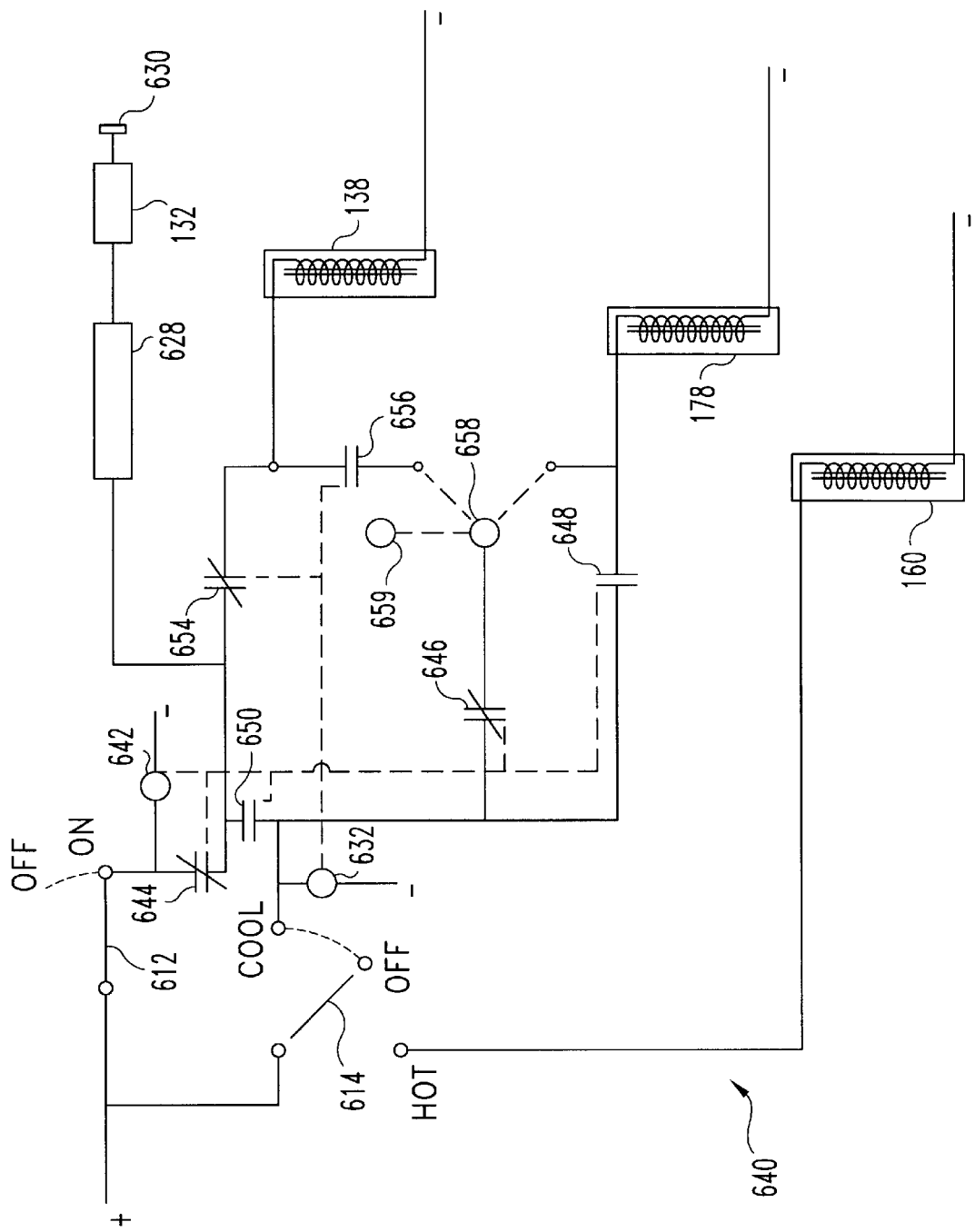
FIG. 11 is a schematic view of a charging control circuit showing the position of switches and relays when the vehicle interior is being cooled by the air conditioning system.

The first mode of operation for charging control circuit 640 is shown in FIG. 11 where, during vehicle engine 120 operation, the thermal energy storage system 112 does not store either high or low temperature thermal energy and the air conditioning system 118 cools the vehicle interior. In this mode of operation, the air conditioning switch 612 is in the ON position and the thermal storage charging switch 614 is in the OFF position. Current flows through and energizes relay 642 to close normally open contacts 644, 646 and open normally closed contacts 648, 650. Because relay 652 is not energized, normally closed contact 654 remains closed. The current flows through the closed contacts 644 and 654 to energize and open solenoid valve 138 permitting refrigerant to flow to the evaporator 140 of the air conditioning refrigerant system 118. Current also flows to energize the magnetic clutch 630 to start the air conditioning compressor 132 if all safety switches 628 are in the operation positions. If any of the safety switches in arrangement s628 are off, the magnetic clutch 630 de-energizes and shuts down the compressor 132. In this mode of operation with the thermal valves 160, 178 are de-energized which prevents either refrigerant or coolant from reaching the thermal energy storage system 112.

Figure 12:
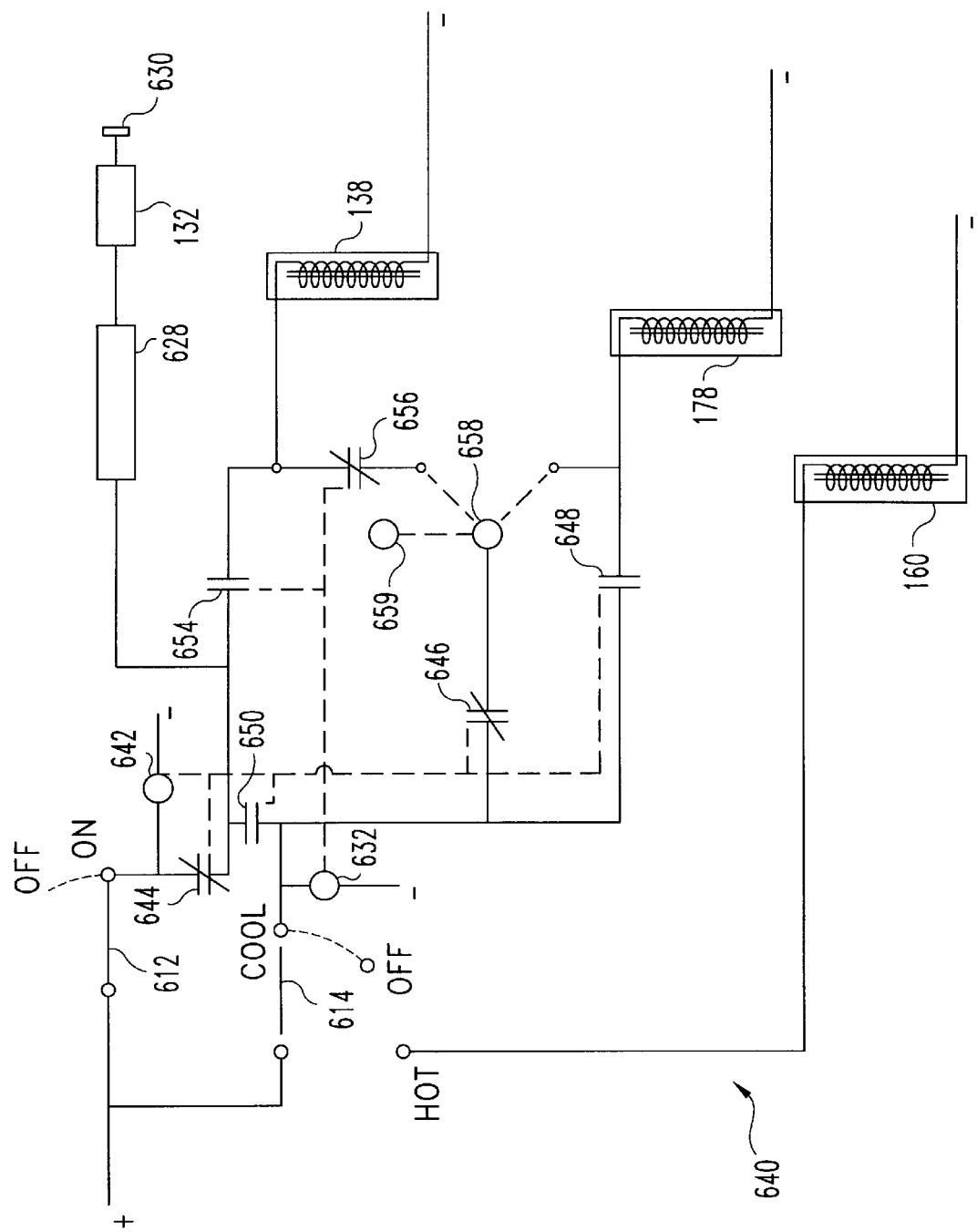
FIG. 12 is a schematic view of the charging control circuit of FIG. 11 showing the position of switches and relays when in turn the air conditioning system is cooling the vehicle interior and refrigerant is flowing to the thermal energy storage system to provide a low temperature charging source.

The second mode of operation for charging control circuit 640 is illustrated in FIG. 12 where, during vehicle engine 120 operation, the thermal energy storage system 112 stores low temperature thermal energy and the air conditioning system 118 cools the vehicle interior. In this mode of operation, air conditioning switch 612 is in the ON position and thermal storage charging switch 614 is in the cool position. Current travels through and energizes relays 642 and 652. Contacts 648, 650, and 654 are open and contacts 644, 646, and 656 are closed. The magnetic clutch 630 is energized to activate refrigerant compressor 132 if the safety switches in manifold 628 are in the normal operation position.

Current flow through the cool contact of thermal storage charging switch 614 and contact 646 to reach timer 658. The timer 658 cycles through a continuous sequence of opening solenoid valve 138 and closing solenoid valve 178 to permit refrigerant to flow to the evaporator coil 140 and closing solenoid valve 138 and opening solenoid valve 178 to permit refrigerant to flow to the thermal energy storage system 112 to provide a low temperature thermal energy charge to the system 112. In preferred embodiments of the present invention, the timer 658 operates to permit refrigerant to flow to the evaporator coil 140 for 120 seconds and then permits refrigerant to flow to the thermal energy storage system 112 for 30 seconds. This 120 second/30 second timing interval continues as long as the air conditioning switch 612 is in the ON position and the thermal storage charging switch 614 is in the cool position. The potentiometer 659 operates to change the timing interval.

Figure 13:
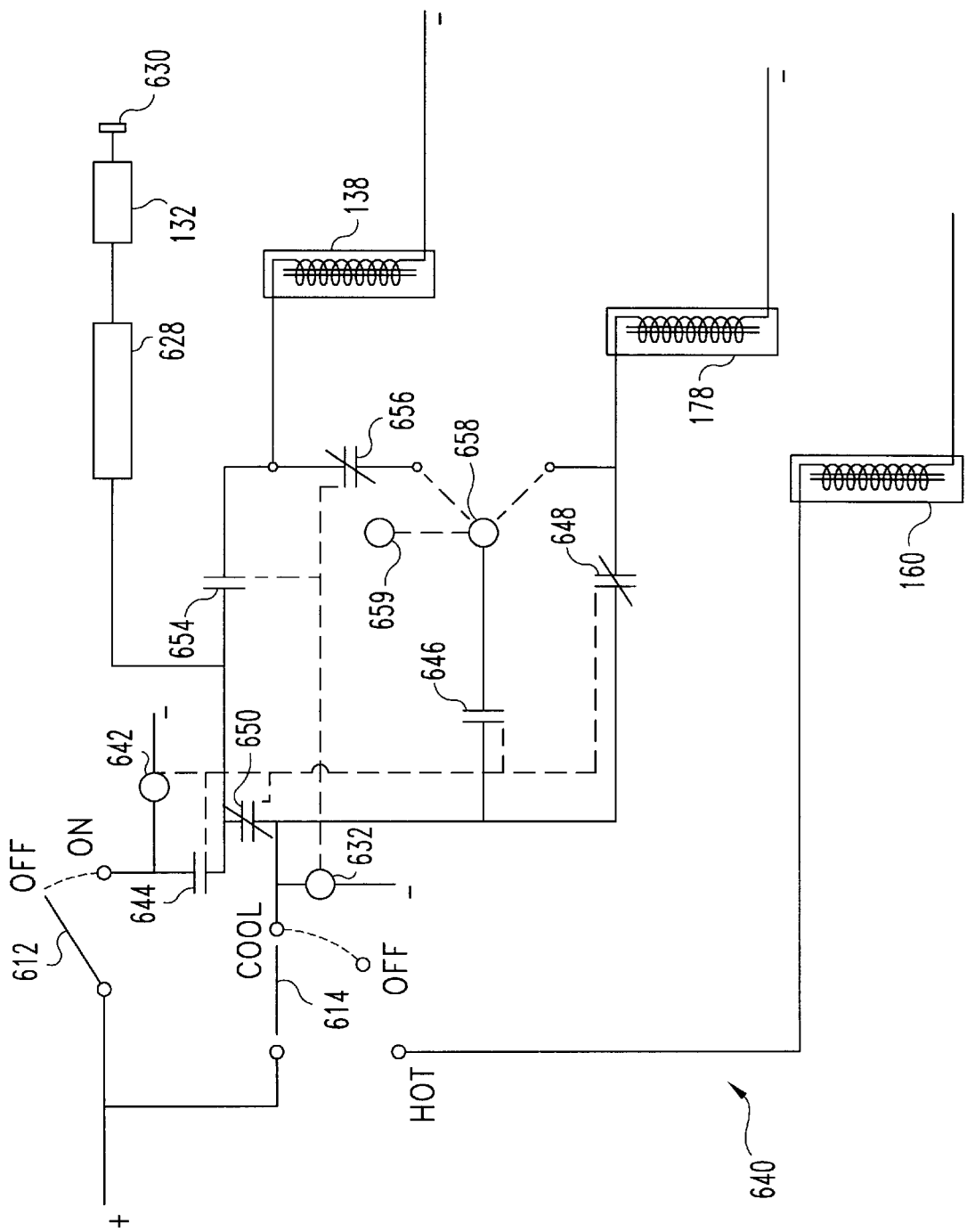
FIG. 13 is a schematic view of the charging control circuit of FIG. 11 showing the position of relays and switches to permit refrigerant flow into the thermal energy storage system to provide a low temperature thermal energy charging source.

The third mode of operation for charge control circuits 640 is shown in FIG. 13 where, during vehicle engine 120 operation, the thermal energy storage system 112 stores low temperature thermal energy and the air conditioning system 118 does not cool the vehicle interior. In this mode of operation, the air conditioner switch 612 is in the OFF position and the thermal storage charging switch 6114 is in the cool position. Relay 642 is not energized and relay 652 is energized, so contacts 644, 646, and 654 are open and contacts 648, 650, and 656 are closed. Magnetic clutch 630 is energized to activate the refrigerant compressor 132 if the safety switches in manifold 628 are in the operational position. Because contacts 646 and 654 are open, there is not current to solenoid valve 138 or to timer 658. Solenoid valve 178 is the only solenoid valve opened, permitting continuous refrigerant flow to the thermal energy storage system 112.

Figure 14:
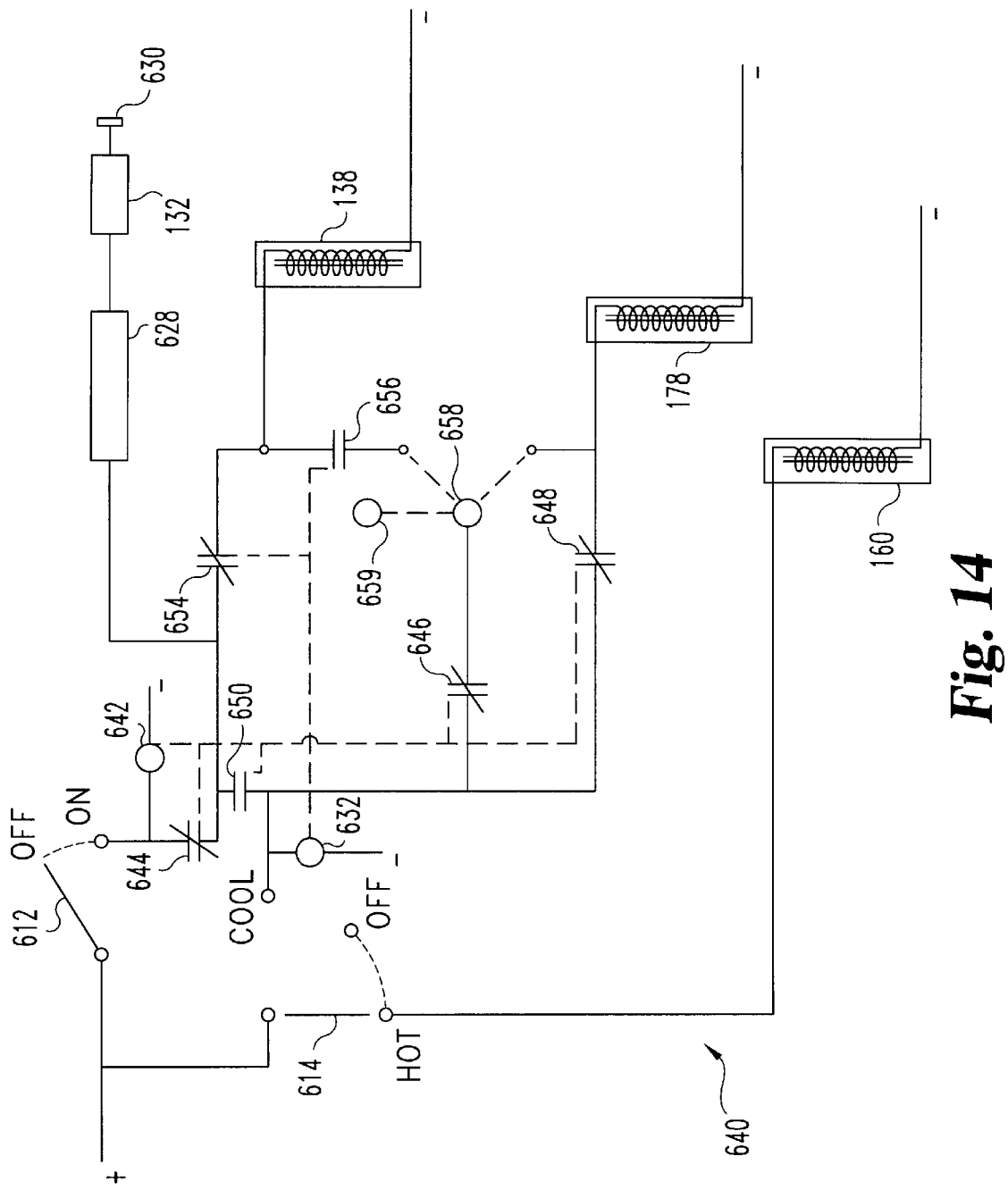
FIG. 14 is a schematic view of the charging control. Circuit of FIG. 11 showing the position of relays and switches to permit coolant flow into the thermal energy storage system to provide a high temperature thermal energy charging source.

The fourth mode of operation for charging control circuit 640 is illustrated in FIG. 14 where, during vehicle engine 120 operation, the thermal energy storage system 112 stores high temperature thermal energy and the air conditioning system may either cool or not cool the vehicle interior. In this mode of operation, the air conditioning switch 612 may be in either the ON or OFF position and the thermal storage charging switch 614 is in the hot position. Solenoid valve 160 is energized and opened to provide a path for coolant to flow to the thermal energy storage system 112 to provide a high temperature thermal energy source. Air conditioning system 118 operates simultaneously with the high temperature charging of the thermal energy storage system 112 if the air conditioning switch 612 is in the ON position.

Charging control circuit 640 permits the vehicle operator to charge the thermal energy storage system with high or low temperature thermal energy while simultaneously running the heating system 116 or cooling system 118 to heat or cool the interior of the vehicle.

Figure 15:
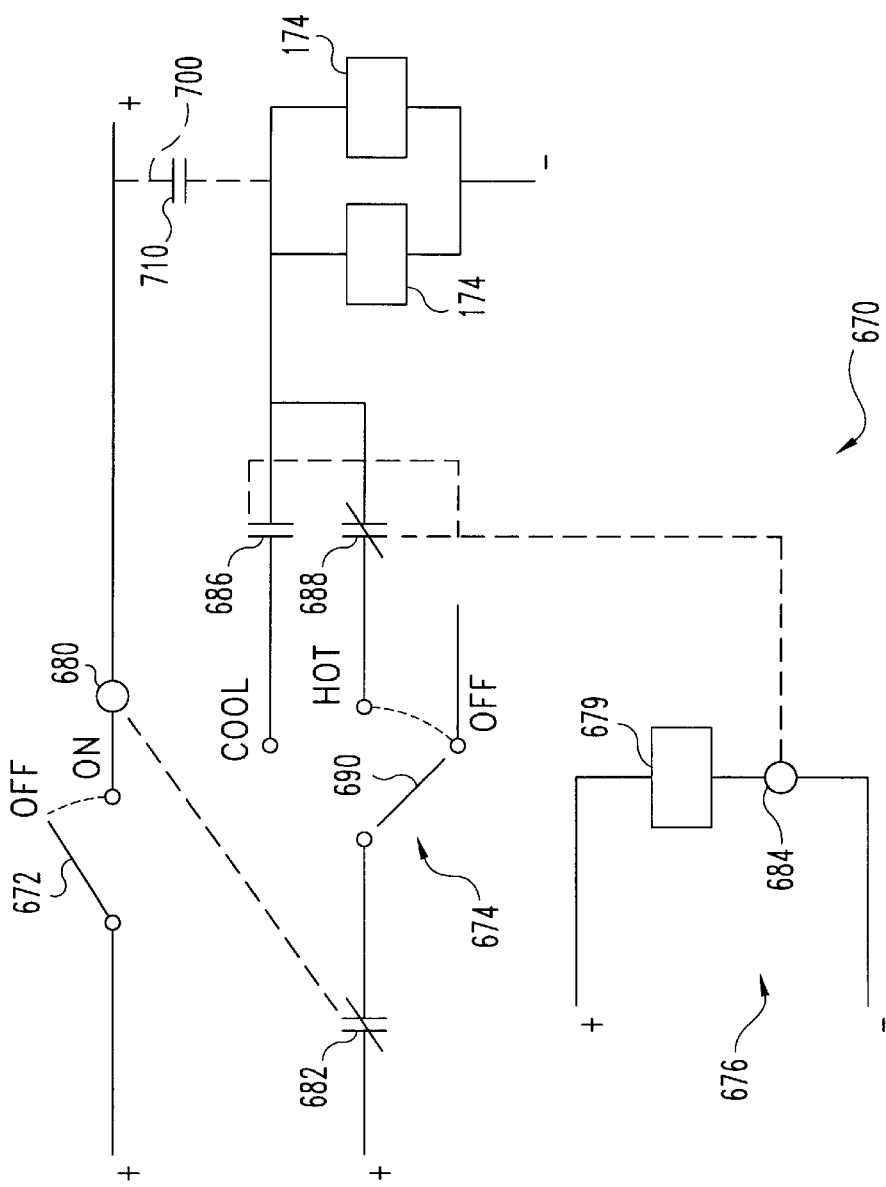
FIG. 15 is a schematic view of discharging control circuit showing an ignition control circuit, a fan control circuit, and a thermostat control circuit.

Discharging control circuit 670 portion of controller 184 is shown in FIG. 15. Discharging control circuit 670 includes an ignition control circuit 672, a fan control circuit 674, and a thermostat control circuit 676 for thermostat 678 operation. Discharging control circuit 670 further includes fans 174, relay 680 having contact 682, relay 684 having contacts 686, 688, and a discharge switch 690.

When the vehicle engine 120 is operating, ignition control circuit 672 energizes relay 680 to open contact 682 and de-energize the fans 174 power supply to ensure there is no air flow past a thermal storage apparatus when the engine 120 is operating. After the engine 120 is turned off, the vehicle operator can select a discharge switch 690 position of OFF, hot, or cool. When the discharge switch 690 is in the OFF position, the fans 174 do not operate.

In some embodiments, such as FIGS. 5–7, the fans 172 operate when the vehicle engine 120 is operating and the thermal energy storage system 112 is charging.

Dashed line 700 with contact 710 represents the modification necessary for an embodiment such as shown in FIGS. 5–7. Contact 710 is operated by a relay (not shown) in hot charge line shown in FIGS. 8–14 to close the contact 710 when the engine 120 is operating and thermal energy storage system 112 is hot charging.

The vehicle operator can set thermostat 678 to a desired vehicle interior temperature during the discharge cycle. When discharge switch 690 is in the cool position and the vehicle interior temperature exceeds the set temperature, a contact in the thermostat 678 closes causing relay 684 to energize to close contact 686 and open contact 688. Current travels through contact 686 so that fans 174 operate to discharge stored low temperature thermal energy into the interior of the vehicle. After the vehicle interior temperature drops below the set point, contact 686 opens and the fans 174 cease operation. When the discharge switch 690 is in the heat position and the vehicle interior temperature is below the set temperature, the contact within thermostat 678 opens causing relay 684 to deenergize and contact 688 to close. Closing contact 688 allows current to flow to fans 174 to discharge the high temperature thermal energy into the vehicle interior. When the vehicle interior temperature rises above the set point, the thermostat 678 energizes relay 684 to open contact 688 to stop operation of the fans 174.

Heat transfer rates may also be controlled by modulating DC voltage to the fans 174 electric motors to change the airflow rate through the fans 174 during both discharge and charge cycles. The fans 174 may be situated in parallel as shown in FIG. 6 or series to control the airflow rate. The temperature difference between the airflow and the PCM may also affect the thermal exchange.

An alternative discharging control circuit includes a thermostat and a charging control circuit with no discharging control circuit. The vehicle operator selects hot, cool, or off for charging the thermal energy storage system 112 and a desired vehicle interior temperature. The fans 174 begin operation when the thermostat for both heat and cool operations detect temperature maintenance is required in the vehicle interior.

A pump 150 circulates the transfer medium within the closed transfer loop 156 to transfer energy between the components 146, 152, 154 in the transfer loop 156. In embodiments of the present invention, such as FIGS. 5, 16–18, 22, and 29, a relay 720 (not shown) activates pump 150 when the vehicle is operating and the charging switch 614 is in the heat or cool position. Also, in embodiments of the present invention, a conventional temperature sensor (not shown) in the transfer loop 156 activates a conventional cut-off switch (not shown) in the pump 150 should the transfer loop 156 exceed predetermined temperature limits. This precautionary deactivation of the pump 150 stops circulation of the transfer medium. In all embodiments of the present invention, the pump 150 is activated when the vehicle is not operating and the discharge switch 614 is in the hot or cool position.

Figure 16:
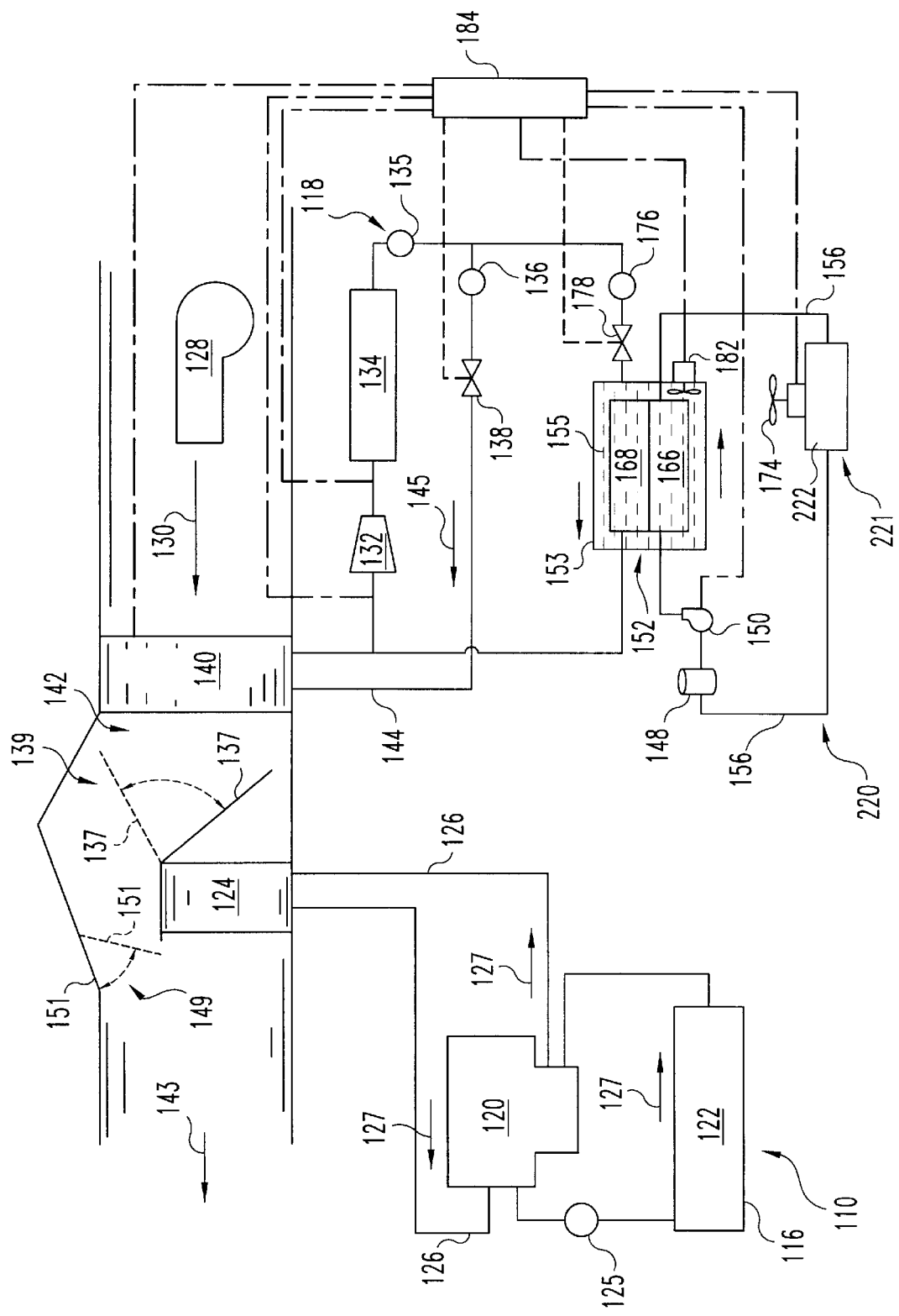
FIG. 16 is a schematic view of another embodiment of a thermal energy storage system integrated into a space conditioning system of a vehicle in accordance with the present invention.

FIG. 16 illustrates a thermal energy storage system 220 used when only cooling is required during engine 120 shut down. Thermal energy storage system 220 illustrated in FIG. 16 is identical in process flow to thermal energy storage system 112 illustrated in FIG. 5 with the exception of no heating capability and therein the absence of a coolant loop 126 connection with the transfer loop 156. Thermal energy storage system 220 does not include a second thermal storage apparatus 154 but instead includes a conventional radiator 221 having a transfer coil 222 and fan 174. The second thermal storage apparatus 154 is not required because the "cool" thermal energy acquired from the air conditioning system 1 8 can be stored in the first thermal storage apparatus 152.

Figure 17:
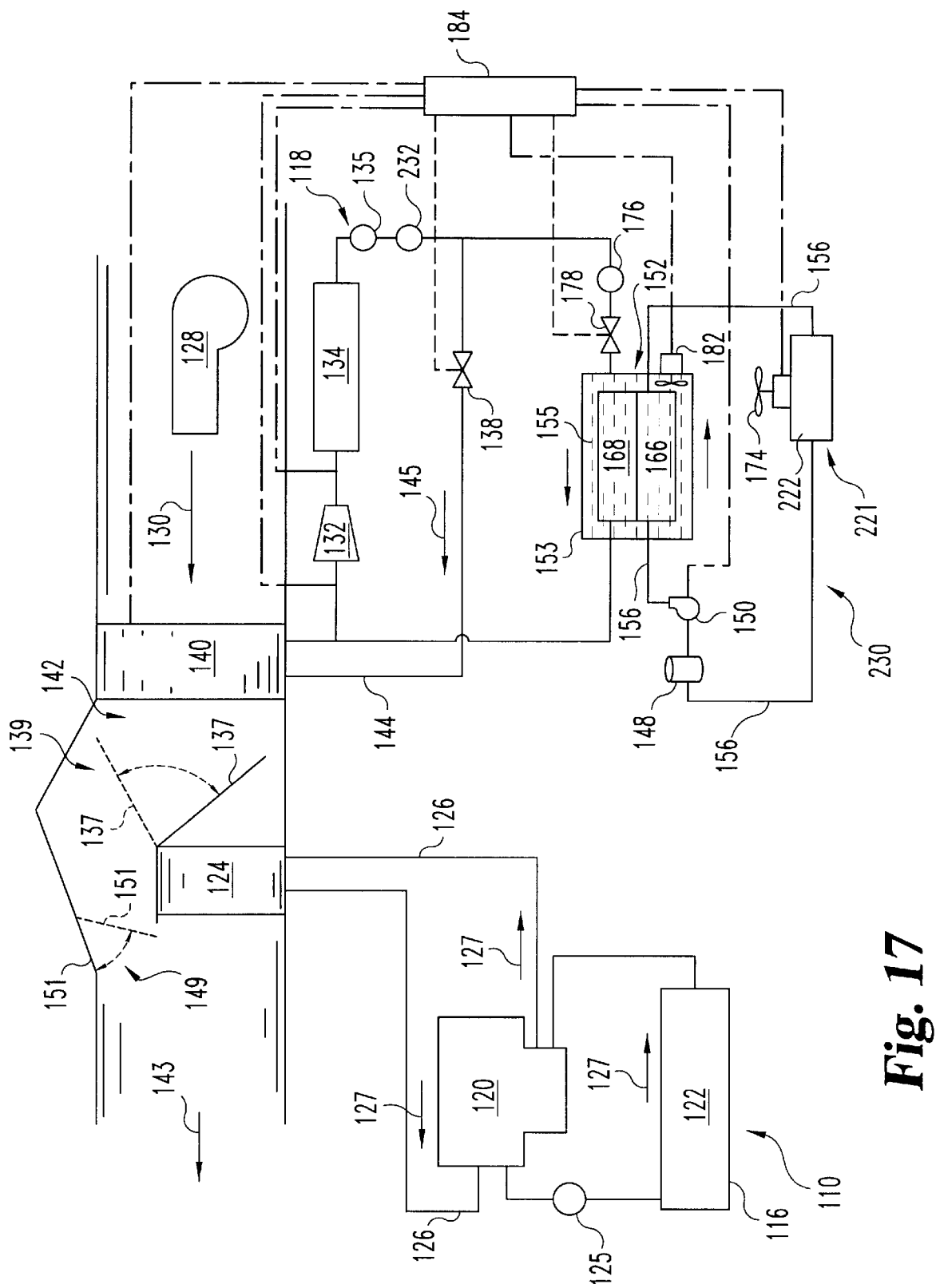
FIG. 17 is a schematic view of yet another embodiment of a thermal energy storage system integrated into the space conditioning system of a vehicle in accordance with the present invention.

Another embodiment similar in concept to FIG. 16 is illustrated in FIG. 17 which discloses thermal energy storage system 230. The embodiment shown in FIG. 17 is identical to that in FIG. 16 except that only one expansion valve 232 is used. This embodiment was previously disclosed as an alternative control means in thermal energy storage system 112.

Figure 18:
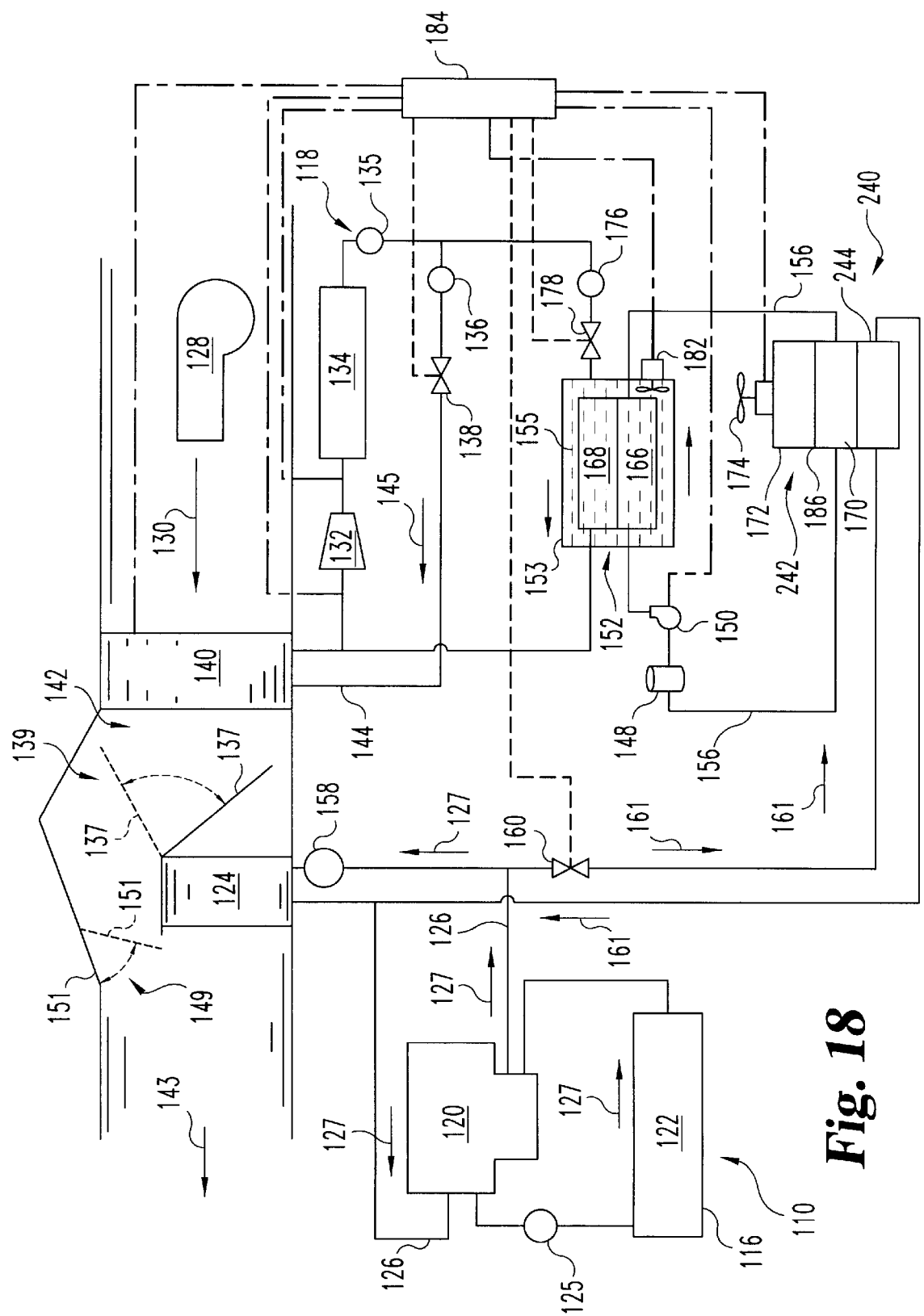
FIG. 18 is a schematic view of yet another embodiment of a thermal energy storage system integrated into a space conditioning system of a vehicle in accordance with the present invention.

Another thermal energy storage system 240 similar in concept to FIG. 5 is shown in FIG. 18. As compared to thermal energy storage system 112 shown in FIG. 5, thermal energy storage system 240 does not include heat exchanger 146 and the coolant loop 126 passes through a different thermal storage apparatus 242. Thermal storage apparatus 242 is identical to thermal storage apparatus 154 shown in FIGS. 5–7 except that thermal storage apparatus 242 further includes a coolant loop side 244 having a coolant coil that exchanges heat with transfer coil 188 in transfer loop side 170. Thus, thermal storage apparatus 242 has a transfer coil 188 and a coolant coil entering and exiting the housing 186. A coil of the type required for this thermal storage apparatus 242 may be purchased from Astro Air in Jacksonville, Tex.

During the heating charge cycle, valve 160 opens to permit coolant flow from the engine 120 to circulate through the coolant loop side 244 of thermal storage apparatus 242. Ambient airflow from the interior spaces of the vehicle is introduced by fan 174 across the coolant coil in coolant loop side 244 to absorb the heating effect from the engine's coolant system 116. The heated airflow is then circulated in and amongst the macro-encapsulated high temperature PCM 172 located within the thermal storage apparatus 242. The higher temperature airflow releases its energy to the PCM in the encapsulated devices 172 prior to its discharge. Once the engine coolant has circulated through the coolant loop side 244 of the thermal storage apparatus 242, it is circulated to the vehicle engine 120 for engine 120 cooling to complete the coolant loop 126.

In contrast to the previous embodiment in FIG. 5, circulation within the transfer fluid loop 156 is not necessary to discharge the thermal energy stored within thermal storage apparatus 242 because there is not sensible energy stored in the first thermal storage apparatus 152. Therefore, initiation of fan 174 to introduce ambient vehicle air across the macro-encapsulated PCM 172 is all that is necessary to release the stored high temperature thermal energy into the spaces to be conditioned.

When the vehicle engine 120 is not operating and warm discharge from the thermal storage apparatus 240 is desired to maintain a warmer environment in the occupied spaces, valve 160 may be closed to minimize heat transfer to the engine's coolant system 116. However, this step is not necessary.

Operation of the cooling mode for thermal energy storage system 240 is identical to that of thermal energy storage system 112 as illustrated in FIG. 5. However, valve 60 should be closed during both charge and discharge cycles to avoid loss of cooling effect to the engine's coolant system 116.

In either mode of operation in thermal energy storage system 240, valves 158, 160 can be opened at any time during the discharge cycle to provide heat to the coolant loop 126. Control of the fan 174, pump 150, solenoid valves 138, 160, 178, and safety switches 628 in thermal energy storage system 240 are similar to that disclosed in thermal energy storage system 112 shown in FIG. 5.

Figure 19:
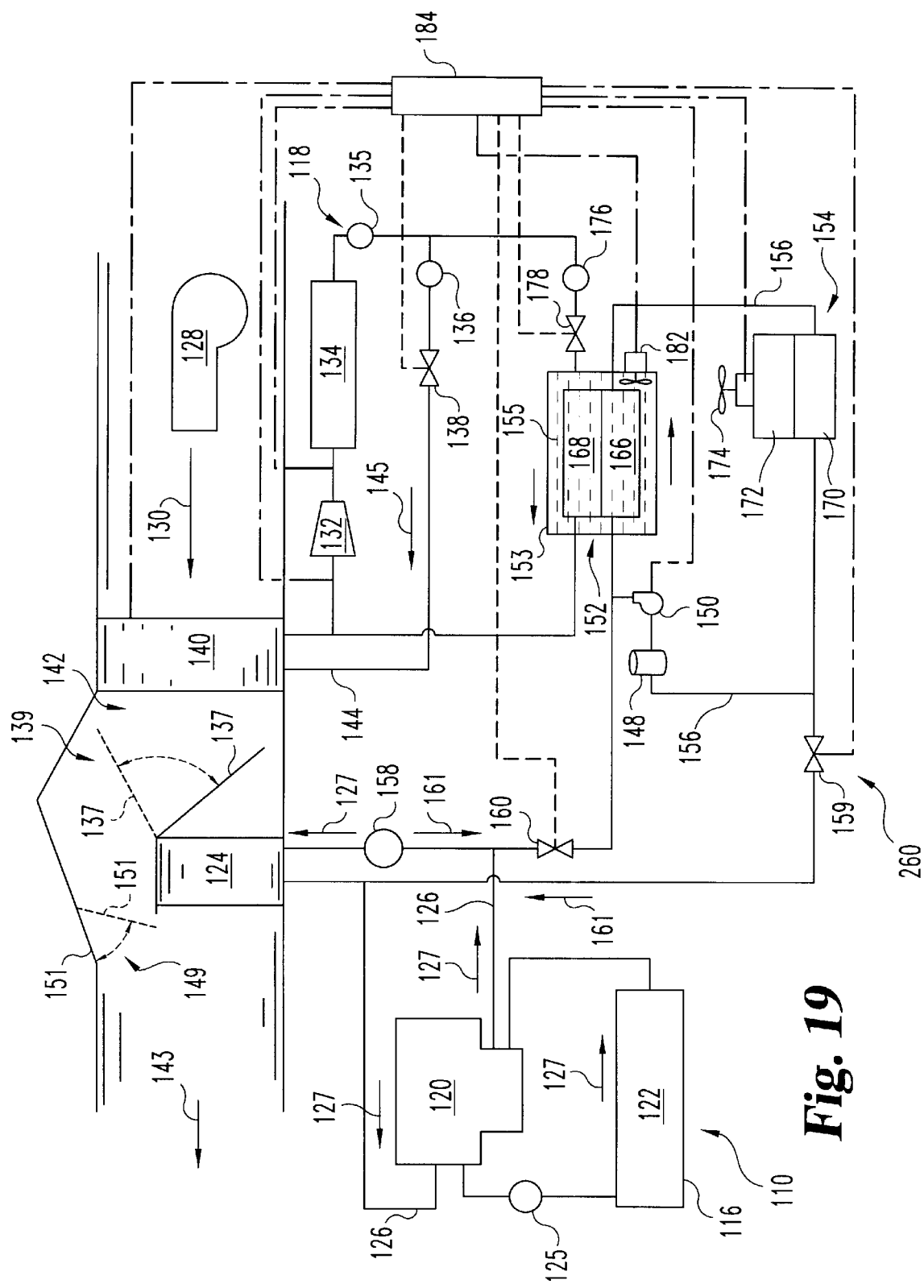
FIG. 19 is a schematic view of yet another embodiment of a thermal energy storage system integrated into the space conditioning system of a vehicle in accordance with the present invention.

A thermal energy storage system 260, similar to thermal energy storage system 112 illustrated in FIG. 5, is shown in FIG. 19. Thermal energy storage system 260 includes thermal storage apparatus 152 and 154 as in thermal energy storage system 112. In fact, thermal energy storage system 260 is identical to thermal energy storage system 112 except that a direct connection between the vehicle's coolant system 116 and the transfer loop 156 is provided.

During the heating charge cycle, valves 160 and 159 open to allow engine coolant under pressure to flow through the transfer loop side 166 in the thermal storage apparatus 152 and the transfer loop side 170 in the thermal storage apparatus 154. This coolant flow provides sensible energy storage in the first thermal storage apparatus 152, as described in the embodiment illustrated in FIG. 5, and sensible and/or latent heat thermal energy storage in the thermal storage apparatus 154, as described in previous embodiments shown in FIGS. 5 and 18.

Pressure from the engine's coolant system 116 may be used to initiate and sustain coolant flow through the transfer loop 156. After the coolant flows through thermal storage apparatus 152 and 154, valve 159, in an open position, permits the coolant to flow to the vehicle engine 120 for engine 120 cooling. During the discharge cycle of the heating mode, valves 159 and 160 are closed and pump 150 is initiated to create closed loop flow through the transfer loop 156. This internal flow through the closed transfer loop 156 provides similar benefits as those described in the previous embodiments including FIG. 5.

Operation of the cooling mode for thermal energy storage system 260 is identical to that of thermal energy storage system 112 illustrated in FIG. 5. However, valves 159 or 160 should be closed during both charge and discharge cycles to avoid a loss of cooling effect to the engine's coolant system 116.

In either mode of operation in the embodiment illustrated in FIG. 19, valves 159 and 160 can be opened at any time during the discharge sequence to provide heating of the battery (not shown), engine 120, engine components, and/or coolant loop 126 from thermal storage. As in the embodiment illustrated in FIG. 5, agitation within first thermal storage apparatus 152 is desired to avoid temperature stratification, material stagnation, and to improve heat transfer.

Figure 20:
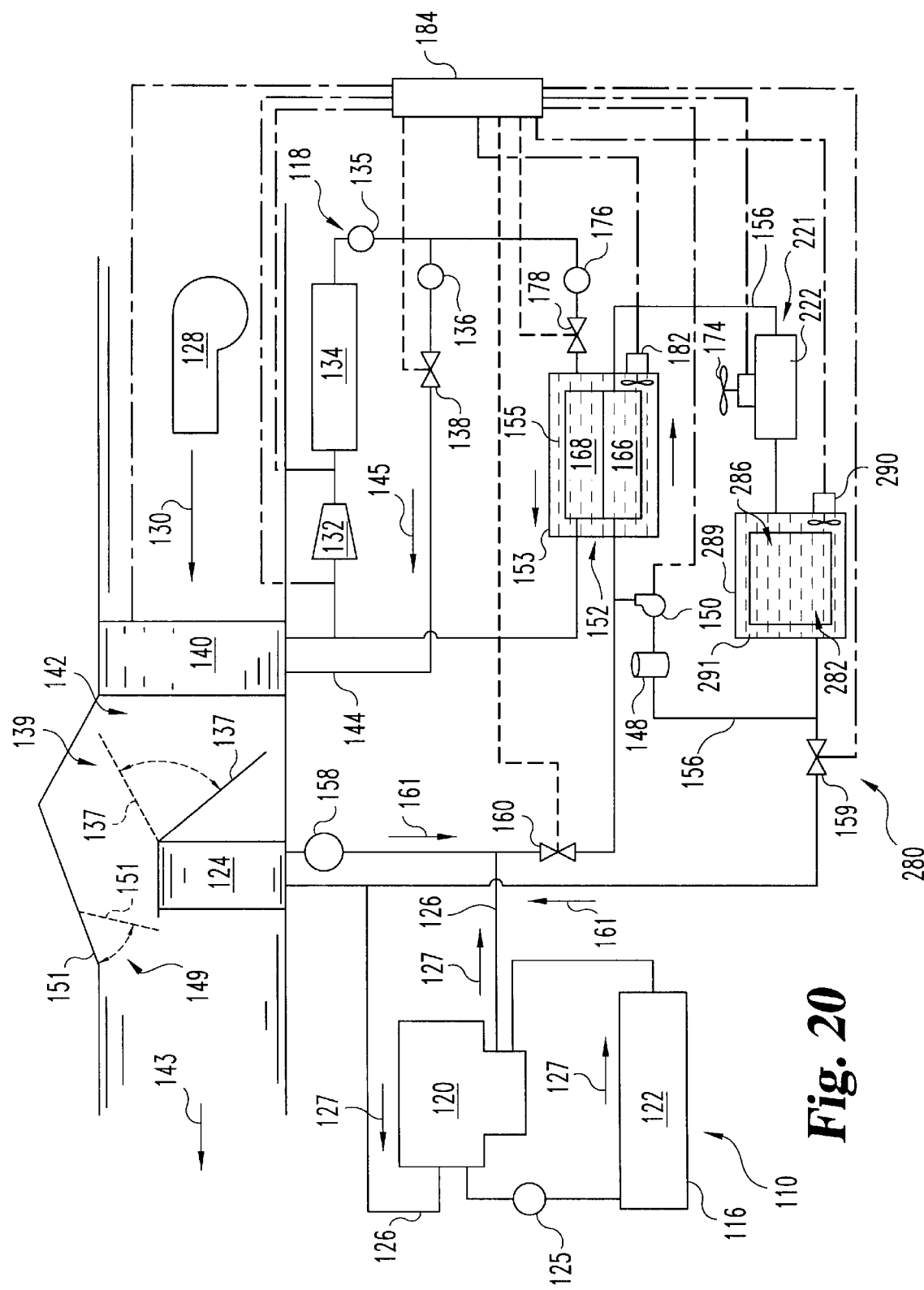
FIG. 20 is a schematic view of yet another embodiment of a thermal energy storage system integrated into the space conditioning system of a vehicle in accordance with the present invention.

An embodiment similar to that illustrated in FIG. 19 is shown in FIG. 20. The embodiment shown in FIG. 20 includes a thermal energy storage system 280 having a thermal storage apparatus 282. The primary difference between the embodiments shown in FIGS. 19 and 20 is associated with the location of the high temperature PCM. In FIG. 20, high temperature PCM 291 is placed in a bulk encapsulation in the thermal storage apparatus 282. The thermal storage apparatus 282 includes a housing 289 containing high temperature PCM 291. A glycol coil 286 is connected to the transfer loop 156 and is placed in direct communication with the PCM 291 contained in the housing 289.

The process flow during the heating charge cycle requires that valves 159 and 160 be open to allow engine coolant under pressure in series or parallel flow to pass through the transfer loop side 166 in thermal storage apparatus 152. The transfer loop side 166 is in direct communication with the low temperature PCM 155 and may provide sensible energy storage within thermal storage apparatus 152 as described I the embodiment illustrated in FIG. 5. The transfer medium in the thermal storage apparatus 152 flows through the transfer loop 156 to the radiator 221 and carries high temperature thermal energy to and through the transfer coil 222 to the glycol coil 286 in thermal storage apparatus 282. The transfer coil 222 does not exchange energy with the transfer loop 156 during this sequence of operation since fan 174 positioned adjacent to transfer coil 222 is not initiated. No significant heat exchange between the ambient air and the transfer coil 222 takes place until the fan 174 is activated The glycol coil 286 within thermal storage apparatus 282 is in direct communication with the bulk high temperature PCM 291. This direct communication provides a very efficient and effective heat transfer between the high temperature transfer medium in the glycol coil 286 and the PCM 291. The transfer medium flows from thermal storage apparatus 282 to the vehicle engine 120 through valve 159.

During the discharge cycle of the heating mode, valves 159 and 160 are closed and pump 150 is initiated to create a closed loop flow through the transfer loop 156. This internal flow through the closed loop provides similar benefits as those described in previous embodiments including that illustrated in FIG. 5

Operation of the cooling mode for thermal energy storage system 280 is identical to that of thermal energy storage system 112 illustrated in FIG. 5 Valves 159 and 160 should be closed during the charge and discharge cycles to avoid loss of cooling effect to the engine's coolant system 116.

In either mode of operation for thermal energy storage system 280 illustrated in FIG. 20, valves 159 and 1670 can be opened at any time during the discharge cycle to provide high temperature thermal energy to the battery (not shown), engine 120, engine components, and/or coolant loop 126 from thermal storage.

Thermal storage apparatus 152 may include agitator 182 and thermal storage apparatus 282 may include a similar agitator 290. The agitators 182, 290 are provided to avoid temperature stratification, material stagnation, and to improve heat transfer in the thermal storage apparatus 152, 282.

Figure 21:
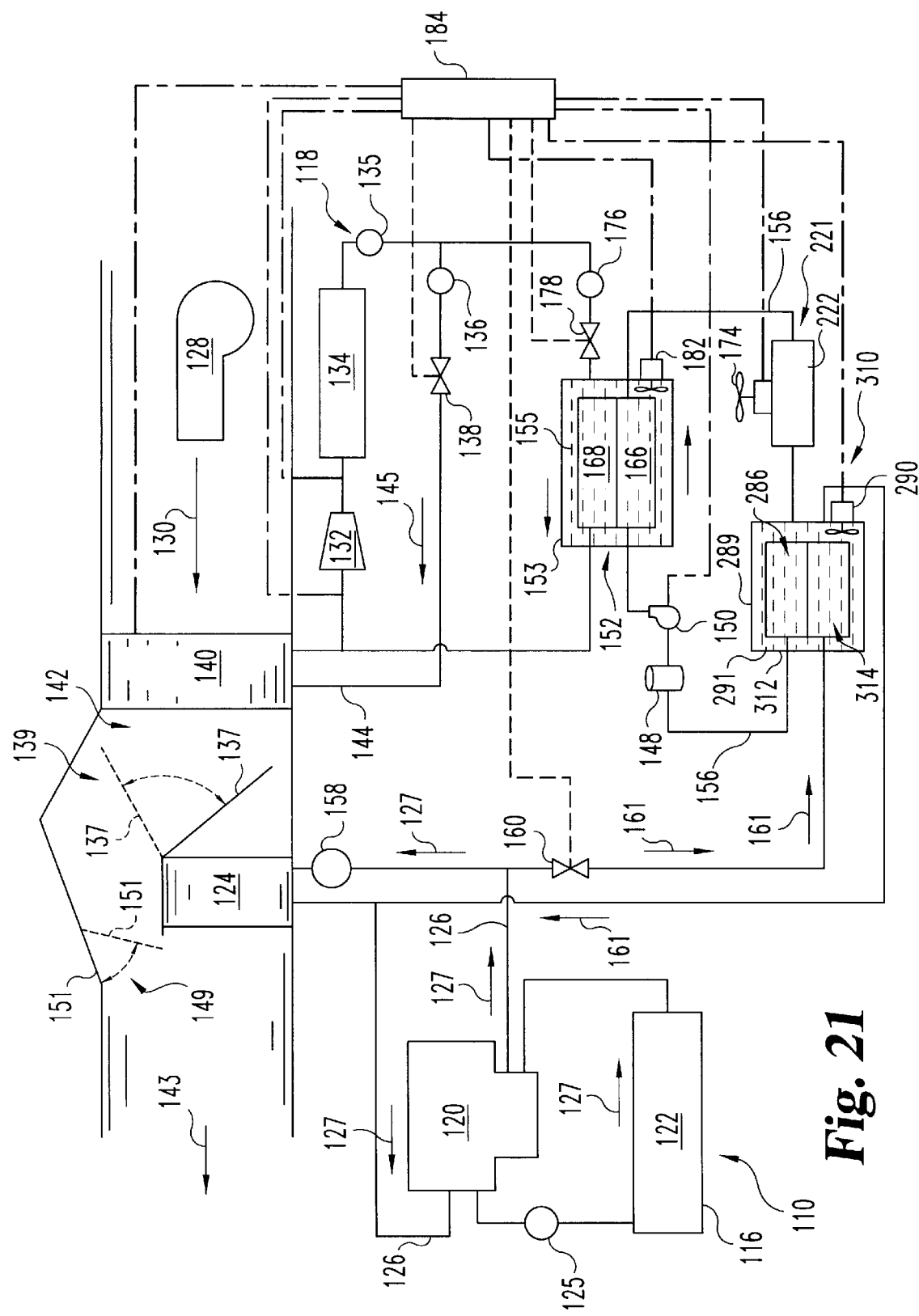
FIG. 21 is a schematic view of yet another embodiment of a thermal energy storage system integrated into the space conditioning system of a vehicle in accordance with the present invention.

Another embodiment of the present invention including thermal energy storage system 310 is illustrated in FIG. 21.

Thermal energy storage system 310 includes a thermal storage apparatus 312 that houses high temperature PCM 291. The thermal storage apparatus 312 is identical to thermal storage apparatus 282 shown in FIG. 20 except that a coolant loop side 314 enters the housing 289 along with the glycol coil 286. A valved loop from the engine's coolant system 116 is circulated in series or parallel through the coolant loop side 314 of thermal storage apparatus 312 in direct contact with the high temperature phase change material 291. This phase change material 291 absorbs the heat flux provide by the engine's coolant as it circulates through the coolant loop side 314. This high temperature coolant circulation is initiated during engine 120 operation in cold weather environments. The thermal energy transfer procedure continues, with valve 160 open, until engine 120 shutdown.

The thermal energy provided to thermal storage apparatus 312 can be circulated through transfer loop 156 to thermal storage apparatus 152, which is normally used for cool storage, for additional sensible energy storage capability if desired. The discharge flow of the transfer medium from the thermal storage apparatus 312 proceeds through expansion tank 148 and pump 150 before reaching thermal storage apparatus 152.

Thermal energy storage system 310 further includes radiator 221 that receives the transfer medium discharged from thermal storage apparatus 152. The transfer coil 222 and fan 174 function as a heat exchanger in the discharge sequence of both the heating and cooling modes. When the fan 174 is not in operation, no significant heat exchange occurs between the transfer medium contained in the transfer loop 156 and the ambient interior vehicle conditions. Therefore, flow of transfer medium through the transfer coil 222 in the heating or cooling charge cycles does not result in significant thermal energy losses and the transfer medium returns to the thermal storage apparatus 312 for continued circulation.

When the engine 120 is turned off and space heating is required, the transfer loop 156 of thermal energy storage system 310 can be initiated independent of the vehicle's coolant system 116 with the activation of pump 150. Valve 160 may be closed to isolate the transfer loop 156 from the engine coolant system 116 if desired. Transfer medium flowing through the transfer loop side 286 of thermal storage apparatus 312 initiates a heat exchange between the high temperature thermal energy stored in thermal storage apparatus 312 and the lower temperature transfer medium. The transfer medium absorbs the high temperature thermal energy and circulates through expansion tank 148 and pump 150 into thermal storage apparatus 152 where additional thermal energy, if previously stored sensibly, can be obtained. The circulation of the transfer medium through the transfer loop side 166 in thermal storage apparatus 152 proceeds to the radiator 221 where the activation of fan 174 discharges the high temperature heat flux within the transfer medium into the interior space of the vehicle. Flow of transfer medium through the transfer coil radiator 221 and back to thermal storage apparatus 312 completes the circulation transfer loop 156.

Because the engine 120 typically is not operating during the discharge mode, coolant flow to the engine 120 will not be activated, therefore minimal heat transfer will take place between the high temperature PCM 291 in thermal storage apparatus 312 and the vehicle's engine 120. However, the vehicle's coolant loop 126 can be initiated to transfer thermal energy to the battery (not shown), engine 120, engine component(s), and coolant system 116, either prior to or immediately upon engine 120 start-up.

Charging of the cool storage phase change material during engine 120 operation for thermal energy storage system 310 is identical to that previously disclosed in thermal energy storage system 112 illustrated in FIG. 5. The heat exchange through the refrigerant loop side 168 in thermal storage apparatus 152 is used to store cool thermal energy in the low temperature phase change material 155. Closing valve 160 isolates the thermal energy storage system 310 and insures no communication between the vehicle's coolant system 116 and transfer loop 156.

When recovery of cooled thermal energy from thermal storage apparatus 152 is desired, pump 150 is activated to initiate the flow of transfer medium through the closed transfer loop 156 circulation system. The transfer medium proceeds through the transfer loop side 166 within thermal storage apparatus 152 to exchange thermal energy and absorb the cool thermal energy from the low temperature phase change material 155. The cooled transfer medium then proceeds out of transfer storage device 152 and into the transfer coil 222 of radiator 221 where fan 174 creates a forced airstream across the transfer coil 222. An exchange of thermal energy between the warmer ambient interior vehicle air and cooler transfer medium flowing through the transfer coil 222 occurs to cool the airstream. The cooled airstream is then discharged into the interior spaces of the vehicle. The transfer medium proceeding out of the transfer coil 222 flows in the closed transfer loop 156 through thermal storage apparatus 312. It is not anticipated that thermal storage apparatus 312 will contribute thermal energy storage in this cooling scheme, due to its location in the process flow, unless pump 150 is initiated during the cooling charge sequence to create transfer medium flow out of thermal storage apparatus 152.

Thermal storage apparatus 312 further includes agitator 290. The agitators 182 and 290 may be provided to avoid stratification of temperatures and material stagnation and to improve heat transfer within the respective phase change materials 155, 291 as they are being charged and discharged.

Figure 22:
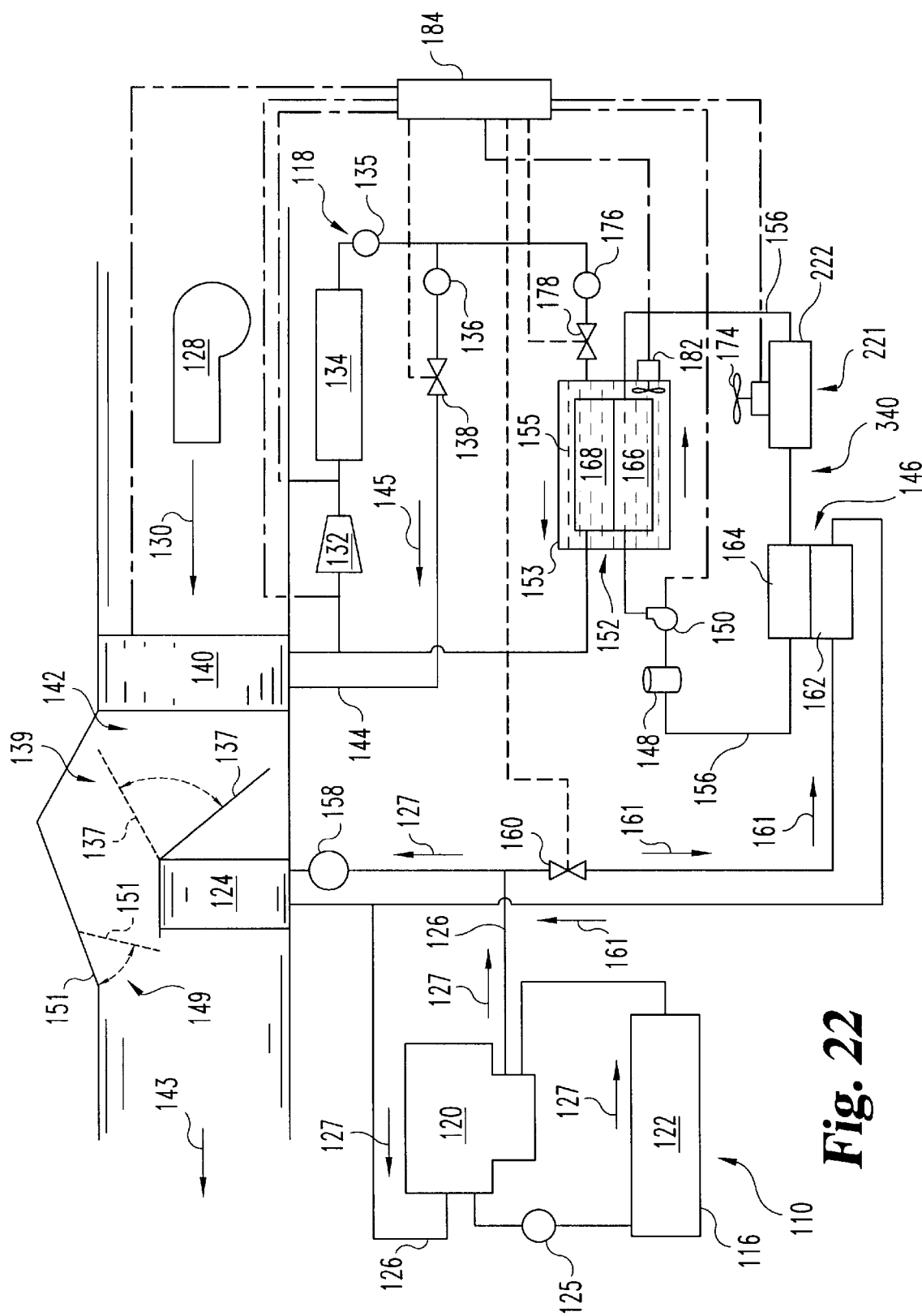
FIG. 22 is a schematic view of yet another embodiment of a thermal energy storage system integrated into the space conditioning system of a vehicle in accordance with the present invention.

Another embodiment of the invention having a similar process flow as that illustrated in FIG. 21 is shown in FIG. 22. FIG. 22 illustrates a thermal energy storage system 340. The primary difference between the embodiments illustrated in FIGS. 21 and 22 is that thermal storage apparatus 312 of thermal energy storage system 310 shown in FIG. 21 is replaced with conventional heat exchanger 146 in thermal energy storage system 340. Heat exchanger 146 does not store thermal energy nor does it contain phase change materials. In thermal energy storage system 340, the phase change material 155 in thermal storage apparatus 152 is used for both heating and cooling modes. The function of thermal storage apparatus 152 as a multiple temperature thermal storage apparatus was previously disclosed in thermal energy storage system 112 shown in FIG. 5. In thermal energy storage system 112, thermal storage apparatus 152 functioned as a supplemental thermal storage apparatus in high temperature storage operations and a primary storage device in cool storage operations. The utilization of a single contained PCM 155 as shown in FIG. 22 greatly simplifies the operation and maintenance aspect of the thermal energy storage system 340 since focus can now be directed to a single thermal storage apparatus 152.

With valve 160 open, the heating charge cycle for thermal energy storage system 340 process with a liquid/liquid heat exchange between the transfer loop side 164 and coolant loop side 162 in heat exchanger 146. The heat exchange results in the thermal energy of the engine coolant being displaced into the transfer medium in transfer loop 156. The transfer medium circulates from heat exchanger 146 through pump 150 to thermal storage apparatus 152. Within thermal storage apparatus 152, the transfer loop side 166 is in direct contact with the sole phase change material 155 to exchange heat between the transfer medium and phase change material 155.

When engine 120 is shutdown and heat discharge is required, pump 150 is activated and the transfer medium within the closed transfer loop 156 is cycled through the transfer loop side 166 in thermal storage apparatus 152. A heat exchange between the transfer medium and phase change material 155 increases the temperature of the transfer medium prior to its circulation of radiator 221. Fan 174 draws lower temperature ambient vehicle air over the transfer coil 222 to produce heated air that is discharged into the interior spaces of the vehicle. The transfer fluid, now depleted of its higher temperature thermal value, flows through heat exchanger 146, pump 150, and expansion tank 148 for continuing circulation.

The cooling charge and discharge cycles, requiring the closing of valve 160, are identical to those disclosed in previous embodiments with the exception that the refrigerant loop side 168 of thermal storage apparatus 152 provides its energy to the same phase change material 155 used during the heating charge and discharge cycles. The agitation within thermal storage apparatus 152 remains active during both charge and discharge cycles of all modes to prevent temperature stratification and stagnation of the phase change material 155 and to improve heat transfer.

Figure 23:
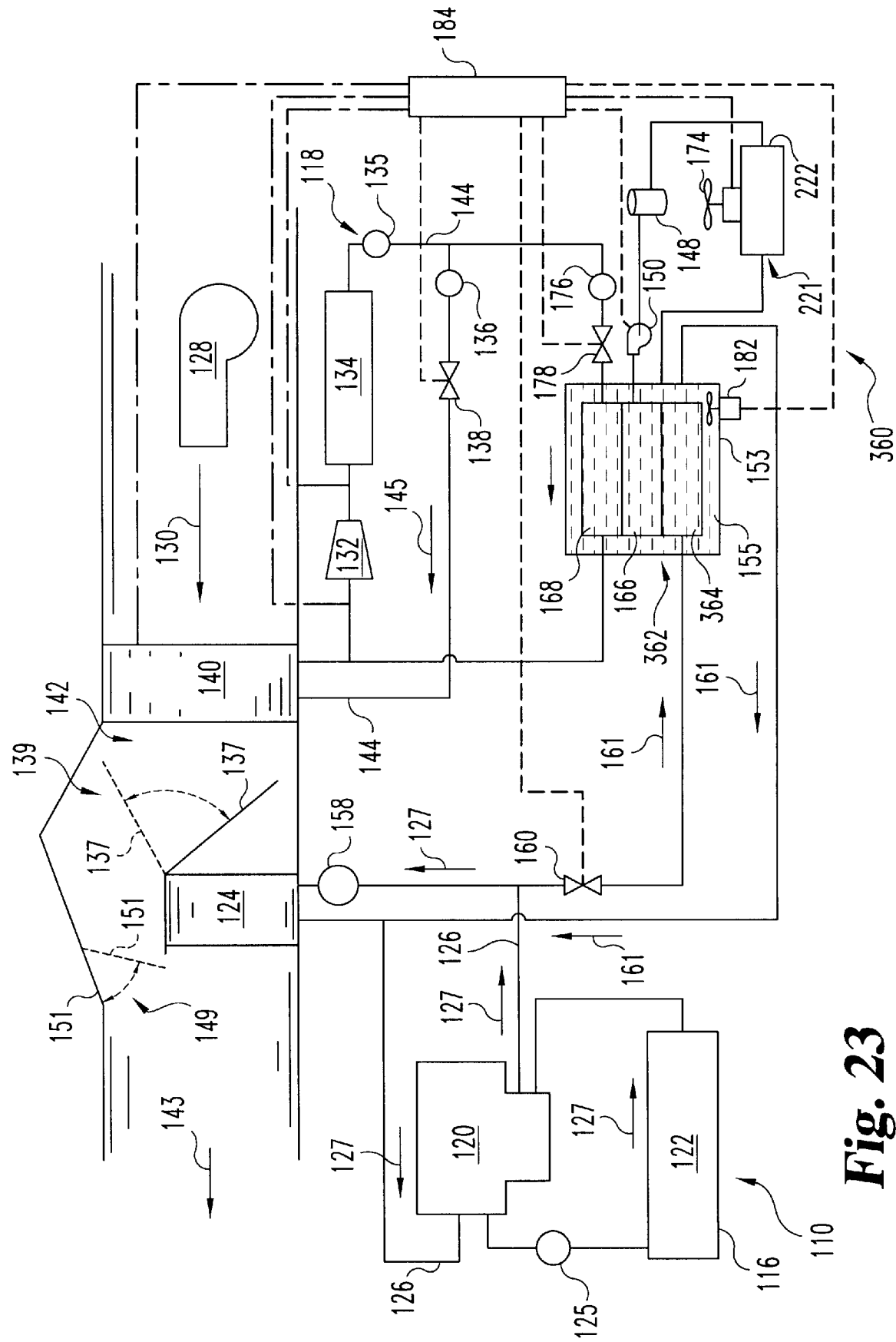
FIG. 23 is a schematic view of yet another embodiment of a thermal energy storage system integrated into the space conditioning system of a vehicle in accordance with the present invention.

Another embodiment of the invention is illustrated in FIG. 23. FIG. 23 illustrates thermal energy storage system 360 which utilizes a single phase change material 155 for both high temperature and low temperature applications in a single thermal storage apparatus 362. The thermal storage apparatus 362 is identical to thermal storage apparatus 152 except that a coolant loop side 364 passes through the housing 153 in contact with the PCM 155.

The coolant loop side 364 includes a coolant coil, the transfer loop side 166 includes a glycol coil, and the refrigerant loop side 168 includes a direct expansion coil. A coil configuration as required for this embodiment of the present invention can be purchased from Astro Air in Jacksonville, Tex.

Consistent with that previously disclosed, engine coolant is circulated to thermal storage apparatus 362 through the coolant loop 126 with the opening of valve 160. The high temperature engine coolant circulates through the coolant loop side 364 located in direct contact with the single phase change material 155 housed in thermal storage apparatus 362. The coolant continues to circulate from the thermal storage apparatus 362 back into the engine's coolant system 116 to complete the coolant loop 126. The thermal energy absorbed into the phase change material 155 is retained until heating is required when the engine 120 is not operating.

During high temperature discharge, the transfer loop 156 containing the transfer medium is initiated by pump 150. Pump 150 propels the transfer medium within the closed transfer loop 156 through the transfer loop side 166 of thermal storage apparatus 362 in direct contact with the phase change material 155 in thermal storage apparatus 362. The transfer medium flowing through the thermal storage apparatus 362 absorbs heat flux from storage and carries it to radiator 221 located within the confines of the interior space of the vehicle to be conditioned. Fan 174 creates an airflow across the transfer coil 222 to draw the high temperature thermal effect out of the transfer medium in a heat exchange with ambient air from the vehicle interior space. The transfer medium cycles back to the expansion tank 148 and pump 150 to continue its circulation.

The cooling configuration is identical to the previous embodiments wherein the refrigerant loop side 168 of the thermal storage apparatus 362 is plumbed in parallel to the existing liquid refrigerant line 144. Also valve 160 is closed to isolate the transfer loop 156 from the engine coolant system 116. As similarly disclosed previously in thermal energy storage system 340 shown in FIG. 22, in thermal energy storage system 360 the refrigerant loop side 168 is located in direct contact with a single phase change material 155 within thermal storage apparatus 362.

Upon the cooling charge cycle being completed, the cooling effect stored in thermal storage apparatus 362 can be recovered by initiating transfer medium flow through the closed transfer loop 156 as disclosed above for the heating discharge cycle. The flow of transfer medium through pump 150 and into the transfer loop side 166 of thermal storage apparatus 362 provides a heat exchange interface with the cooled PCM 155 to lower the temperature of the transfer medium prior to its exit and circulation to the radiator 221. This low temperature transfer medium circulates through the transfer coil 222 and is exposed to a fan induced airflow by fan 174. The airflow is drawn across transfer coil 222 to release the cooled thermal energy in the transfer medium to the interior space of the vehicle. The transfer medium then completes its cycle through expansion tank 148 and pump 150 for continued circulation.

As previously disclosed in other embodiments, circulation of the coolant loop 126 through thermal storage apparatus 362 can be used to heat or cool the engine 120, battery (not shown), and associated engine components either prior to starting or immediately upon start-up or under heavy load condition of the engine 120. Agitation in thermal storage apparatus 362 by agitator 182 may be maintained in all modes during the charge/discharge cycles to prevent temperature stratification and stagnation of the phase change material 155, as well as to improve heat transfer.

Figure 24:
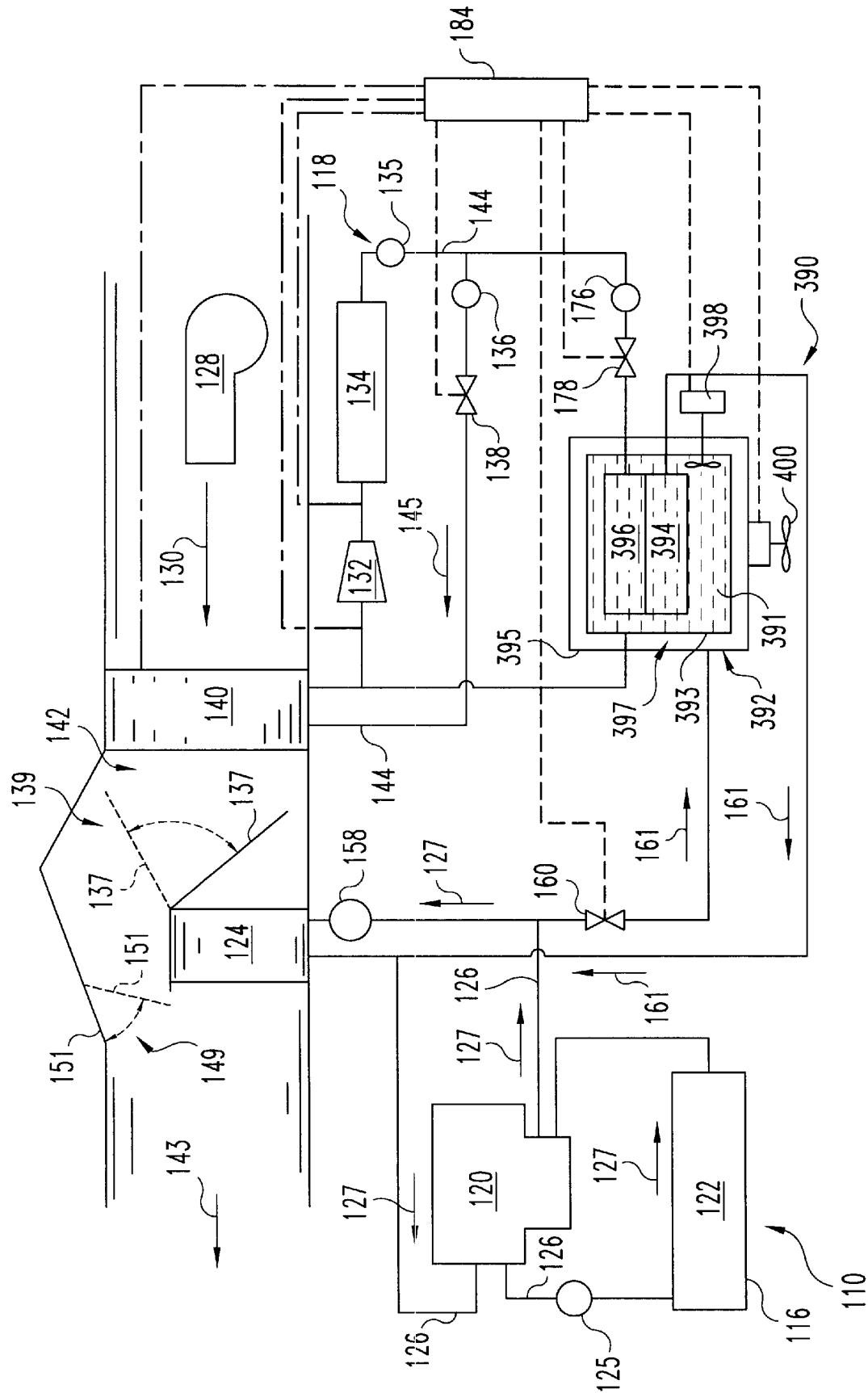
FIG. 24 is a schematic view of a presently preferred embodiment of a thermal energy storage system integrated into the space conditioning system of a vehicle in accordance with the present invention.

A preferred embodiment of the present invention is illustrated in FIG. 24. A thermal energy storage system 390 shown in FIG. 24 includes thermal storage apparatus 392 having a coolant loop side 394, a refrigerant loop side 396, and an optional agitator 398. Thermal energy storage system 390 shown in FIG. 24 is similar in components and operation to thermal energy storage system 360 shown in FIG. 23 with the engine coolant used as a high temperature charging source and the refrigerant used as a low temperature charging source to a single phase change material 391 within thermal storage apparatus 392. In preferred embodiments of the preset invention, the single PCM 391 used in thermal energy storage system 390 is water. The primary difference between thermal energy storage system 360 and thermal energy storage system 390 is that the heat exchange process for the thermal energy discharge in thermal energy storage system 390 utilizes a convection airflow through thermal energy storage apparatus 392 during the discharge cycle. A fan 400 situated adjacent to the thermal storage apparatus 392 creates the airflow through the thermal storage apparatus 392 during the discharge cycles.

Figure 25:
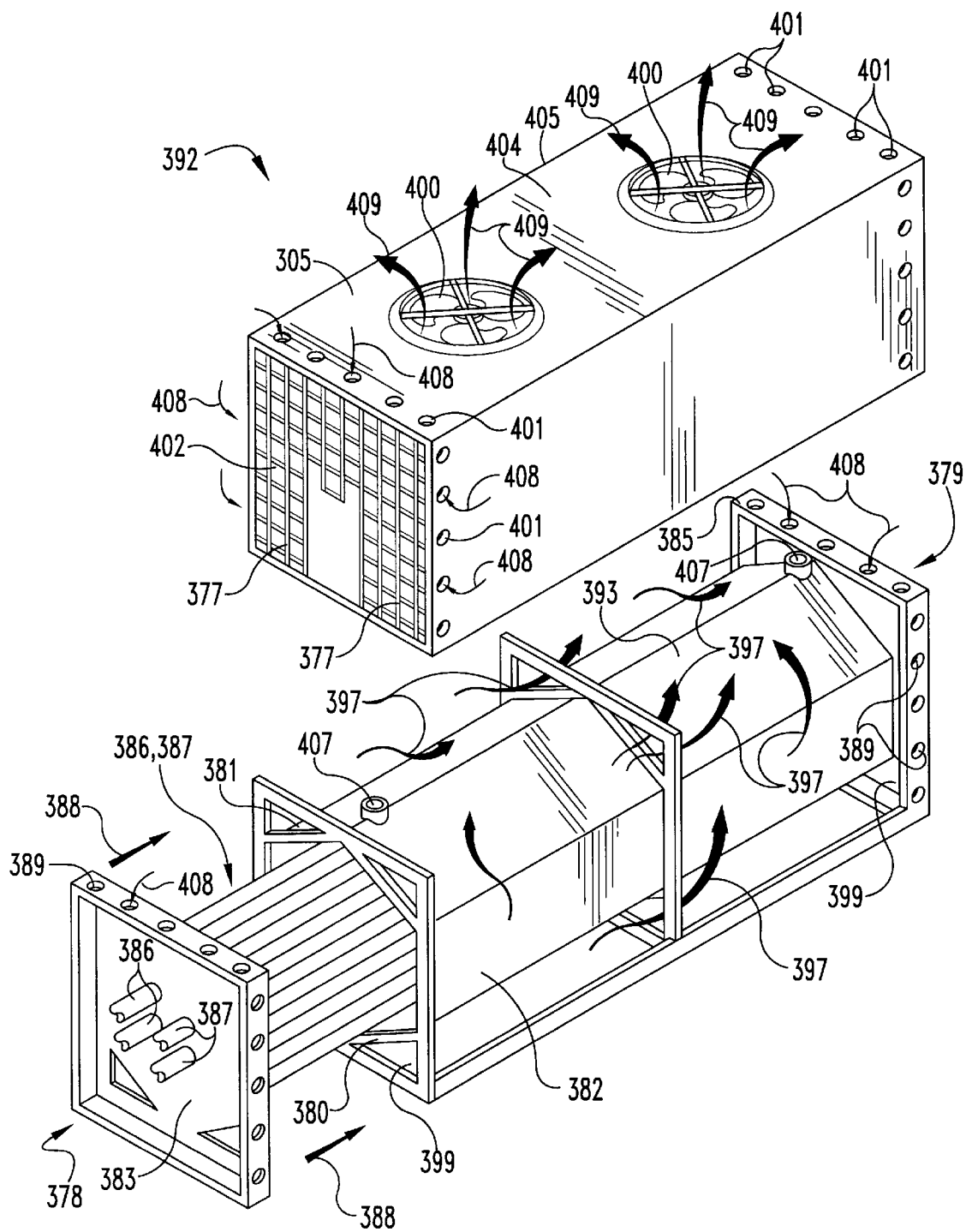
FIG. 25 is an exploded perspective view of an embodiment of a thermal storage apparatus containing PCMs in accordance with the present invention for use in the thermal energy storage system shown in FIG. 24.

A preferred embodiment of thermal storage apparatus 392 is illustrated in FIG. 25. Thermal storage apparatus 392 further includes a first housing 393 containing the PCM 391 and a second housing 395 covering the first housing 393. In preferred embodiments, the second housing 395 is made of metal or plastic. A plastic second housing 395 is lightweight and provides an insulation barrier for the PCM 391 contained in first housing 393.

The first housing 393 includes end walls 383, 385 and the second housing 395 includes end walls 402, 403, top wall 404, and side walls 405, 406. A gap 397 between the first housing 393 and the second housing 395 side walls 405, 406 and top wall 404 forms an airflow passageway 397 through which the airflow travels. In addition first and second plenums 378, 379 are situated on the ends of the thermal storage apparatus 397 with the first plenum 378 being between end wall 402 and end wall 383 and the second plenum 379 being between end wall 403 and end wall 385.

The fans 400 are contained in the top of the second housing 395. The fans 400 draw airflow from the interior of the vehicle through triangular-shaped openings 399 situated at the bottom of the first housing 393. The first housing 393 has a hexagonal-shaped cross section having a bottom V-shaped cross-section 380, a top V-shaped cross-section 381, and a rectangular-shaped cross-section 382 between the top and bottom V-shaped cross-sections 380, 381. The V-shaped cross-sections 380, 381 advantageously direct airflow and provide a larger surface area for the airflow to contact the PCM-containing first housing 393. The cross-sectional shape of the first housing 393 also permits the first housing 393 to expand due to forces created during the melting or freezing of the PCM 391. In alternative embodiments of the present invention, other cross-sectional shapes may be used.

In preferred embodiments of the present invention, the refrigerant loop side 396 includes a direct expansion coil 386 and the coolant loop side 394 includes a coolant coil 387. These coils 386, 387 are placed within the first housing 393 in direct contact with the PCM 391.

The coils 386, 387 exit the first housing 383 through end wall 383. The coils 386, 387 are assembled within the first housing 393 by fixing the coils 386, 387 to end wall 383, sliding the first end 383 in direction 388 toward flange 376, and attaching end wall 393 to the flange 376. In alternative embodiments of the present invention, the coils 386, 387 may be installed by assembling the first housing 393 except for the top V-shaped cross-section 381, placing the coils 386, 387 within the first housing 393, and then welding the top V-shaped cross-section 381 onto the rectangular-shaped cross-section 382.

The end walls 383, 385 include apertures 389. Similar apertures 402 are situated on the end walls 402, 403 of second housing 395 so that when the second housing 393 is placed over the first housing 393 the apertures 389, 401 line up to allow air flow into the first and second plenums 378, 379 in direction 408. A grid of open passageways 377 is formed in end walls 402, 403 to also allow air flow into plenums 378, 379.

Regardless of the discharge mode, a convective airflow is created through the airflow passageway 397 of thermal storage apparatus 392 by the fans 400 to transfer the energy from the phase change material 391 within thermal storage apparatus 392 to the passing airflow. The inlet airflow with the ambient interior vehicle conditions enters the thermal storage apparatus 392 through apertures 389, 401 and passageways 377 and flows through the plenums into the triangular-shaped openings 399. The air flow continues through the air flow passageway 397 where it is in direct contact with first housing 393 for heat exchange with the PCM 391 and discharged back into the interior space of the vehicle in direction 409 to provide temperature maintenance. The interior and exterior surfaces of the first housing 393 may be constructed to enhance heat transfer and turbulize airflow with fins, corrugations, structural ribbing, etc.

Spaced apart vents 407 are situated on the top V-shaped section 381. These vents 407 relieve pressure created in the first housing 393 due to the expansion of the PCM as it changes phases and temperatures. The vents 407 are spaced apart so that pressure can be relieved even when the thermal storage apparatus 392 is tilted. In addition, the PCM 391 can be loaded into the first housing 393 through the vents 407. The vents 407 can be connected together to have a single vent (not shown) to prevent the PCM 391 from spilling out of the first housing 393 when the thermal storage apparatus 392 is tilted.

Figure 26:
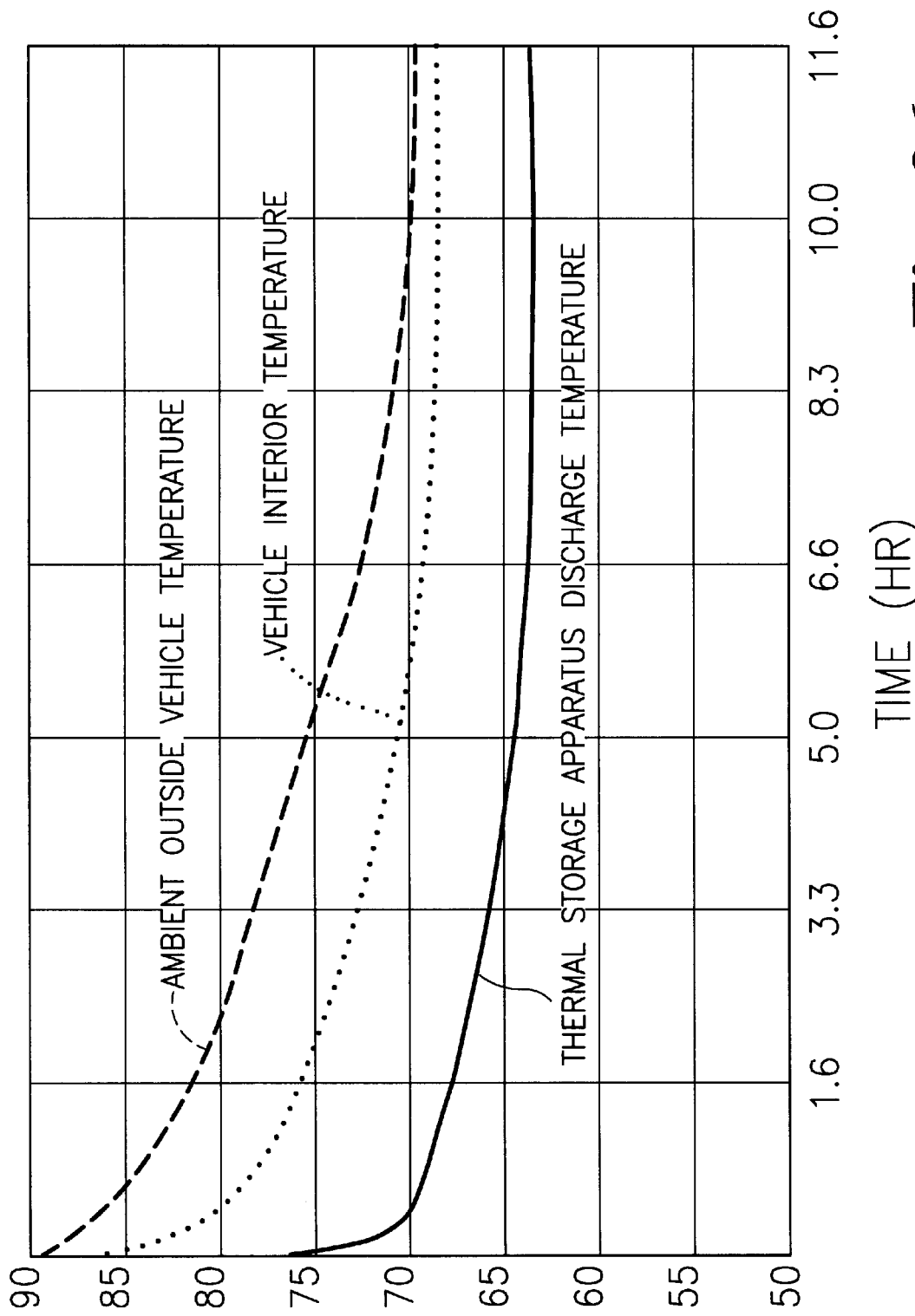
FIG. 26 is a plot of temperature versus time showing performance of the thermal storage apparatus of FIG. 25.

An example of the operation of thermal storage apparatus 392 in accordance with the present invention is illustrated in FIG. 26. A thermal storage apparatus was installed in the sleeping compartment of a truck and allowed to discharge cool thermal energy into the interior of the truck over a period of time. As FIG. 26 illustrates, the thermal storage apparatus 392 cooled the interior of the truck over a long period of time. In addition, the thermal storage apparatus 392 cooled the vehicle interior to compensate for the heat put out by the vehicle occupant sleeping in the vehicle.

In preferred embodiments, the PCM 391 is water. When the PCM 391 is water, approximately 45 minutes of continuous cool charging builds enough ice to keep the vehicle occupant cool all night. Also, if the PCM 391 is water, it takes approximately one hour to heat the PCM 391 to 170° F which is hot enough to keep the vehicle occupant warm all night.

As discussed previously, coolant circulation through the phase change material 391 within thermal storage apparatus 392 can be initiated, either prior to or immediately upon engine 120 start-up, to condition the engine 120, battery (not shown) and engine components prior to operating temperatures being obtained.

The thermal storage apparatus 392 is designed to fit into a vehicle. More specifically, thermal storage apparatus 392 is designed to be fixed to the bunkpan in a conventional or cabover truck cab.

Figure 27:
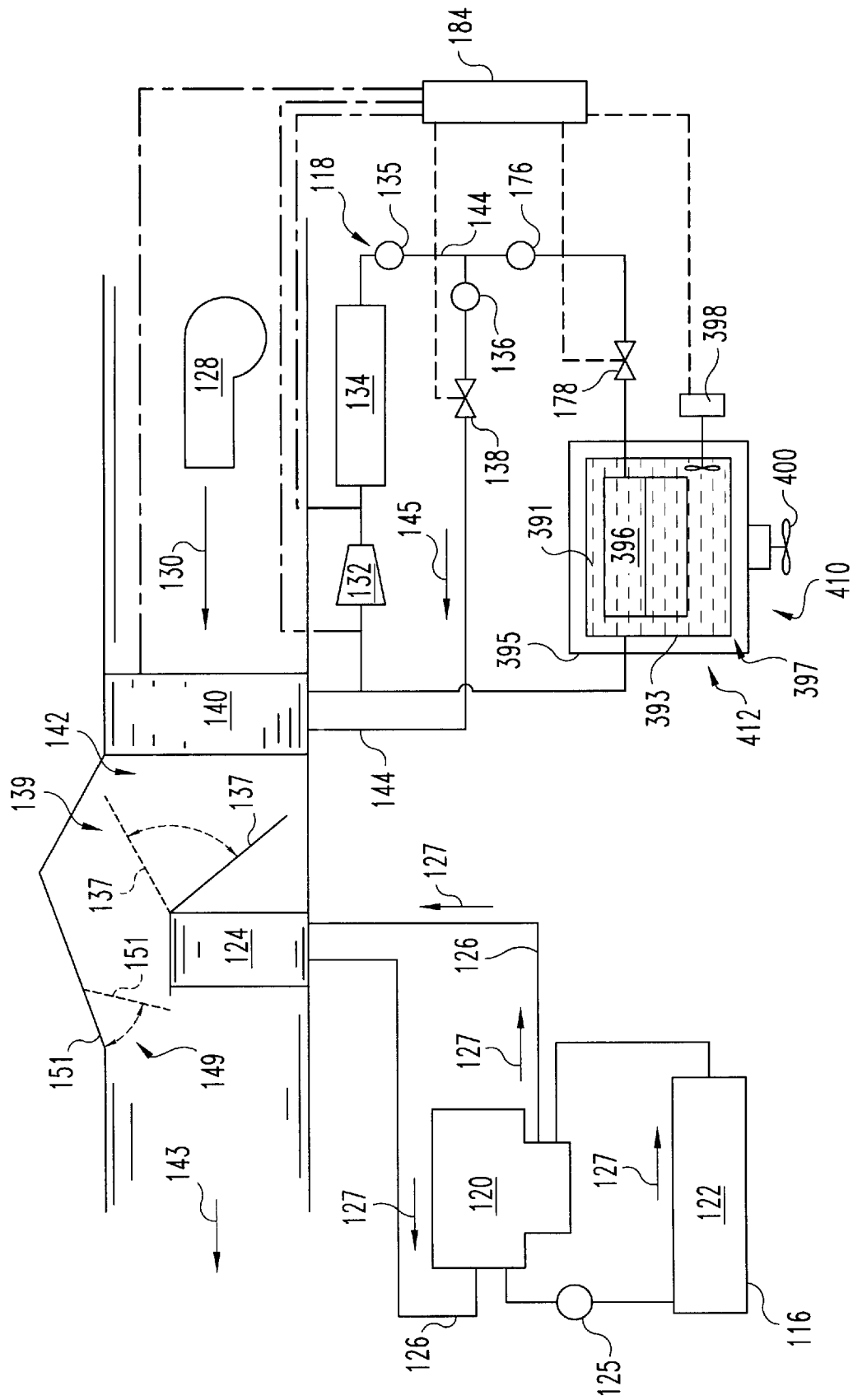
FIG. 27 is a schematic view of yet another embodiment of a thermal energy storage system integrated into the space conditioning system of a vehicle in accordance with the present invention.

Another embodiment of the present invention illustrated in FIG. 27 further elaborates on thermal energy storage system 390 illustrated in FIG. 24 by providing thermal energy storage system 410 having a cooling only designation. Thermal storage apparatus 410 includes a thermal storage apparatus 412 that is identical to thermal storage apparatus 392 except that a coolant loop side 394 does not pass through thermal storage apparatus 412. The refrigerant loop side 396 is in direct contact with phase change material 391 housed in thermal storage apparatus 412. As in thermal energy storage system 390 illustrated in FIG. 24, a forced airflow around an exterior surface of the first housing 393 by fan 400 develops a transfer heat with the PCM 391 to discharge cooled air into the ambient interior spaces of the vehicle.

Figure 28:
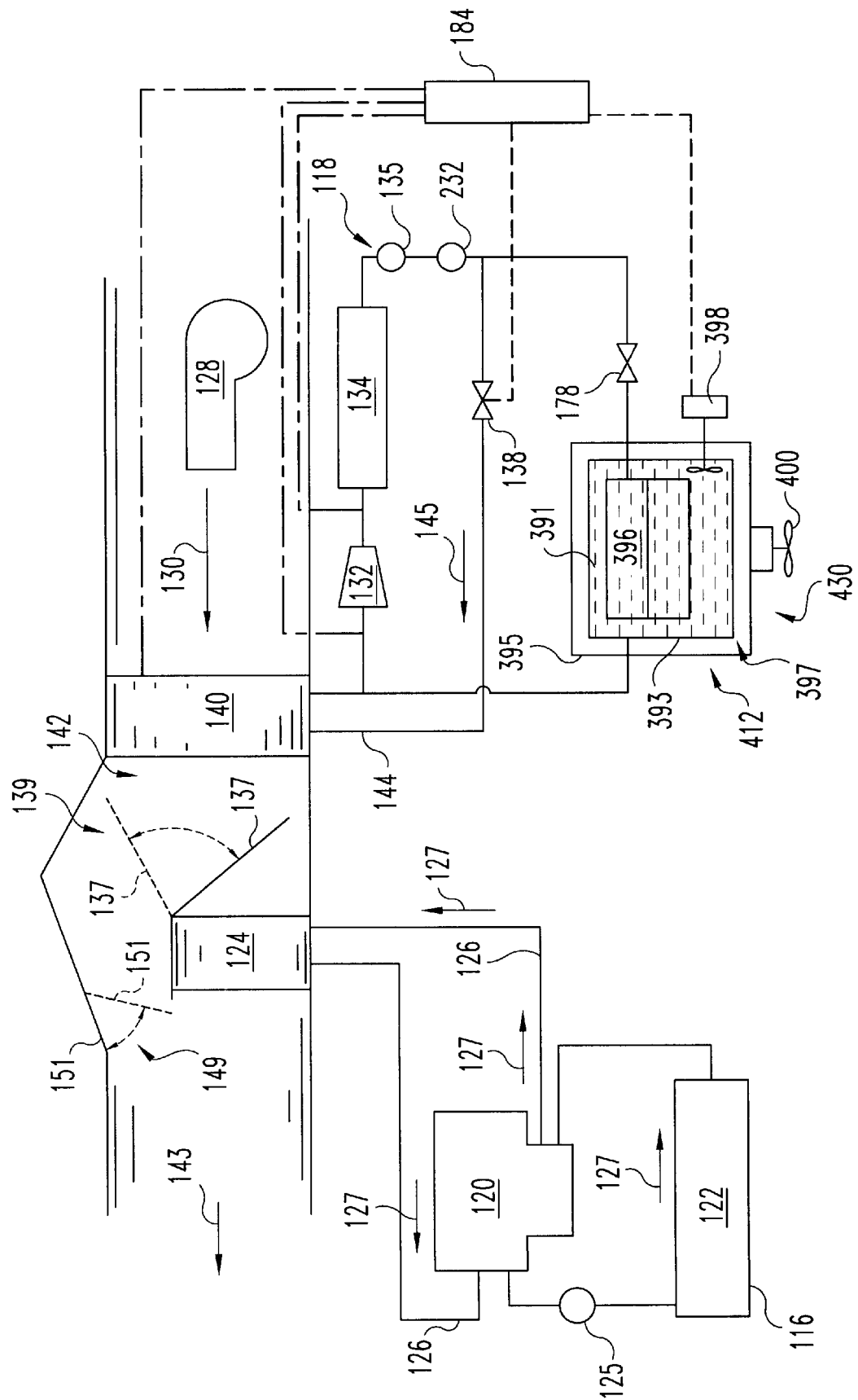
FIG. 28 is a schematic view of yet another embodiment of a thermal energy storage system integrated into the space conditioning system of a vehicle in accordance with the present invention.

A further embodiment of the present invention is illustrated in FIG. 28. Thermal energy storage system 430 is shown in FIG. 28 and is similar in concept to teas 410 illustrated in FIG. 27. The primary difference between these two embodiments is in the cool storage charging sequence. In thermal energy storage system 430, a single expansion device 232 controls the refrigerant flow. This is similar to the cool charging sequence disclosed in thermal energy storage system 230 shown in FIG. 17.

Figure 29:
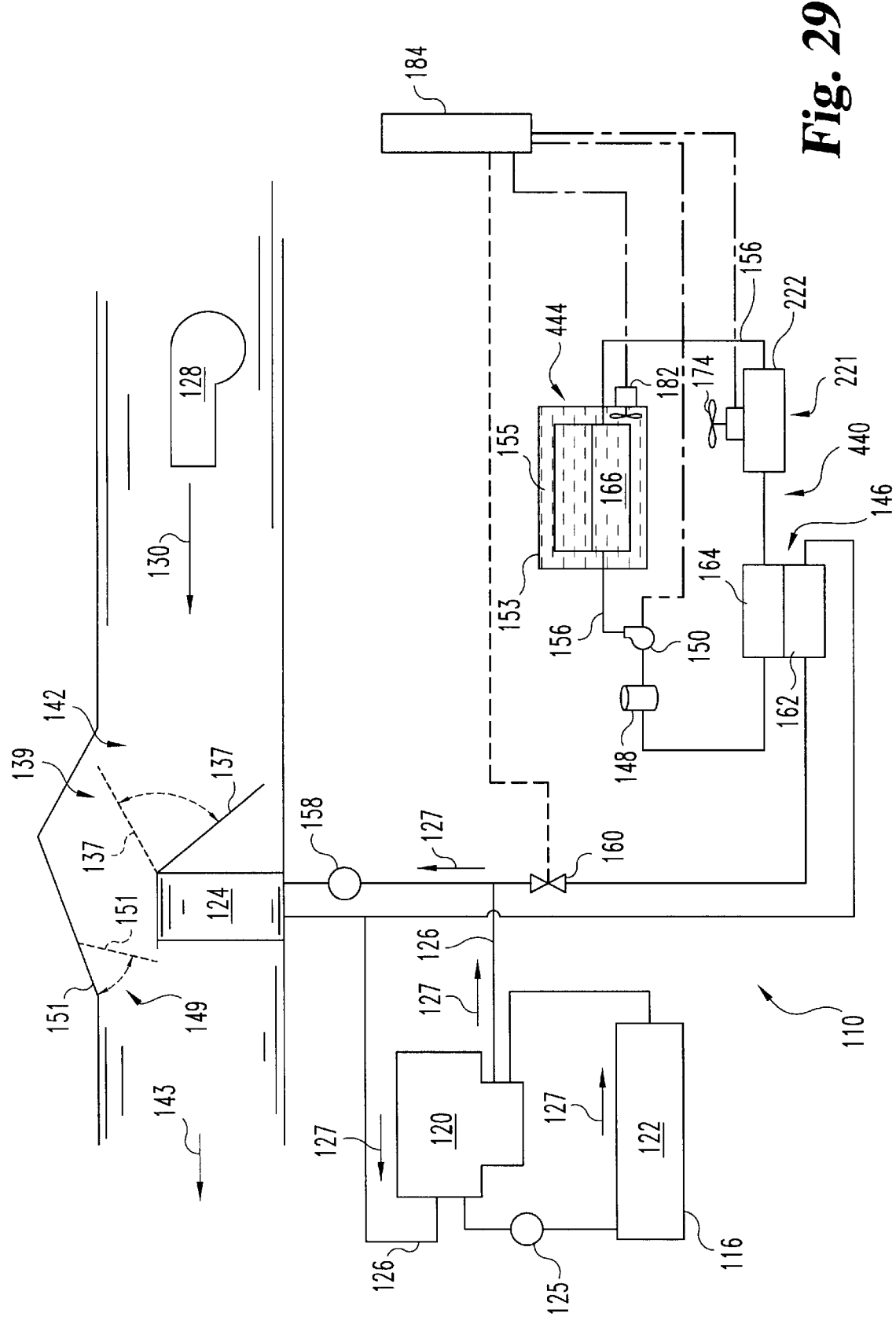
FIG. 29 is a schematic view of yet another embodiment of a thermal energy storage system integrated into the space conditioning system of a vehicle in accordance with the present invention.

FIG. 29 illustrates another embodiment of the present invention having a thermal energy storage system 440 that provides only a heating mode. Thermal energy storage system 440 includes heat exchanger 146, thermal storage apparatus 444, and radiator 221. All of these components 146, 444, and 221 are connected together in fluid communication by the transfer loop 156.

In this embodiment, a valved loop is connected either in parallel or series to the engine's coolant system 116. Opening valve 160 permits coolant to flow through a coolant loop side 162 of the heat exchanger 146 to provide a high temperature thermal energy source for liquid/liquid heat transfer with the transfer loop side 164 of the heat exchanger 146.

Thermal storage apparatus 444 is identical to thermal storage apparatus 152 shown in FIG. 5 except that it does not have a refrigerant loop side 168. Thermal storage apparatus 444 contains a transfer loop side 166 connected to the transfer loop 156 and immersed within a single bulk containment in direct contact with high temperature phase change material 155 housed therein. In preferred embodiments of the present invention, the transfer loop side 166 includes a glycol coil (not shown) passing through thermal storage apparatus 444. Thermal energy within the transfer medium is circulated through the glycol coil and absorbed sensibly and/or latently by the phase change material 155. The transfer medium exits the glycol coil of thermal storage apparatus 444 and flows to the transfer coil 222 in the radiator 22 1. The transfer medium/transfer coil 222 interface does not act as a heat exchanger in the heat charging sequence because fan 174 is not activated to create a forced airflow across the transfer coil 222. The transfer medium continues to the transfer loop side 166 in heat exchanger 146 where it continues to absorb high temperature energy from the engine's coolant system 116 for ultimate storage in thermal storage apparatus 444.

The discharge sequence of space heating may be initiated upon engine 120 shutdown when it is desired to provide a heating source to the interior occupied spaces. The transfer loop 156 is initiated independent of the vehicle's coolant system 116 with the activation of pump 150. Valve 160 may be closed to isolate the transfer loop 156 from the engine coolant system 116 if desired. The transfer medium, once initiated by pump 150, will circulate through the transfer loop side 166 within thermal storage apparatus 444 and initiate a heat exchange between the high temperature phase change material 155 in thermal storage apparatus 444 and the lower temperature transfer medium. The circulation of the transfer medium through the thermal storage apparatus 444 proceeds to the transfer coil 222 where the activation of fan 174 discharges the high temperature heat flux absorbed within the transfer medium to the interior space of the vehicle to be conditioned. Because the vehicle's engine 120 typically is not operating during the discharge mode, there is no coolant flow to the engine 120. Therefore, minimal heat transfer takes place between the residual heat in the transfer medium downstream of the transfer coil 222 and the coolant loop side 162 of heat exchanger 146. An opportunity does exist to initiate the vehicle's coolant loop 126 to transfer thermal energy to the battery, engine 120, engine components, and coolant system 116, either prior to or immediately upon engine 120 start-up to warm up the engine 120. Thermal storage apparatus 444 includes agitator 182 to function as disclosed in previous embodiments.

Figure 30:
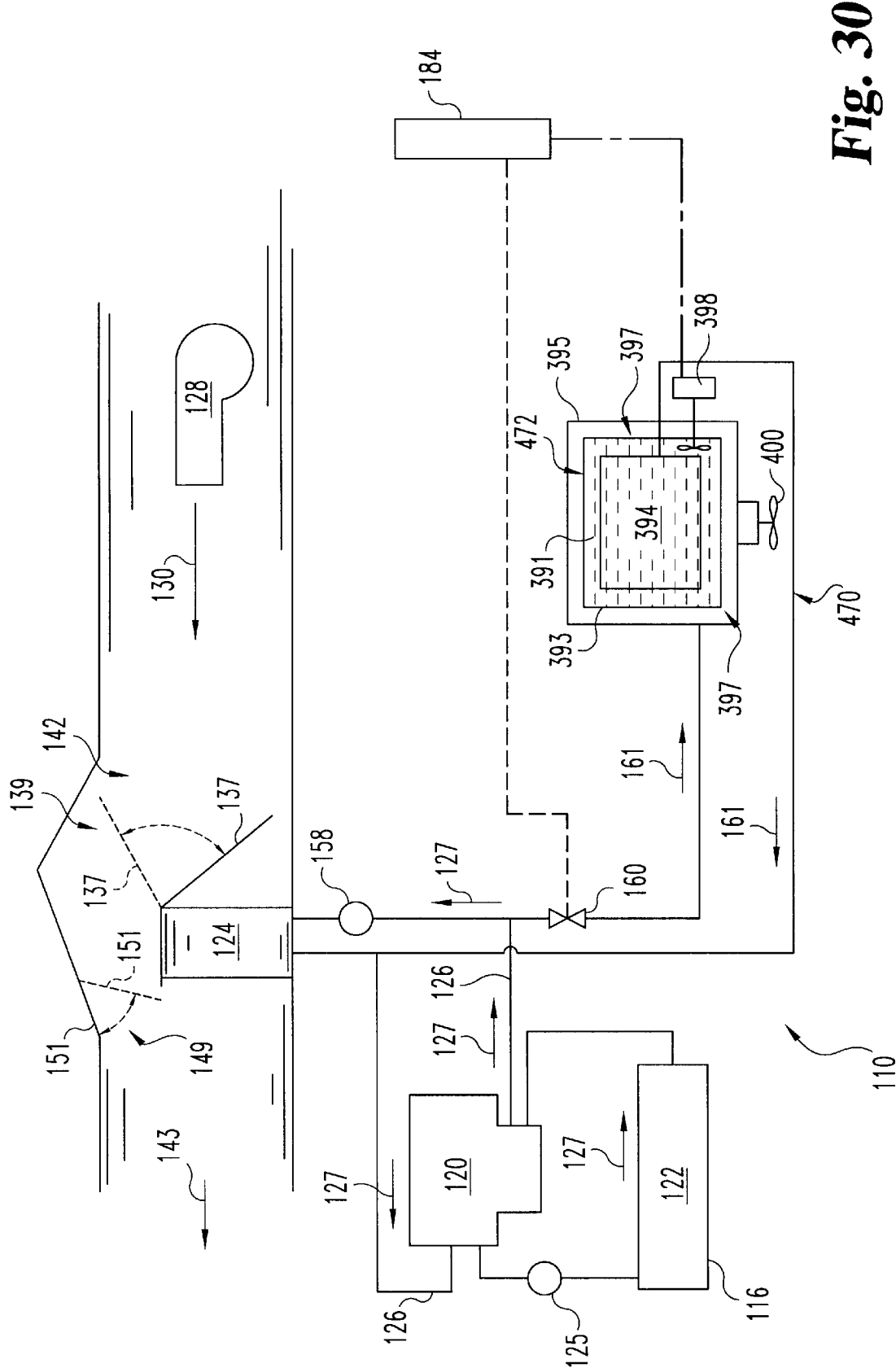
FIG. 30 is a schematic view of yet another embodiment of a thermal energy storage system integrated into the space conditioning system of a vehicle in accordance with the present invention.

Another embodiment having a thermal energy storage system 470 that only performs vehicle interior heating modes of operation is illustrated in FIG. 30. Thermal energy storage system 470 includes a thermal storage apparatus 472 that is identical to thermal storage apparatus 392 shown in FIGS. 24 and 25 except that refrigerant loop side 396 does not pass through thermal storage apparatus 472. Consistent with that previously disclosed, engine coolant is circulated to the coolant loop side 394 of thermal storage apparatus 472 via a plumbed series or parallel connection with the coolant loop 126. The coolant loop side 394 is located in direct contact with a single phase change material 391 housed within thermal storage apparatus 472. The coolant continues to circulate from the thermal storage apparatus 472 back to the engine's coolant system 116 to complete the coolant loop 126. The thermal energy absorbed into the phase change material 391 is retained until such time when heating is required during engine 120 shutdown periods.

During the heating discharge sequence, fan 400 initiates convective airflow in and around the exterior surfaces of first housing 393 to transfer the energy from the phase change material 391 within thermal storage apparatus 472 to the passing airflow. The cooler inlet airflow is obtained from the ambient interior vehicle conditions and placed in direct contact with thermal storage apparatus 472 for heat exchange purposes. The heated airflow is discharged back to the interior space of the vehicle to provide temperature maintenance. The interior and exterior surfaces of the first housing 393 may be constructed to enhance heat transfer and for airflow turbulization with fins, corrugations, and structural ribbing, etc.

Coolant circulation through the phase change material 391 within thermal storage apparatus 472 can be initiated either prior to or immediately upon engine 120 start-up to warm up the engine 120, battery, and other engine components. Thermal storage apparatus 472 includes agitator 398 to prevent temperature stratification and stagnation of the PCM 391 and to improve heat transfer.

Figure 31:
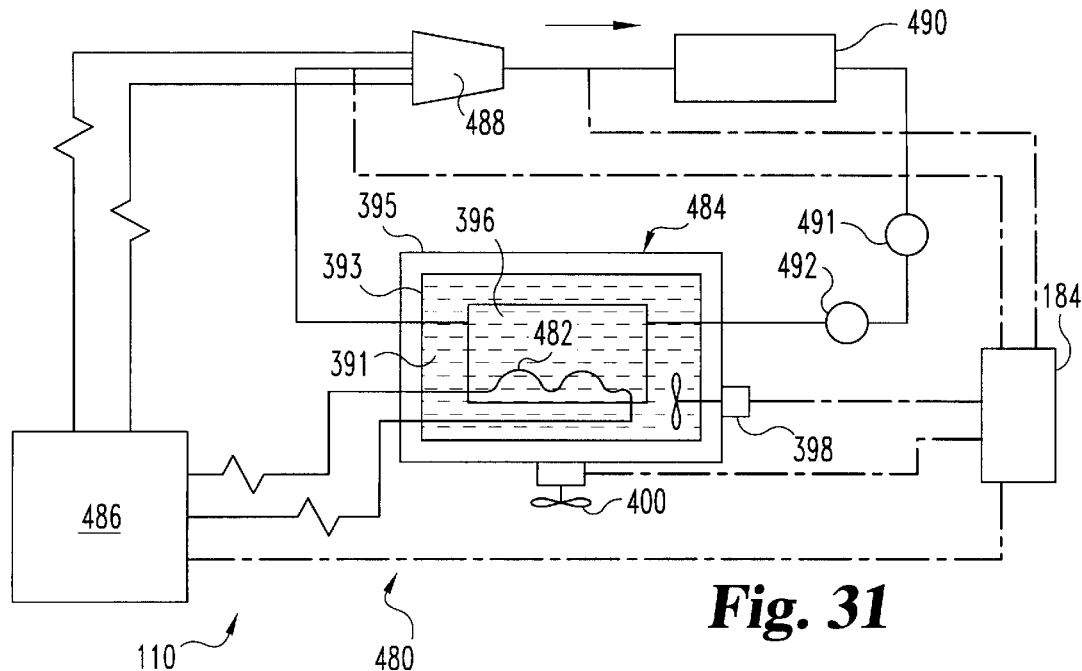
FIG. 31 is a schematic view of yet another embodiment of a thermal energy storage system integrated into the space conditioning system of a vehicle in accordance with the present invention.

Another embodiment of the present invention is illustrated in FIG. 31. Use of a single contained phase change material in a bulk encapsulation to provide a multitemperature thermal energy response, as previously illustrated in FIG. 24, greatly simplifies the operation and maintenance aspect of a thermal energy storage system.

A thermal energy storage system 480 incorporating a resistance heating coil 482 in direct communication with phase change material 391 in a thermal storage apparatus 484 is illustrated in FIG. 31. The thermal storage apparatus 484 is identical to thermal storage apparatus 392 shown in FIGS. 24 and 25 except that the resistance coil 482 replaces the coolant loop side 394 of the thermal storage apparatus 392. The resistance heating coil 482 provides direct heating to the PCM 391. The resistance heating coil 482 obtains energy from an electrical energy source 486 that receives electrical energy generated by the vehicle during engine 120 operation or by a supplemental power source when the vehicle is at rest. The thermal energy obtained from the resistance coil 482 is retained in thermal storage apparatus 484 until needed during the discharge sequence. The electrical energy source 486 can include a battery or if the thermal energy storage system 480 is integrated into a building it can include the power grid in the building.

This single source of phase change material 391 may be used for cool storage when it is not used for high temperature storage. Conventional refrigeration technology including a compressor 488, condenser 490, dryer 491, and expansion device 492 can be used to supply a low temperature refrigerant to refrigerant loop side 396 in the thermal storage apparatus 484. The refrigerant loop side 396 is in direct contact with the bulk phase change material 391 within the 484 for cool storage purposes. This embodiment does not consider the flow of refrigerant to be in parallel with any other air conditioning requirements for the vehicle.

Using electrical energy as described above in thermal energy storage system 480 permits charging the PCM 319 within thermal storage apparatus 484 even when standard heating and cooling technology is not compatible with vehicle operation. Applications may include electrical and hybrid vehicle space conditioning. The charging and discharging cycles for an EV are completely opposite from those for an internal combustion engine vehicle. For an EV, a thermal energy storage system is charged when the vehicle is not operating and discharged when the vehicle is operating. The charge/discharge sequence for an EV is in this order because currently EV's typically do not have on-board heating and cooling systems.

The discharge cycle of the heating and cooling modes are separate yet identical in that a convective airflow is created in and around the exterior surfaces of first housing 393 with the initiation of fan 400. This convective airflow obtains energy from the phase change material 391 within the thermal storage apparatus 484. The inlet airflow is obtained from the ambient vehicle interior conditions, placed in direct contact with first housing 393 for heat exchange purposes and discharged back into the interior conditioned space of the vehicle to provide temperature maintenance. The interior and exterior surfaces of the first housing 393 may be constructed to enhance heat transfer and turbulize airflow with fins, corrugations, and structural ribbing, etc.

Thermal storage apparatus 484 includes agitator 398. Agitation within thermal storage apparatus 484 should be maintained in all modes during the charge and discharge cycle to prevent temperature stratification and stagnation of the PCM 391 and to improve heat transfer.

Figure 32:
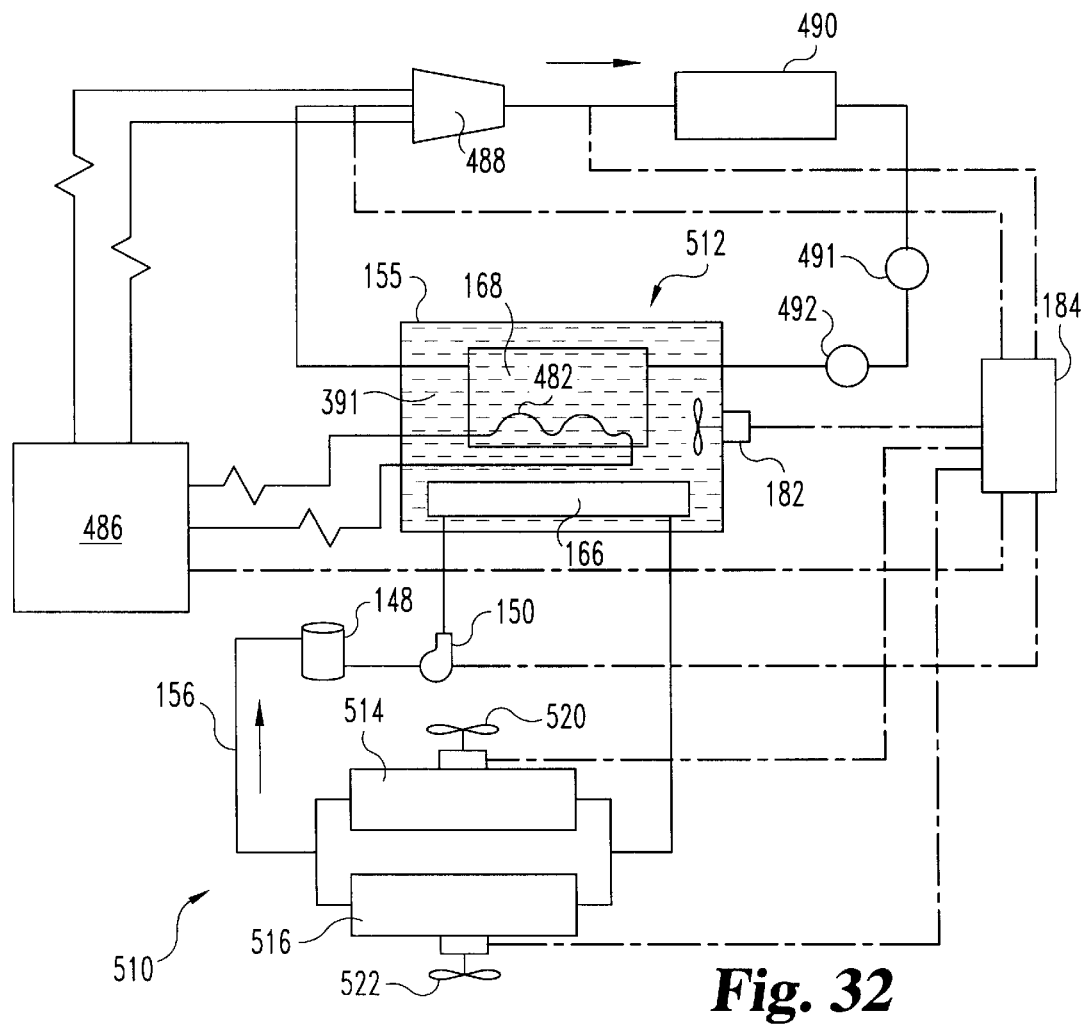
FIG. 32 is a schematic view of yet another embodiment of a thermal energy storage system integrated into the space conditioning system of a vehicle in accordance with the present invention.

Another embodiment of the present invention is illustrated in FIG. 32. This embodiment is similar to the charging concept illustrated in FIG. 31. A thermal energy storage system 510 having a thermal storage apparatus 512 is illustrated in FIG. 32. The embodiments illustrated in FIGS. 31 and 32 both utilize an electrical power source 486 to energize either an electric resistance coil 482 for high temperature storage or an electrically driven compressor 488 to provide low temperature liquid refrigerant to a thermal storage apparatus 484, 512 for low temperature thermal energy storage. For the heating and cooling modes to be effective, resistance coil 482 and refrigerant should be in close communication with the single bulk phase change material 391 within thermal storage apparatus 484, 512.

Once the thermal storage material is charged with the desired thermal effect, thermal energy storage system 510 illustrated in FIG. 32 uses a circulation transfer loop 156 and transfer coils 514, 516 to distribute the heat flux to the interior conditioned spaces of the vehicle. Thermal storage apparatus 512 is identical to thermal storage apparatus 152 shown in FIG. 5 except that the resistance coil 482 extends through the housing 153 along with the refrigerant loop side 168 and transfer loop side 166. Upon discharge, pump 150 is initiated to circulate the transfer medium within the closed transfer loop 156. This closed transfer loop 156 is connected to transfer loop side 166. The transfer loop side 166 is in direct contact and communication with the phase change material 391 within thermal storage apparatus 512. Circulation of the transfer medium through the transfer loop side 166 initiates the intended heat exchange with the transfer medium absorbing thermal energy before exiting the thermal storage apparatus 512. This transfer medium is circulated through the transfer loop 156 to one or multiple transfer coils 514, 516 within the vehicle. The activation of fans 520, 522 discharges the heat flux in the transfer medium to the interior vehicle space. Multiple fans 520, 522 are used to discharge the heated or cooled air into different areas of the vehicle interior. For example, fan 520 can be used as a defroster and fan 522 can direct airflow into a different portion of the vehicle interior.

The agitation device 182 placed within thermal storage apparatus 512 functions to avoid stratification of temperatures and material stagnation and to improve heat transfer within the PCM 3491 as it is being charged and discharged.

Figure 33:
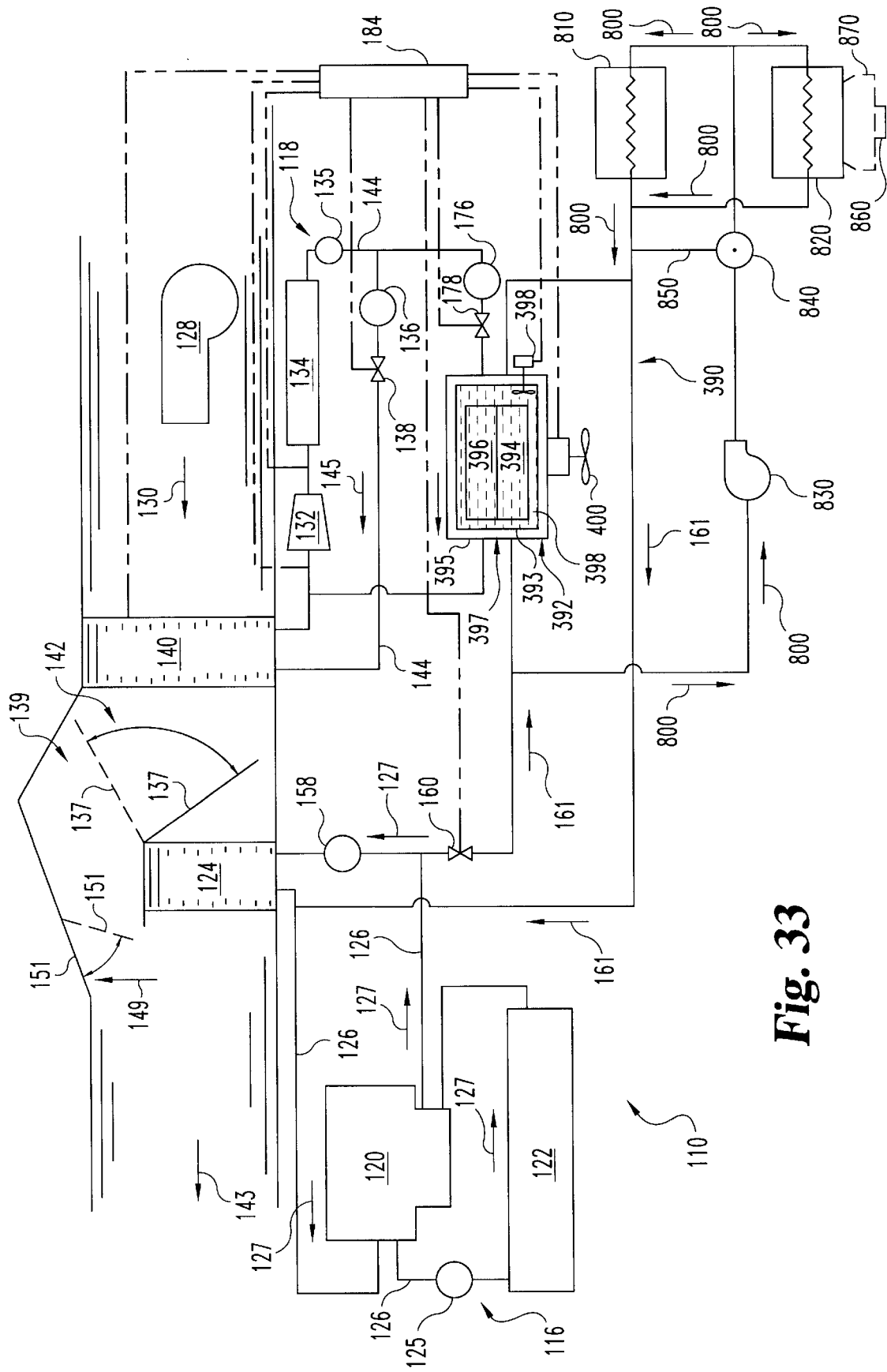
FIG. 33 is a schematic view of a thermal energy storage and delivery system operable to deliver thermal potential to a vehicle passenger compartment and to a vehicle component located exteriorly of the vehicle passenger compartment.

FIG. 33 illustrates another preferred embodiment of the present invention. Generally, shown is a system operable to charge and discharge thermal potential to both a passenger compartment of a vehicle and a vehicle component located externally of the passenger compartment. This system is particularly advantageous where thermal storage apparatus 392 has the capacity to store more than sufficient thermal potential to maintain the passenger compartment at a desired temperature. The system includes components similar to those illustrated and previously disclosed in connection with FIG. 24. In addition, the system includes a further portion of coolant loop 126, to provide coolant flow during a discharge cycle in the direction of arrows 800. The preferred system also includes at least one heat exchanger 810, located externally of the passenger compartment of the vehicle, and can optionally include additional externally-located heat exchangers, such as that denoted 820. A pump 830 is provided to circulate heat transfer medium (e.g. the engine coolant) in the direction of arrows 800. A thermostat 840 is preferably provided, occurring upstream of heat exchangers 810 and 820. A bypass line 850 is associated with thermostat 840, to redirect flow of heat transfer medium to avoid circulation through heat exchangers 810 and 820 under certain temperature conditions, for example when the temperature of the heat transfer medium exceeds or falls below a maximum or minimum temperature suited to thermal transfer to a component associated with the heat exchangers 810 and/or 820. For example, thermostat 840 can redirect flow of heat transfer medium which has too high a temperature for delivery to a battery associated with heat exchanger 810 and/or 820, which would cause deleterious oxidation of the battery's plates.

In operation, during a discharge cycle, pump 800 is energized, for example by manual control positioned for access from within the passenger compartment or by automatic control operably linked to a temperature sensor 860 for sensing the temperature of an external component 870, resulting in coolant flow in the direction of arrows 800. When the coolant reaches thermostat 800, its temperature is sensed. If this sensed temperature is suited for delivery to heat exchangers 810 and 820, the thermostat permits flow of coolant through heat exchangers 810 and 820, in order to deliver thermal energy to a component associated with the heat exchangers. In the illustrated system the heat exchangers 810 and 820 are shown connected in parallel. It will be understood, however, that these heat exchangers can also be connected in series. After exiting heat exchangers 810 and 820, the returns to thermal storage apparatus 392. Thermal energy is transferred to the coolant by thermal storage apparatus 392, after which the coolant is cycled again in the direction of arrows 800 to provide or absorb additional thermal potential to heat exchangers 810 and 820, which in turn deliver thermal energy to an adjacent exterior component, e.g. a battery, oil pan, fuel line, fuel filter or the like.

Figure 34:
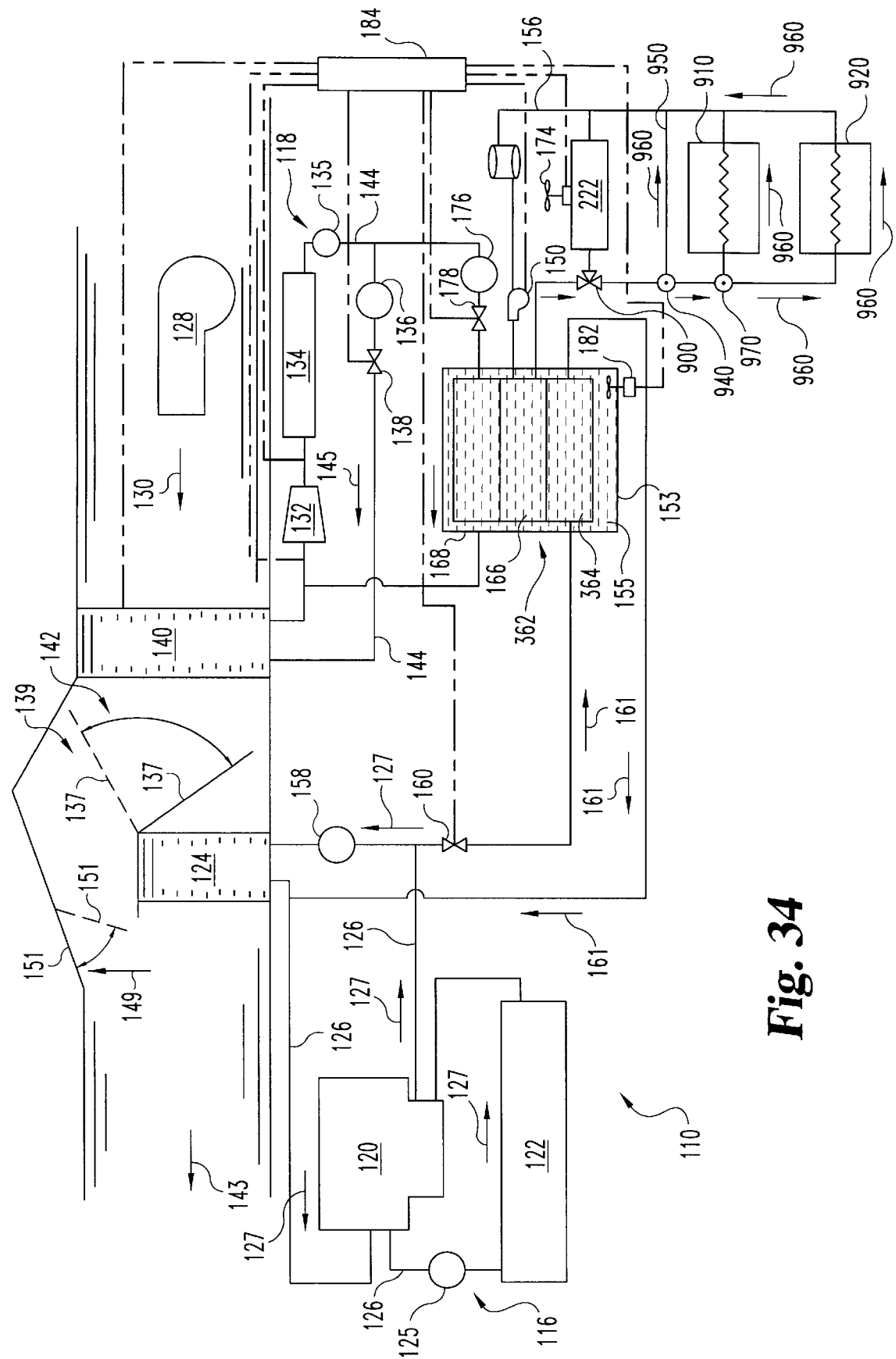
FIG. 34 is a schematic view of another thermal energy storage and delivery system operable to deliver thermal potential to a vehicle passenger compartment and a vehicle component located exteriorly of the vehicle passenger compartment.

Referring now to FIG. 34, shown is another system for delivering thermal energy to both the passenger compartment and a component located externally o the passenger compartment. The system of FIG. 34 includes components arranged as previously disclosed in connection with FIG. 23. In the system illustrated in FIG. 34, transfer loop 156 is extended, and includes a three way valve 900, thermostat 940, bypass line 950, and heat exchangers 910 and 920 located externally of the vehicle passenger compartment.

In operation, during a discharge cycle, pump 150 powers the circulation of heat transfer medium in the transfer loop 156 in the direction of the arrows 960. Three way valve 900 directs flow of the heat transfer medium either to the remote discharge coil 222 in the passenger compartment, or to heat exchangers 910 and/or 920, or to both. Thermostat 940 senses the temperature of the heat transfer medium circulating in transfer loop 156, and redirects flow of the medium through bypass line 950 if the sensed temperature is outside a desired range for delivery to heat exchanger 910 and/or 920. An additional thermostat 970 can also be located in transfer loop 156 at a position intermediate heat exchangers 910 and 920, and can have a set temperature differing from (e.g. higher or lower than) that of thermostat 940. In this manner, should the desired temperature for delivery to heat exchangers 910 and 920 differ from one another, thermostat 970 can operate so as to pass thermal energy transfer medium to one of these heat exchangers (e.g. 810) but not the other (e.g. 820).

Figure 35:
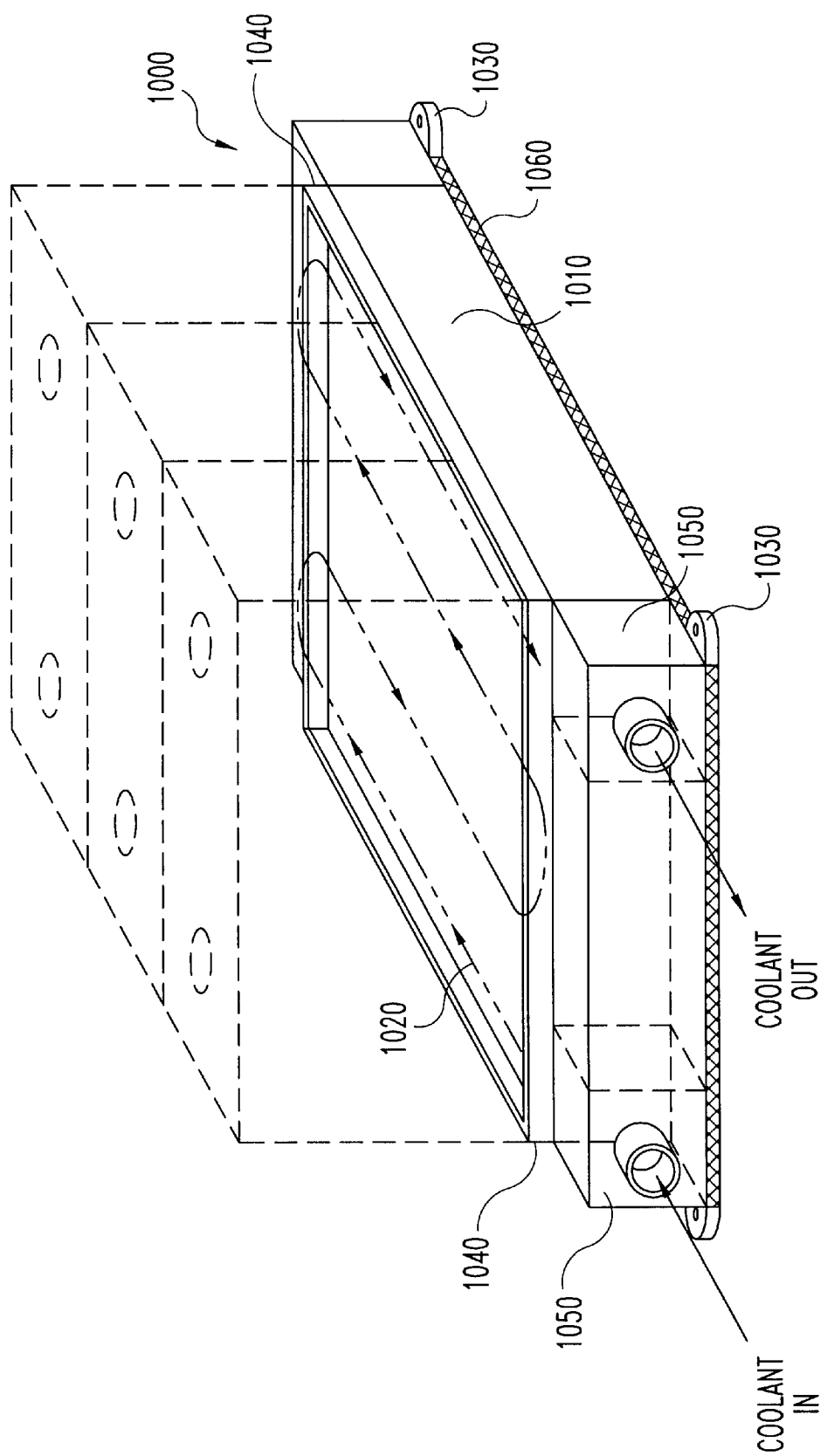
FIG. 35 is a schematic view of a heat exchanger utilizable in the thermal energy storage and delivery systems of FIGS. 33 and 34.

FIG. 35 illustrates a heat exchanger 1000 which is suited for use as heat exchangers 810, 820, 910 and/or 920, especially when these exchangers are to deliver thermal potential to a battery of the vehicle's ignition system. Heat exchanger 1000 generally includes a load-bearing shell 1010, and tubes 1020 or other internal passages for circulating thermal transfer medium within shell 1010. Heat exchanger 1000 further includes attachment members 1030 having bores therethrough for attachment to a mounting surface of the vehicle, for example using screws, bolts or the like. Frame members 1040 are also provided at the periphery of the shell 1010, configured to retain a battery or batteries (shown in phantom) in a position resting atop shell 1010. Rectangularly-shaped header chambers 1050 are provided at each end of shell 1010, and direct fluid passage to and from multiple passages 1020 within heat exchanger 1000. Further, a layer of insulative material 1060 is also attached to the bottom surface of shell 1010, and serves to insulate the heat exchanger 1000 against thermal exchange with an adjacent surface of the vehicle to which heat exchanger 1000 is attached.

It will be understood that in the present invention, thermal energy can be delivered from the thermal energy storage apparatus 392 to an exterior component in a variety of ways. For example, in the above-described embodiment shown in FIG. 33, the coolant serves as a thermal transfer medium to deliver thermal potential. In other embodiments, the thermal transfer medium circulated to heat exchangers associated with the exterior component(s) may comprise a PCM or other thermal energy storage material of the thermal energy storage apparatus 392, which is circulated in a closed loop external of the apparatus 392. In still further embodiments, an independent heat transfer medium can be circulated in a closed loop through the apparatus 392 and to the externally-located heat exchangers, or alternatively, ductwork can be provided extending from apparatus 392 to an exterior component, and a forced air stream used to deliver thermal potential from apparatus 392 to the external component. In the latter arrangement, the exterior component may be housed in a substantially closed environment into which the forced air stream is directed to deliver thermal potential to the component.

All embodiments of the present invention may include a control system to permit low temperature thermal energy stored in a thermal energy storage system to supplement a radiator in a coolant system to prevent an engine 120 from overheating during extreme load conditions. For example, this may be necessary when the vehicle is traveling uphill on a hot day. This same control system could operate to warm-up the vehicle engine 120, battery, and engine components before engine 120 start-up. In addition, embodiments of the invention may include a control system to permit low temperature thermal energy stored in a thermal energy storage system to cool a battery or batteries of an EV.

All embodiments of the present invention may be used in a variety of environments including electric vehicles, hybrid electric vehicles, vehicles with conventional combustion engines, and buildings. Further, all embodiments of the present invention can be hot or cool charged by connecting them to boilers, furnaces, electric sources, heating and cooling systems, building power grids, etc. Moreover, the embodiments of the invention can be used with advantage in combination with absorption refrigeration systems which utilize waste heat to drive the refrigeration equipment. In such a combination, the use of a thermal storage apparatus may provide immediate cooling for environmental control in the passenger compartment, thus ameliorating the delay in cooling encountered with absorption refrigeration systems due to their dependence on heat generated by intertial systems of the vehicle's engine.

All phase change materials for all embodiments may exhibit sensible and/or latent heat capabilities, as well as phase change characteristics, depending upon transition temperatures and system operating temperature ranges.

It will be apparent to those skilled in the art that various changes and modifications can be substituted for those parts of the system described herein. For example, thermal storage medium and transfer fluids, other than those specifically described herein, can be advantageously used. Further, various substitutes for valves and pumps and/or additional valves or pumps illustrated in the drawings can be employed in accordance with the invention. Furthermore, multiple thermal storage apparatus and/or systems may be added to the vehicle in accordance with the present invention.

In preferred embodiments of the invention, the transfer loop side of the heat exchanger and thermal storage apparatus can include glycol coils. Also, the coolant loop side of the heat exchanger and thermal storage apparatus can include a coil. The refrigeran loop side of the heat exchanger and thermal stoarage apparatus can include a direct expansion coil.

All of the illustrated embodiments denote a controller 184. Tdhis controller 184 controls the illustrated pumps, fans, solenoid valves, and agitators in all embodiments illustrated in FIGS. 5–32.

Figure 36:
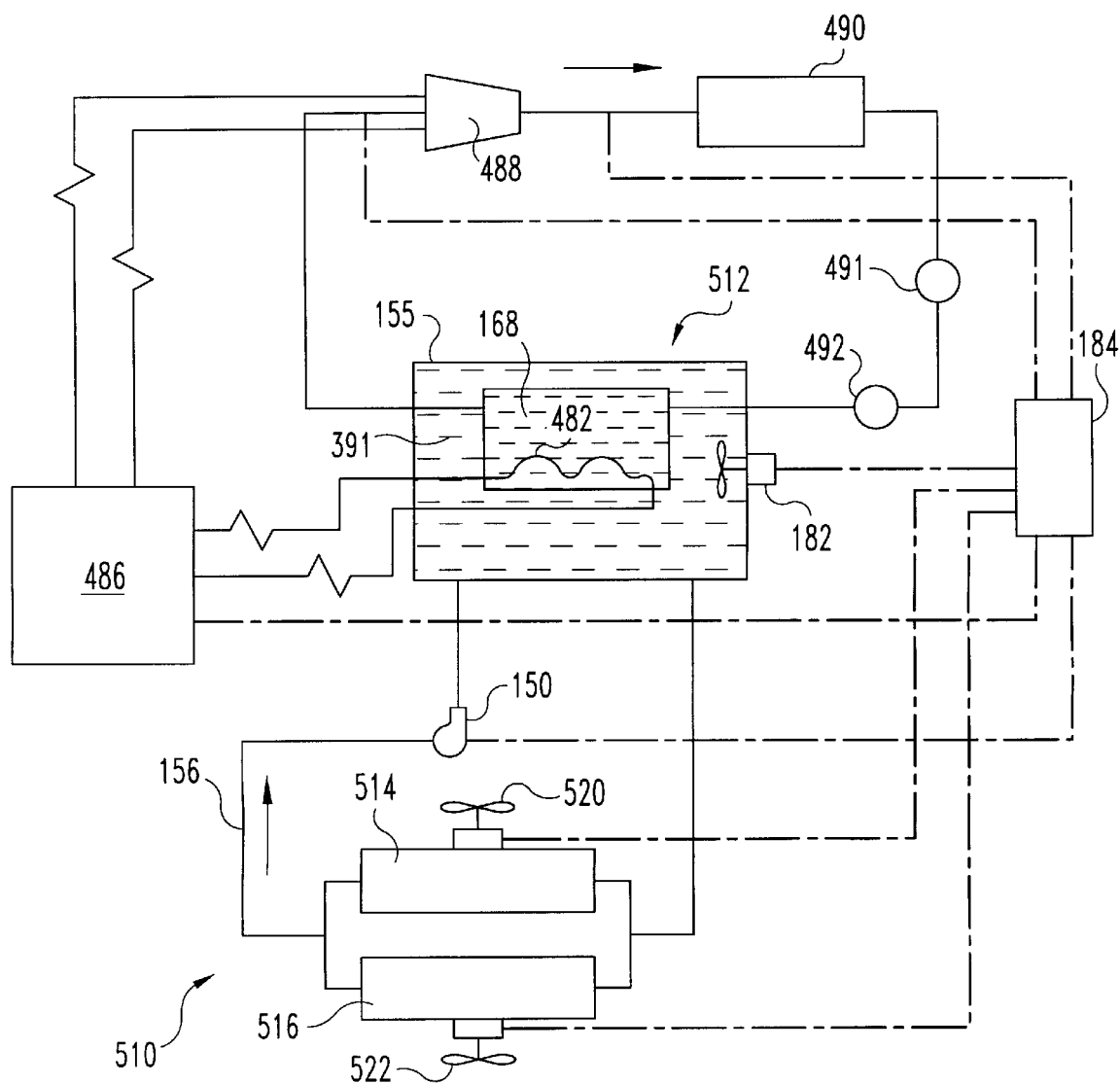
FIG. 36 is a schematic view of another thermal energy storage and delivery system intergrated into the space conditioning system of a vehicle in accordance with the present invention.

Referring now to FIG. 36, shown is another system of the invention, similar to that in FIG. 32. However, the system of FIG. 36 is designed to circulate the phase change material 391. In particular, in the system of FIG. 36, the transfer loop side (166 of FIG. 32) and the expansion tank (148 of FIG. 32) have been removed. Instead, loop 156 communicates with liquid phase change material 391, which is circulated in the loop to achieve the necessary transfer of thermal potential to the material 391.

Although the invention has been described in detail with reference to certain prefered embodiments, variations and modifications exist within the scope and spirit of the invention as described and defined in the following claims.

What is claimed is:
1. A thermal energy storage and delivery system operable to discharge thermal potential to both a passenger compartment of a vehicle and a vehicle component located externally of the passenger compartment, said system comprising:
   (i) a main environmental control system for imparting thermal potential to the passenger compartment to maintain a non-ambient temperature within the passenger compartment while an engine of the vehicle is in operation, said main environmental control system including:
      a primary thermal supply loop for circulating a primary thermal energy transfer medium;
      a primary heat exchange means within said primary thermal supply loop;
      an air duct opening into the passenger compartment and within which said primary heat exchange means is located; and
      means for creating a forced air flow through said duct across said primary heat exchange means and then into the passenger compartment; and
   (ii) a supplemental environmental control system including:
      thermal energy storage means containing a thermal storage medium operable to store thermal potential;
      coupling means for coupling said thermal energy storage means to said primary thermal supply loop so that thermal potential is delivered to said thermal energy storage means in a charging cycle during operation of the engine;
      first transfer means for transferring thermal potential from said thermal energy storage means to the passenger compartment of the vehicle while the engine is not in operation;
      external heat exchange means located externally of the passenger compartment for transferring thermal potential to an adjacent vehicle component also located externally of the passenger compartment; and
      second transfer means for transferring thermal potential from said thermal storage means to said external heat exchange means while the engine is not in operation.
2. The system of claim 1, wherein:
   said main environmental control system comprises a heating system for imparting positive thermal potential to the passenger compartment, wherein said primary thermal supply loop includes a primary coolant loop including the engine and a heater coil located in said air duct and arranged to receive hot coolant from the engine, and a blower operable to create a forced air flow through said duct, across said heater coil and into the passenger compartment;
   said thermal energy storage means comprises an enclosed volume of thermal storage medium; and
   said coupling means includes a supplemental coolant loop fluidly coupled to said primary coolant loop so that positive thermal potential is delivered to the thermal energy storage means by hot coolant circulating in said supplemental coolant loop, and valve means for interrupting coolant circulation in said supplemental coolant loop.
3. The system of claim 1, wherein:
   said main environmental control system comprises an air conditioning system for imparting negative potential to the passenger compartment, wherein said primary ther- mal supply loop includes a primary refrigerant loop including a compressor, a condenser, a refrigerant receiver, a metering device, an evaporator situated in said air duct, and a blower operable to create a forced air flow through said duct across said evaporator and into the passenger compartment;

said thermal energy storage means comprises an enclosed volume of thermal storage medium, and said coupling means includes a supplemental refrigerant loop arranged in communication with said compressor, condenser and receiver, a direct expansion coil in said supplemental refrigerant loop for delivering negative thermal potential to the thermal energy storage medium, and means for interrupting flow of refrigerant to said direct expansion coil.

4. The system of claim 1, wherein:

said second transfer means comprises a pump and an externally-directed heat transfer loop for circulating a heat transfer medium to said external heat exchange means, and valve means for interrupting the circulation of said heat transfer medium to said external heat exchange means.

5. The system of claim 4, wherein:

said externally-directed heat transfer loop includes a bypass circuit for redirecting heat transfer medium flow to prevent transfer of thermal potential to the external heat exchange means.

6. The system of claim 1, wherein:

said thermal energy storage means includes a first housing enclosing a volume of thermal energy storage medium, and a second housing providing an air clearance between itself and the first housing; and said first transfer means includes a fan arranged to withdraw air from the passenger compartment, to flow the air through the air clearance to condition the withdrawn air, and to return the conditioned air to the passenger compartment.

7. The system of claim 1, 2 or 3 wherein the thermal storage medium comprises a phase change material.

8. The system of claim 1, 2 or 3 further comprising control means for preventing discharge of thermal potential stored in said thermal energy storage means when the engine is running, and for permitting discharge of thermal energy from said thermal energy storage means when the engine is not running.

9. The system of claim 1, 2 or 3 further comprising control means positioned for access from within the passenger compartment, for activating or deactivating said first transfer means.

10. The system of claim 9 further comprising control means positioned for access from within the passenger compartment, for activating or deactivating said second transfer means.

11. The system of claim 6 further comprising temperature sensing means for energizing or deenergizing said fan in response to a sensed temperature condition in the passenger compartment.

12. The system of claim 1 wherein:

said first transfer means includes an internally-directed heat transfer loop coupled to said thermal energy storage means, an internal heat exchange means within said internally-directed heat transfer loop, a pump for circulating a heat transfer medium in said internally-directed heat transfer loop, and an internal fan arranged to flow air across the internal heat exchange means and into the passenger compartment; and wherein said system further comprises an internal temperature sensing means for energizing and deenergizing the pump and the internal fan in response to a sensed temperature condition in the passenger compartment.

13. The system of claim 1 further comprising component temperature sensing means for activating or deactivating said second transfer means in response to a sensed temperature condition of the external component.

14. The system of claim 5 further comprising bypass temperature sensing means for redirecting flow of the thermal transfer medium to said bypass circuit in response to a sensed temperature condition of the thermal transfer medium.

15. The system of claim 4 wherein said external component is a battery.

16. The system of claim 15 wherein:

said external heat exchange means comprises:

a load-bearing housing having an upper wall dimensioned to receive the battery in a position resting atop said upper wall;

a passageway within said housing in fluid communication with said externally-directed heat transfer loop, for circulating said heat transfer medium within said housing so as to heat said upper wall of said housing;

a frame attached to said housing for securing the battery in said position resting atop said upper wall of said housing;

means for attaching said housing to the vehicle; and insulation means for insulating said housing from heat transfer with adjacent surfaces of the vehicle.

17. The system of claim 16 wherein said heat transfer medium circulated in said externally-directed heat transfer loop is the thermal storage medium, and wherein the externally-directed heat transfer loop includes the enclosed volume of thermal storage medium.

18. The system of claim 16 wherein the heat transfer medium circulated in said externally-directed heat transfer loop is the engine coolant, and wherein the externally-directed heat transfer loop is in fluid communication with the supplemental coolant loop, wherein said supplemental environmental control system includes valve means for preventing flow of coolant through said externally-directed heat transfer loop while the engine is running, and permitting flow of coolant through said externally-directed heat transfer loop while the engine is not running.

19. The system of claim 18, wherein said valve means is a three-way solenoid valve.

20. The system of claim 1, 2 or 3, wherein said second transfer means are provided by:

a master heat exchange means located within said thermal energy storage means for absorbing thermal potential from said thermal storage medium;

a master heat transfer loop passing through said master heat exchange means, the master heat transfer loop including an externally-directed portion;

a pump for circulating a heat exchange medium in said master heat transfer loop; and said external heat exchange means being located within said externally-directed portion of said master heat transfer loop.

21. The system of claim 20, wherein said master heat transfer loop further includes an internally-directed portion, and wherein said system further comprises:

an internal heat exchange means within said internally-directed portion of the master heat transfer loop, and a fan arranged to flow air across said internal heat exchange means and into the passenger compartment.

22. A thermal energy storage system operable in a cooling mode for air conditioning a passenger compartment of a vehicle, the cooling mode including a thermal charging cycle and a thermal discharging cycle, the thermal energy storage system communicating with ar air conditioning system of the vehicle including a compressor, the system comprising:

at least one thermal storage apparatus configured to house thermal energy storage material that stores thermal energy, the at least one thermal storage apparatus being connected to the air conditioning system of the vehicle so that a refrigerant flows through the thermal storage apparatus in heat transfer relationship with the thermal energy storage material; and at least one fan situated adjacent to the at least one thermal storage apparatus for creating air flow across the thermal storage apparatus to exchange thermal energy with said thermal storage apparatus and create the cooled air stream which is discharged into the passenger compartment of the vehicle.

23. The thermal energy storage system of claim 22, wherein the at least one thermal storage apparatus comprises:

a first housing containing the thermal energy storage material;

a second housing forming a space between the first and second housing; and said fan being arranged to draw air into the space in contact with the first housing and to discharge the air outside the thermal storage apparatus.

24. The thermal energy storage system of claim 22, wherein:

the at least one thermal storage apparatus comprises first and second housings, the first housing containing the thermal energy storage material, and the second housing containing the first housing and forming a space between the first and second housing; and said fan being arranged to draw air into the space in contact with the first housing and to discharge the air outside the thermal storage apparatus.

25. The thermal energy storage system of claim 22, wherein said fan is arranged to draw air from said passenger compartment into the space in contact with the first housing to create conditioned air, and to discharge the conditioned air into the passenger compartment.

26. The thermal energy storage system of claim 22, wherein the passenger compartment of the vehicle includes a sleeping compartment, and wherein said conditioned air is discharged into the sleeping compartment.

27. The thermal energy storage system of claim 22, wherein the air conditioning system of the vehicle comprises a condenser, an evaporator coil, and a compressor driven by art engine of the vehicle to circulate refrigerant between the condenser and the evaporator coil.

28. The thermal energy storage system of claim 22, also communicating with a coolant system of the vehicle and comprising:

a connection between the thermal storage apparatus and the coolant system for circulating coolant from the coolant system, in heat exchange relationship with the thermal energy storage material.

29. A thermal energy storage system operable in a heating mode for heating a passenger compartment of a vehicle, the heating mode including a thermal charging cycle and a thermal discharging cycle, the thermal energy storage system communicating with a coolant system of the vehicle including a heating source, the thermal energy storage system comprising:

at least one thermal storage apparatus configured to house a thermal energy storage material that stores thermal energy, the at least one thermal storage apparatus being connected to the coolant system so that coolant flows through the thermal storage apparatus in heat transfer relationship with the thermal energy storage material; and a fan situated adjacent to the at least one thermal storage apparatus to create air flow across the thermal storage apparatus to exchange thermal energy with said thermal storage apparatus to form a heated air stream which is discharged into the passenger compartment of the vehicle.

30. The thermal energy storage system of claim 29, wherein the system comprises a refrigerant loop for circulating a refrigerant between the at least one thermal storage apparatus and a compressor in an air conditioning system of the vehicle, the thermal storage apparatus including a direct expansion coil connected to the refrigerant loop and situated in direct contact with the thermal energy storage material, the refrigerant flowing through the direct expansion coil to act as a low temperature charging source for the thermal energy storage material.

31. The thermal energy storage system of claim 30, wherein the air conditioning system of the vehicle comprises a condenser, an evaporator coil, and a compressor driven by an engine of the vehicle to circulate refrigerant between the condenser and the evaporator coil.

32. A system for air conditioning the interior of a vehicle, the vehicle having a operator space for operation of the vehicle, and a sleeping compartment for sleeping in the vehicle, the system comprising:

a main air conditioning system including:
a condenser;
an evaporator coil;
a compressor driven by an engine of the vehicle, to circulate refrigerant between the condenser and the evaporator coil; and
at least one fan for creating a forced air flow across the evaporator coil to create a first cooled airflow; and
an air duct system for delivering the first cooled air flow into the operator space of the vehicle; and a supplemental air conditioning system, comprising:
at least one thermal storage apparatus configured to house a thermal energy storage material, the at least one thermal storage apparatus being connected to said main air conditioning system and operable to flow refrigerant through the thermal storage apparatus in heat transfer relationship with the thermal energy storage material to cool the thermal energy storage material; and
at least one fan for creating a forced air flow to exchange thermal energy with said thermal storage apparatus and create a second cooled air stream, said second cooled air stream being discharged into the sleeping compartment of the vehicle.

33. The system of claim 32 wherein said at least one thermal storage apparatus is situated in said sleeping compartment of said vehicle.

34. The system of claim 33, wherein said thermal storage apparatus includes an expansion coil for flowing the refrigerant through the thermal storage apparatus, said expansion coil being in direct contact with the thermal energy storage material.

35. The system of claim 32, wherein said at least one fan of said supplemental air conditioning system is operable while the engine of the vehicle is running.

36. The system of claim 32, wherein said at least one fan of said supplemental air conditioning system is operable while the engine of the vehicle is not running.

* * * * *